United States Patent
Casey et al.

(10) Patent No.: US 12,238,839 B2
(45) Date of Patent: Feb. 25, 2025

(54) SENSOR FOR DETECTING GLARE CONDITIONS

(71) Applicant: Lutron Technology Company LLC, Coopersburg, PA (US)

(72) Inventors: Craig Alan Casey, Coopersburg, PA (US); Yogesh Venkata Gopalan, Cambridge, MA (US); Brent Protzman, Easton, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 526 days.

(21) Appl. No.: 17/539,002

(22) Filed: Nov. 30, 2021

(65) Prior Publication Data

US 2022/0170320 A1    Jun. 2, 2022

Related U.S. Application Data

(60) Provisional application No. 63/119,462, filed on Nov. 30, 2020.

(51) Int. Cl.
  *G06V 10/147* (2022.01)
  *E06B 9/24* (2006.01)
  (Continued)

(52) U.S. Cl.
  CPC .............. *H05B 47/11* (2020.01); *E06B 9/24* (2013.01); *G01J 1/4204* (2013.01);
  (Continued)

(58) Field of Classification Search
  CPC ........ Y02B 20/40; Y02B 80/00; H04N 25/77; H04N 25/75; H04N 23/71; H04N 25/704;
  (Continued)

(56) References Cited

U.S. PATENT DOCUMENTS 7,391,297 B2   6/2008   Cash et al.
8,009,042 B2   8/2011   Steiner et al.
(Continued)

FOREIGN PATENT DOCUMENTS

WO   2020021347 A1   1/2020

OTHER PUBLICATIONS

Jain et al., A review of open loop control strategies for shades, blinds and integrated lighting by use of real-time daylight prediction methods, May 1, 2018 [retrieved May 6, 2024], Building and Environment, vol. 135, pp. 352-364. Retrieved: (Year: 2018). https://www.sciencedirect.com/science/article/pii/S0360132318301471 (Year: 2018).*

(Continued)

*Primary Examiner* — Matthew C Bella
*Assistant Examiner* — Dennis Rosario
(74) *Attorney, Agent, or Firm* — Flaster Greenberg P.C.

(57) ABSTRACT

A sensor and/or system controller may process an image multiple times at multiple resolutions to detect glare conditions. A glare condition threshold used to determine whether a glare condition exists may be based on the resolution of the image. When the resolution of the image is higher, the glare condition threshold may be higher. The sensor and/or system controller may organize one or more adjacent pixels having similar intensities into pixel groups. The pixel groups may vary in size and/or shape. The sensor and/or system controller may determine a representative group luminance for the pixel group (e.g., an average luminance of the pixels in the group). The sensor and/or system controller may determine a group glare condition threshold, which may be used to determine whether a glare condition exists for the group of pixels and/or may be based on the size of the group.

28 Claims, 27 Drawing Sheets

(51) Int. Cl.
| | |
|---|---|
| *E06B 9/68* | (2006.01) |
| *G01J 1/42* | (2006.01) |
| *G06T 7/00* | (2017.01) |
| *G06V 10/60* | (2022.01) |
| *H05B 47/11* | (2020.01) |
| *E06B 9/26* | (2006.01) |
| *E06B 9/264* | (2006.01) |
| *E06B 9/40* | (2006.01) |
| *E06B 9/56* | (2006.01) |
| *G06V 10/141* | (2022.01) |
| *G09G 3/34* | (2006.01) |
| *H05B 41/38* | (2006.01) |
| *H05B 45/10* | (2020.01) |
| *H05B 45/20* | (2020.01) |
| *H05B 47/10* | (2020.01) |
| *H05B 47/115* | (2020.01) |

(52) U.S. Cl.
CPC .......... *G06T 7/0002* (2013.01); *G06V 10/147* (2022.01); *G06V 10/60* (2022.01); *E06B 9/26* (2013.01); *E06B 9/264* (2013.01); *E06B 9/40* (2013.01); *E06B 9/56* (2013.01); *E06B 9/68* (2013.01); *E06B 2009/6809* (2013.01); *E06B 2009/6818* (2013.01); *E06B 2009/6827* (2013.01); *E06B 2009/6845* (2013.01); *E06B 2009/6872* (2013.01); *G01J 2001/4266* (2013.01); *G05B 2219/2653* (2013.01); *G06T 2207/30232* (2013.01); *G06V 10/141* (2022.01); *G09G 3/3406* (2013.01); *H05B 41/38* (2013.01); *H05B 45/10* (2020.01); *H05B 45/20* (2020.01); *H05B 47/10* (2020.01); *H05B 47/115* (2020.01); *Y02B 20/40* (2013.01)

(58) Field of Classification Search
CPC .. H04N 25/778; H04N 23/843; H04N 25/585; H04N 25/702; H04N 25/443; H04N 25/59; H04N 25/766; H04N 25/779; H04N 25/40; G01J 1/4204; G01J 2001/4266; G01J 1/0407; H05B 47/11; H05B 47/10; H05B 47/105; H05B 45/20; H05B 45/10; H05B 47/125; H05B 41/38; G06T 3/18; G06T 7/90; G06T 15/50; G06T 15/506; G05B 2219/2642; G05B 2219/2653; G01S 17/894; G06V 10/25; G06V 10/145; G06V 10/143; G06V 10/60; G06V 40/161; G06V 40/162; G06V 10/751; G06V 20/52; G06V 10/141; G06V 10/14; G06V 10/147; G09G 2360/144; G09G 2320/0626; G09G 2360/16; G09G 2320/0646; G09G 2320/064; G09G 2320/0633; G09G 2320/0653; G09G 2320/062; G09G 3/3406; G09G 3/3413; G09G 3/342; G09G 3/3426; G09G 2320/0233; E06B 2009/6827; E06B 2009/6818; E06B 2009/6809; E06B 9/68; E06B 9/40; E06B 9/264; E06B 9/24; E06B 9/56; E06B 2009/6845; E06B 2009/6836; E06B 2009/6863; E06B 2009/6854; E06B 2009/6872; E06B 2009/6881; E06B 2009/689; E06B 9/26; G02F 1/1336; F21S 41/43

See application file for complete search history.

(56) References Cited

U.S. PATENT DOCUMENTS

| | | | |
|---|---|---|---|
| 8,199,010 | B2 | 6/2012 | Sloan et al. |
| 8,228,184 | B2 | 7/2012 | Blakeley et al. |
| 8,288,981 | B2 | 10/2012 | Spira et al. |
| 8,330,638 | B2 | 12/2012 | Altonen et al. |
| 8,410,706 | B2 | 4/2013 | Steiner et al. |
| 8,451,116 | B2 | 5/2013 | Steiner et al. |
| 8,723,466 | B2 | 5/2014 | Chambers et al. |
| 8,950,461 | B2 | 2/2015 | Adams et al. |
| 9,488,000 | B2 | 11/2016 | Kirby et al. |
| 9,538,603 | B2 | 1/2017 | Shearer et al. |
| 9,546,515 | B2 | 1/2017 | Hall et al. |
| 9,933,761 | B2 | 4/2018 | Courtney et al. |
| 10,027,127 | B2 | 7/2018 | Crafts et al. |
| 10,264,651 | B2 | 4/2019 | Steiner |
| 10,660,185 | B2 | 5/2020 | Baker et al. |
| 2005/0041116 | A1* | 2/2005 | Tsukioka ............ H04N 25/134 348/229.1 |
| 2008/0092075 | A1 | 4/2008 | Jacob et al. |
| 2012/0286940 | A1 | 11/2012 | Carmen, Jr. et al. |
| 2017/0171941 | A1 | 6/2017 | Steiner et al. |
| 2018/0167547 | A1 | 6/2018 | Casey |
| 2018/0168015 | A1 | 6/2018 | Casey et al. |
| 2018/0168019 | A1 | 6/2018 | Baker et al. |
| 2018/0168020 | A1 | 6/2018 | Casey et al. |
| 2018/0252035 | A1 | 9/2018 | Casey et al. |
| 2019/0384232 | A1 | 12/2019 | Casey et al. |
| 2020/0267822 | A1 | 8/2020 | Casey et al. |
| 2022/0357714 | A1* | 11/2022 | Berman .................. E06B 9/24 |

OTHER PUBLICATIONS

Konstantzos, A human-centered approach for the design of perimeter office spaces based on visual environment criteria, 2016 [ retrieved May 6, 2024], Purdue University ProQuest Dissertations Publishing, 252 pages. Retrieved: (Year: 2016). https://www.proquest.com/docview/1875933583?pq-origsite=gscholar&fromopenview=true&sourcetype=Dissertations%20&%20Theses (Year: 2016).*

* cited by examiner

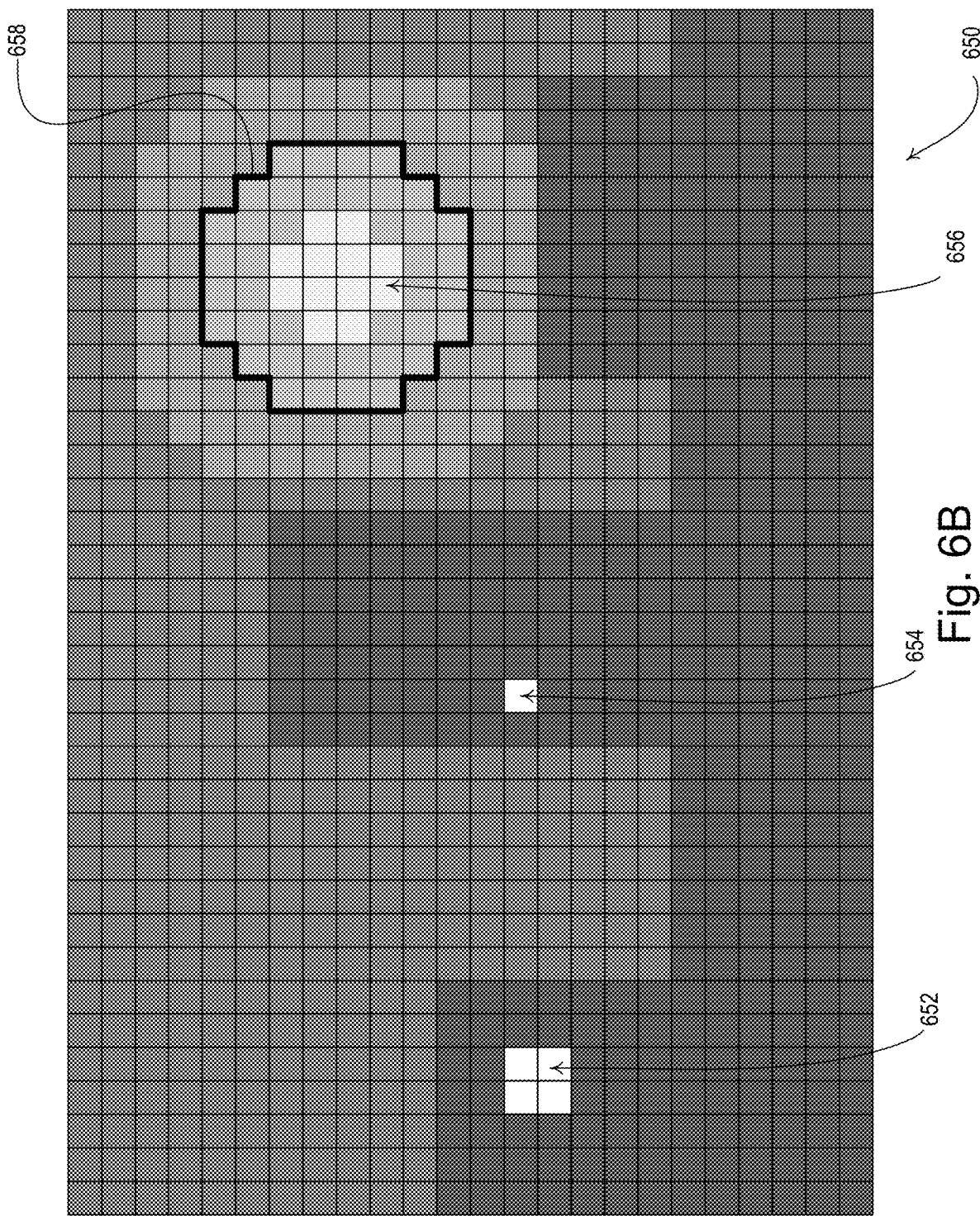

SENSOR FOR DETECTING GLARE CONDITIONS

CROSS-REFERENCE TO RELATED APPLICATIONS

This application claims the benefit of U.S. Provisional Patent Application No. 63/119,462, filed Nov. 30, 2020, which is hereby incorporated by reference in its entirety.

BACKGROUND

A user environment, such as a residence or an office building, for example, may be configured using various types of load control systems. A lighting control system may be used to control the lighting loads providing artificial light in the user environment. A motorized window treatment control system may be used to control the natural light provided to the user environment. An HVAC system may be used to control the temperature in the user environment.

Each load control system may include various control devices, including input devices and load control devices. The load control devices may receive messages, which may include load control instructions, for controlling an electrical load from one or more of the input devices. The load control devices may be capable of directly controlling an electrical load. The input devices may be capable of indirectly controlling the electrical load via the load control device.

Examples of load control devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of input devices may include remote control devices, occupancy sensors, daylight sensors, glare sensors, color temperature sensors, temperature sensors, and/or the like. Remote control devices may receive user input for performing load control. Occupancy sensors may include infrared (IR) sensors for detecting occupancy/vacancy of a space based on movement of the users. Daylight sensors may detect a daylight level received within a space. Color temperature sensor determines the color temperature within a user environment based on the wavelengths and/or frequencies of light. Temperature sensors may detect the current temperature of the space. Window sensors (e.g., glare sensors) may be positioned facing outside of a building (e.g., on a window or exterior of a building) to measure the total amount of natural light detected outside the building and/or detect glare conditions.

Some prior art load control systems have controlled motorized window treatments to prevent glare conditions inside of the building (e.g., glare conditions caused by direct sunlight shining into the building). The load control system may include a system controller for determining positions to which to control shade fabric of the motorized window treatments to prevent glare conditions based on the predicted location of the sun (e.g., using the present time of the day and year, the location and/or orientation of the building, etc.). The load control system may automatically control the motorized window treatments throughout the day according to the estimated positions of the sun. The load control system may also include window sensors that are configured to detect low light conditions (e.g., on cloudy days) and/or high light conditions (e.g., on extremely bright days) to enable the system controller to override the automatic control of the motorized window treatments on cloudy days and bright days. However, such load control systems require complicated configuration procedure and advanced system controller to operate appropriately. These systems are also performing estimation of daylight glare based on known conditions (e.g., the present time of the day and year, the location and/or orientation of the building, etc.) and/or a total amount of daylight sensed at the location of a given sensor. Examples of such a load control system is described in commonly-assigned U.S. Pat. No. 8,288,981, issued Oct. 16, 2012, entitled METHOD OF AUTOMATICALLY CONTROLLING A MOTORIZED WINDOW TREATMENT WHILE MINIMIZING OCCUPANT DISTRACTIONS, the entire disclosure of which is hereby incorporated by reference.

SUMMARY

A sensor (e.g., a visible light sensor) and/or a system controller may process an image to determine the position of a glare source and control motorized window treatments to prevent the glare source from affecting an occupant of a room. The sensor and/or a system controller may process the pixels of the image to determine whether a glare condition exists. The sensor and/or system controller may compare the luminance of the pixels in the image to a glare condition threshold to determine whether a glare condition exists. For example, if the luminance of the pixel is greater than the glare condition threshold, the sensor and/or system controller may determine that a glare condition exists.

Additionally and/or alternatively, the sensor and/or system controller may determine an illuminance value for one or more pixels of the image, for example based on respective luminance values and/or profile angles of the pixels. The sensor and/or system controller may process the pixels (e.g., or groups of pixels) sequentially. The sensor and/or system controller may add the illuminance value for each processed pixel (e.g., group of pixels) to a cumulative illuminance value, and may compare the cumulative illuminance value to a glare condition threshold to determine whether a glare condition exists. For example, if the cumulative illuminance value is greater than the glare condition threshold, the sensor and/or system controller may determine that a glare condition exists.

The visible light sensor may process the image to account for small high-intensity glare conditions. For example, the visible light sensor may reduce the resolution of the image and/or group adjacent pixels having similar intensities into pixel groups. The sensor and/or system controller may process the image multiple times at multiple resolutions. The glare condition threshold used to determine whether a glare condition exists may be based on the resolution of the image. For example, when the resolution of the image is higher, the glare condition threshold may be higher. Similarly, when the resolution of the image is lower, the threshold may be lower.

The sensor and/or system controller may organize one or more adjacent pixels to form pixel groups. For example, the sensor and/or system controller may group pixels having similar intensities. The pixel groups may vary in size. The sensor and/or system controller may determine a representative group luminance, which may be a value that represents the luminance values of the pixels in the group. For example, the representative luminance value may be an average luminance of the pixels in the group. The sensor and/or system controller may determine a group glare condition threshold, which may be used to determine whether a glare condition exists for the group of pixels. For example, the sensor and/or system controller may determine the group glare condition threshold based on the size of the group. For example, a large pixel group may have a large group glare detection threshold.

After determining that a glare condition exists, the sensor and/or system controller may determine a profile angle for the glare source. The sensor and/or system controller may use the profile angle to identify the position to which a shade level may be controlled at one or more motorized window treatments to prevent the glare condition from affecting the occupant of the room. The occupant of the room may indicate that the glare condition exists, and the system controller may identify the position to which the shade level may be controlled based on input from the occupant.

As described herein, a sensor for detecting glare may comprise a visible light sensing circuit configured to record one or more images, and a control circuit configured to calculate a respective luminance of multiple pixels of an image (e.g., a non-warped image) and detect a glare condition in response to the luminance of at least one of the pixels. While calculating the respective luminance of each of the multiple pixels, the control circuit may be configured to start at a first pixel on a bottom row of pixels of the non-warped image and step through each of the multiple pixels on the bottom row before stepping up to a next row of pixels immediately above the bottom row. When the control circuit detects the glare condition, the control circuit may cease processing the non-warped image by not calculating the respective luminance of each of the remaining pixels of the non-warped image.

BRIEF DESCRIPTION OF THE DRAWINGS

FIGS. 6A and 6B are examples of non-warped images used for glare detection.

DETAILED DESCRIPTION

Figure 1:
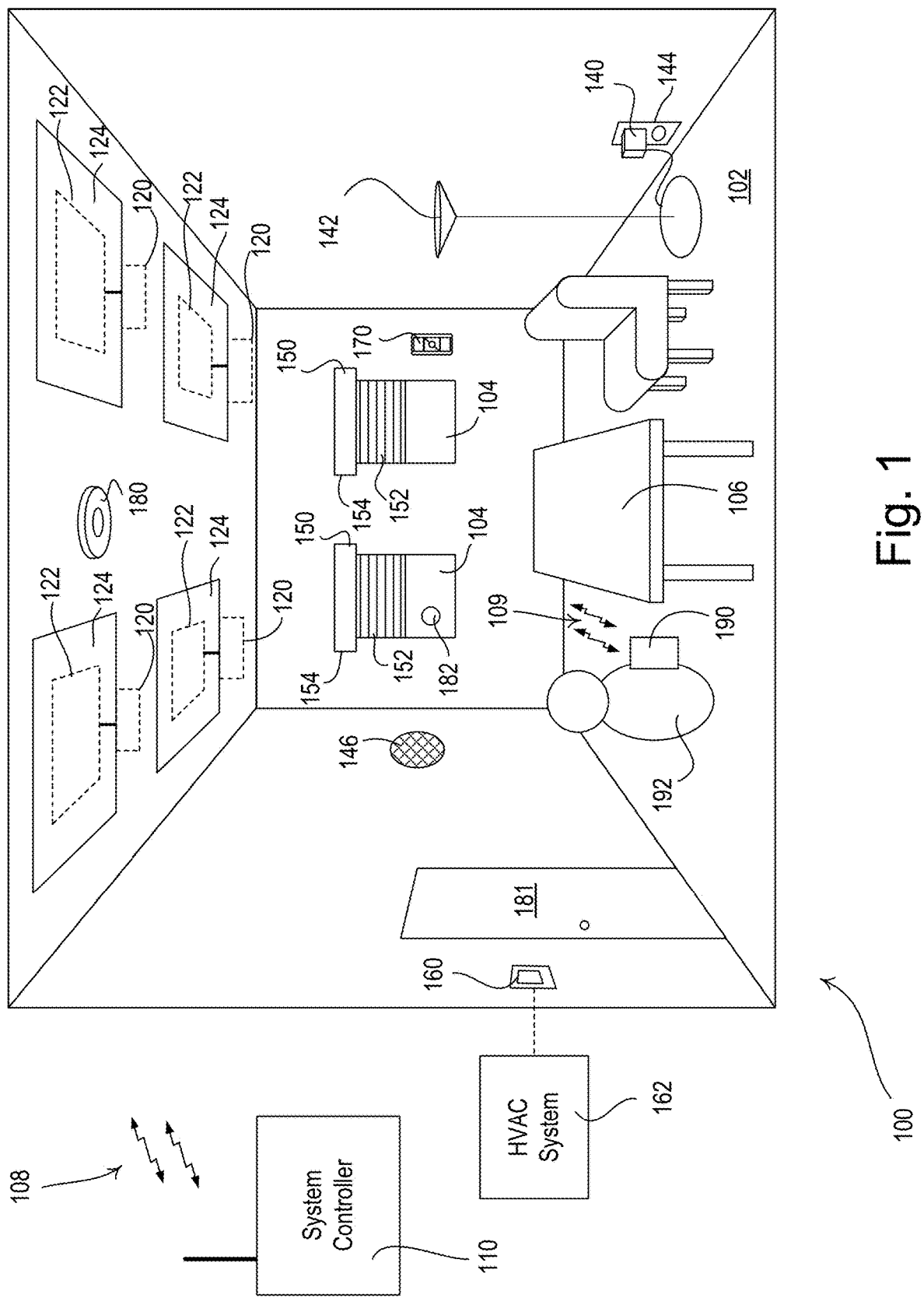
FIG. 1 is a diagram of an example load control system.

FIG. 1 is a diagram of an example load control system 100 for controlling the amount of power delivered from an alternating-current (AC) power source (not shown) to one or more electrical loads. The load control system 100 may be installed in a load control environment 102. The load control environment 102 may include a space in a residential or commercial building. For example, the load control system 100 may be installed in one or more rooms on one or more floors in the building.

The load control system 100 may comprise a plurality of control devices. The control devices may include load control devices that are configured to control one or more electrical loads in the load control environment 102 (also referred to as a user environment). For example, the load control devices may control the one or more electrical loads in response to input from one or more input devices or other devices in the load control system 100. The load control devices in the load control system 100 may include lighting control devices. For example, the load control system 100 may include lighting control devices 120 for controlling lighting loads 122 in a corresponding lighting fixture 124. The lighting control devices 120 may comprise light-emitting diode (LED) drivers and the lighting loads 122 may comprise LED light sources. While each lighting fixture 124 is shown having a single lighting load 122, each lighting fixture may comprise one or more individual light sources (e.g., lamps and/or LED emitters) that may be controlled individually and/or in unison by the respective lighting control device. Though an LED driver is provided as an example lighting control device, other types of lighting control devices may be implemented as load control devices in the load control system 100. For example, the load control system 100 may comprise dimmer switches, electronic dimming ballasts for controlling fluorescent lamps, or other lighting control devices for controlling corresponding lighting loads. The lighting control device 120 may be configured to directly control an amount of power provided to the lighting load 122. The lighting control device 120 may be configured to receive (e.g., via wired or wireless communications) messages via radio-frequency (RF) signals 108, 109 and to control the lighting load 122 in response to the received messages. One will recognize that lighting control device 120 and lighting load 122 may be integral and thus part of the same fixture or bulb, for example, or may be separate.

The load control device in the load control system 100 may comprise one or more appliances that are able to receive the RF signals 108 (e.g., wireless signals) for performing load control. In an example, the load control system may include a speaker 146 (e.g., part of an audio/visual or intercom system), which is able to generate audible sounds, such as alarms, music, intercom functionality, etc. in response to RF signals 108

The load control devices in the load control system 100 may comprise one or more daylight control devices, e.g., motorized window treatments 150, such as motorized cellular shades, for controlling the amount of daylight entering the load control environment 102. Each motorized window treatment 150 may comprise a window treatment fabric 152 (e.g., a covering material) hanging from a headrail 154 in front of a respective window 104. Each motorized window treatment 150 may further comprise a motor drive unit (not shown) located inside of the headrail 154 for raising and lowering the window treatment fabric 152 for controlling the amount of daylight entering the load control environment 102. The motor drive units of the motorized window treatments 150 may be configured to receive messages via the RF signals 108 and adjust the position of the respective window treatment fabric 152 in response to the received messages. For example, the motorized window treatments may be battery-powered. The load control system 100 may comprise other types of daylight control devices, such as, for example, a cellular shade, a drapery, a Roman shade, a Venetian blind, a Persian blind, a pleated blind, a tensioned roller shade system, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Pat. No. 9,488,000, issued Nov. 8, 2016, entitled INTEGRATED ACCESSIBLE BATTERY COMPARTMENT FOR MOTORIZED WINDOW TREATMENT, the entire disclosures of which are hereby incorporated by reference.

The load control devices in the load control system 100 may comprise a plug-in load control device 140 for controlling a plug-in electrical load, e.g., a plug-in lighting load (such as a floor lamp 142 or a table lamp) and/or an appliance (such as a television or a computer monitor). For example, the floor lamp 142 may be plugged into the plug-in load control device 140. The plug-in load control device 140 may be plugged into a standard electrical outlet 144 and thus may be coupled in series between the AC power source and the plug-in lighting load. The plug-in load control device 140 may be configured to receive messages via the RF signals 108 and to turn on and off or adjust the intensity of the floor lamp 142 in response to the received messages.

The load control devices in the load control system 100 may comprise one or more temperature control devices, e.g., a thermostat 160 for controlling a room temperature in the load control environment 102. The thermostat 160 may be coupled to a heating, ventilation, and air conditioning (HVAC) system 162 via a control link 161 (e.g., an analog control link or a wired digital communication link). The thermostat 160 may be configured to wirelessly communicate messages with a controller of the HVAC system 162. The thermostat 160 may comprise a temperature sensor for measuring the room temperature of the load control environment 102 and may control the HVAC system 162 to adjust the temperature in the room to a setpoint temperature. The load control system 100 may comprise one or more wireless temperature sensors (not shown) located in the load control environment 102 for measuring the room temperatures. The HVAC system 162 may be configured to turn a compressor on and off for cooling the load control environment 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the load control environment 102. The thermostat 160 may be configured to receive messages via the RF signals 108 and adjust heating, ventilation, and cooling in response to the received messages.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a controllable electrical receptacle, or controllable power strip for controlling one or more plug-in loads; a motor control unit for controlling a motor load, such as a ceiling fan or an exhaust fan; a drive unit for controlling a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and/or an alternative energy controller.

The load control system 100 may comprise one or more input devices capable of receiving an input event for controlling one or more load control devices in the load control system 100. The input devices and the load control devices may be collectively referred to as control devices in the load control system 100. The input devices in the load control system 100 may comprise one or more remote control devices, such as a remote control device 170. The remote control device may be battery-powered. The remote control device 170 may be configured to transmit messages via RF signals 108 to one or more other devices in the load control system 100 in response to an input event, such as an actuation of one or more buttons or a rotation of a rotary knob of the remote control device 170. For example, the remote control device 170 may transmit messages to the lighting control device 120, the plug-in load control device 140, the motorized window treatments 150, and/or the temperature control device 160 via the RF signals 108 in response to actuation of one or more buttons located thereon. The remote control device 170 may also communicate with other devices in the load control system 100 via a wired communication link. In response to an input event at the remote control device 170, a devices to which the remote control device 170 is wired may be triggered to transmit messages to one or more other devices in the load control system 100. The remote control device 170 may comprise a keypad. In another example, the remote control device 170 may comprise a rotary knob configured to transmit messages to one or more other devices in response to a rotation on the rotary knob (e.g., rotation of a predefined distance or for a predefined period of time). The remote control device 170 may be mounted to a structure, such as a wall, a toggle actuator of a mechanical switch, or a pedestal to be located on a horizontal surface. In another example, the remote control device 170 may be handheld.

The remote control device 170 may provide feedback (e.g., visual feedback) to a user of the remote control device 170 on a visual indicator, such as a status indicator. The status indicator may be illuminated by one or more light emitting diodes (LEDs) for providing feedback. The status indicator may provide different types of feedback. The feedback may include feedback indicating actuations by a user or other user interface event, a status of electrical loads being controlled by the remote control device 170, and/or a status of the load control devices being controlled by the remote control device 170. The feedback may be displayed in response to user interface event and/or in response to messages received that indicate the status of load control devices and/or electrical loads. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Patent Application Publication No. 2012/0286940, published Nov. 15, 2012, entitled CONTROL DEVICE HAVING A NIGHTLIGHT, the entire disclosures of which are hereby incorporated by reference.

The load control system 100 may comprise other types of input devices, such as, for example, visible light sensors, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The input devices and the load control devices may be configured to communicate messages between one another on a communication link within the load control system 100. The communication link between control devices in the load control system may comprise one or more network communication links through which messages may be transmitted for performing end-to-end communications in the load control system 100. For example, the input devices and the load control devices may be capable of communicating messages directly to one another via the RF signals 108. The RF signals 108 may be transmitted using a proprietary RF protocol, such as the CLEAR CONNECT protocol (e.g., CLEAR CONNECT TYPE A and/or CLEAR CONNECT TYPE X protocols). Alternatively, the RF signals 108 may be transmitted using a different RF protocol, such as, a standard protocol, for example, one of WIFI, cellular (e.g., 3G, 4G LTE, 5G NR, or other cellular protocol), BLUETOOTH, BLUETOOTH LOW ENERGY (BLE), ZIGBEE, Z-WAVE, THREAD, KNX-RF, ENOCEAN RADIO protocols, or a different protocol. In an example, the input devices may transmit messages to the load control devices via the RF signals 108 that comprise input events (e.g., button presses, sensor measurement events, or other input event) or control instructions generated in response to the input events for performing control of the electrical loads controlled by the load control devices. Though communication links may be described as a wireless communication links, wired communication links may similarly be implemented for enabling communications herein.

For devices in the load control system 100 to recognize messages directed to the device and/or to which to be responsive, the devices may be associated with one another by performing an association procedure. For example, for a load control device to be responsive to messages from an input device, the input device may first be associated with the load control device. As one example of an association procedure, devices may be put in an association mode for sharing a unique identifier for being associated with and/or stored at other devices in the load control system 100. For example, an input device and a load control device may be put in an association mode by the user 192 actuating a button on the input device and/or the load control device. The actuation of the button on the input device and/or the load control device may place the input device and/or the load control device in the association mode for being associated with one another. In the association mode, the input device may transmit an association message(s) to the load control device (directly or through one or more other devices as described herein). The association message from the input device may include a unique identifier of the input device. The load control device may locally store the unique identifier of the input device in association information, such that the load control device may be capable of recognizing messages (e.g., subsequent messages) from the input device that may include load control instructions or commands. The association information stored at the load control device may include the unique identifiers of the devices with which the load control device is associated. The load control device may be configured to respond to the messages from the associated input device by controlling a corresponding electrical load according to the load control instructions received in the messages. The input device may also store the unique identifier of the load control device with which it is being associated in association information stored locally thereon. A similar association procedure may be performed between other devices in the load control system 100 to enable each device to perform communication of messages with associated devices. This is merely one example of how devices may communicate and be associated with one another and other examples are possible.

According to another example, one or more devices may receive system configuration data (e.g., or subsequent updates to the system configuration data) that is uploaded to the devices and that specifies the association information comprising the unique identifiers of the devices for being associated. The system configuration data may comprise a load control dataset that defines the devices and operational settings of the load control system 100. The system configuration data may include information about the devices in the user environment 102 and/or the load control system 100. The system configuration data may include association information that indicates defined associations between devices in the load control system 100. The association information may be updated using any of the association procedures described herein.

One or more intermediary devices may also maintain association information that includes the unique identifiers that make up the associations of other devices in the load control system 100. For example, the input devices and the load control devices may communicate on a communication link in the load control system 100 through one or more other intermediary devices, such as router devices or other devices in a network. The intermediary devices may comprise input devices, load control devices, a central processing device, or another intermediary device capable of enabling communication between devices in the load control system. The association information that is maintained on the intermediary devices may comprise the unique identifiers of the devices that are associated with one another for identifying and/or enabling communication of messages between devices in the load control system 100. For example, an intermediary device may identify the unique identifiers being transmitted in association messages between devices during the association procedure and store the unique identifiers of the devices as an association in the association information. The intermediary devices may use the association information for monitoring and/or routing communications on a communication link between devices in the load control system 100. In another example, the association information of other devices may be uploaded to the intermediary device and/or communicated from the intermediary device to the other devices for being locally stored thereon (e.g., at the input devices and/or load control devices).

The load control system 100 may comprise a system controller 110. The system controller 100 may operate as an intermediary device, as described herein. For example, the system controller 110 may operate as a central processing device for one or more other devices in the load control system 100. The system controller 110 may operable to communicate messages to and from the control devices (e.g., the input devices and the load control devices). For example, the system controller 110 may be configured to receive messages from the input devices and transmit messages to the load control devices in response to the messages received from the input devices. The system controller 110 may route the messages based on the association information stored thereon. The input devices, the load control devices, and the system controller 110 may be configured to transmit and receive the RF signals 108 and/or over a wired communication link. The system controller 110 may be coupled to one or more networks, such as a wireless or wired local area network (LAN), e.g., for access to the Internet. The system controller 110 may be wirelessly connected to the networks using one or more wireless protocols. The system controller 110 may be coupled to the networks via a wired communication link, such as a network communication bus (e.g., an Ethernet communication link).

The system controller 110 may be configured to communicate via the network with one or more computing devices, e.g., a mobile device 190, such as, a personal computing device and/or a wearable wireless device. The mobile device 190 may be located on an occupant 192, for example, may be attached to the occupant's body or clothing or may be held by the occupant. For example, the occupant may be a user of the mobile device 190. The mobile device 190 may be characterized by a unique identifier (e.g., a serial number or address stored in memory) that uniquely identifies the mobile device 190 and thus the occupant 192. Examples of personal computing devices may include a smart phone, a laptop, and/or a tablet device. Examples of wearable wireless devices may include an activity tracking device, a smart watch, smart clothing, and/or smart glasses. In addition, the system controller 110 may be configured to communicate via the network with one or more other control systems (e.g., a building management system, a security system, etc.).

The mobile device 190 may be configured to display a user interface that the occupant 192 may use to adjust the shade position of the motorized window treatment 150 (e.g., the position of the covering material for the motorized window treatment 150). The mobile device 190 may be configured to transmit messages to the system controller 110, for example, in one or more Internet Protocol packets. For example, the mobile device 190 may be configured to transmit messages to the system controller 110 over the LAN and/or via the Internet. The mobile device 190 may be configured to transmit messages over the Internet to an external service, and then the messages may be received by the system controller 110. The mobile device 190 may transmit and receive RF signals 109. The RF signals 109 may be the same signal type and/or transmitted using the same protocol as the RF signals 108. Alternatively or additionally, the mobile device 190 may be configured to transmit RF signals according to another signal type and/or protocol.

The load control system 100 may comprise other types of computing devices coupled to the network, such as a desktop personal computer (PC), a wireless-communication-capable television, or any other suitable Internet-Protocol-enabled device. Examples of load control systems operable to communicate with mobile and/or computing devices on a network are described in greater detail in commonly-assigned U.S. Pat. No. 10,271,407, issued Apr. 23, 2019, entitled LOAD CONTROL DEVICE HAVING INTERNET CONNECTIVITY, the entire disclosure of which is hereby incorporated by reference.

The load control system 100 may comprise one or more input devices, e.g., such as a remote control device 170, a first visible light sensor 180 (e.g., a room sensor), and a second visible light sensor 182 (e.g., a window sensor). The input devices may be fixed or movable input devices. The system controller 110 may be configured to transmit one or more messages to the load control devices (e.g., an LED driver (not shown), the plug-in load control device 140, the motorized window treatments 150, and/or the thermostat 160) in response to the messages received from the remote control device 170 and the visible light sensors 180, 182. The remote control device 170 and the visible light sensors 180, 182 may be configured to transmit messages directly to the LED driver, the plug-in load control device 140, the motorized window treatments 150, and the temperature control device 160. Examples of visible light sensors having multiple sensor modes are described in greater detail in commonly-assigned U.S. Pat. No. 10,264,651, issued Apr. 16, 2019, and U.S. Pat. No. 10,660,185, issued May 19, 2020, both entitled LOAD CONTROL SYSTEM HAVING A VISIBLE LIGHT SENSOR, the entire disclosures of which are hereby incorporated by reference.

The first visible light sensor 180 may be configured to operate in the occupancy and/or vacancy sensor mode to determine an occupancy and/or vacancy condition in the room 102 in response to detection of movement within one or more regions of interest. The first visible light sensor 180 may be configured to use an occupancy and/or vacancy detection algorithm to determine that the room 102 is occupied in response to the amount of movement and/or the velocity of movement exceeding an occupancy threshold.

During a sensor event for detecting occupancy and/or vacancy, the first visible light sensor 180 may be configured to apply a predetermined mask to focus on one or more regions of interest in one or more images recorded by the camera and determine occupancy or vacancy of the space based on detecting or not detecting motion in the regions of interest. The first visible light sensor 180 may be responsive to movement in the regions of interest and not be responsive to movement in the masked-out areas. For example, the first visible light sensor 180 may be configured to apply a mask to an image of the room to exclude detection of motion in the doorway 181 and/or the windows 104 of the room 102, and may focus on a region of interest that includes the interior space of the room. The first visible light sensor 180 may be configured to apply a first mask to focus on a first region of interest, apply a second mask to focus on a second region of interest, and determine occupancy or vacancy based on movement detected in either of the regions of interest. In addition, the first visible light sensor 180 may be configured to focus on multiple regions of interest in the image at the same time by applying different masks to the image(s).

The first visible light sensor 180 may be configured to adjust certain operational characteristics (e.g., sensitivity) to be used by the occupancy and/or vacancy algorithm depending upon the present sensor event. The occupancy threshold may be dependent upon the sensitivity. For example, the first visible light sensor 180 may be configured to be more sensitive or less sensitive to movements in a first region of interest than in a second region of interest. For example, the first visible light sensor 180 may be configured to increase the sensitivity and apply a mask to focus on a region of interest around a keyboard of a computer to be more sensitive to movements around the keyboard. In other words, by using masks that focus on "smaller" vs "larger" areas (e.g., the keyboard vs. the desk surface on which the keyboard may sit), the first visible light sensor 180 may be configured to increase and/or decrease the sensitivity of detected or not detected movements. In addition, through the use of masks, the first visible light sensor 180 may be configured to detect movement in the space and detect where that movement occurred.

The first visible light sensor 180 may transmit messages to the system controller 110 via the RF signals 108 (e.g., using the proprietary protocol) in response to detecting the occupancy or vacancy conditions. The system controller 110 may be configured to turn the lighting loads (e.g., lighting load 122 and/or an LED light source (not shown)) on and off in response to receiving an occupied command and a vacant command, respectively. Alternatively, the first visible light sensor 180 may transmit messages directly to the lighting loads. The first visible light sensor 180 may operate as a vacancy sensor, such that the lighting loads are only turned off in response to detecting a vacancy condition (e.g., and not turned on in response to detecting an occupancy condition). Examples of RF load control systems having occupancy and vacancy sensors are described in greater detail in commonly-assigned U.S. Pat. No. 8,009,042, issued Aug. 30, 2011 Sep. 3, 2008, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The first visible light sensor 180 may also be configured to operate in the daylight sensor mode to measure a light intensity at a location of the space. For example, the first visible light sensor 180 may apply a digital mask to focus on only a specific location in the space (e.g., on a task surface, such as a table 106 as shown in FIG. 1) and may use a daylighting algorithm to measure the light intensity at the location. For example, the first visible light sensor 180 may be configured to apply a mask to focus on a region of interest that includes the surface of a desk. The first visible light sensor 180 may be configured to integrate light intensities values of the pixels of the image across the region of interest to determine a measured light intensity at the surface of the desk.

The first visible light sensor 180 may transmit messages (e.g., including the measured light intensity) to the system controller 110 via the RF signals 108 for controlling the intensities of the lighting load 122 and/or an LED light source (not shown) in response to the measured light intensity. The first visible light sensor 180 may be configured to focus on multiple regions of interest in the image recorded by the camera and measure the light intensity in each of the different regions of interest. Alternatively, the first visible light sensor 180 may transmit messages directly to the lighting loads. The first visible light sensor 180 may be configured to adjust certain operational characteristics (e.g., gain) based on the region of interest in which the light intensity is presently being measured. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The system controller 110 may be configured to determine a degradation in the light output of one or more of the lighting loads (e.g., the lighting load 122 and/or the LED light source) in the space, and to control the intensities of the lighting loads to compensate for the degradation (e.g., lumen maintenance). For example, the system controller 110 may be configured to individually turn on each lighting load (e.g., when it is dark at night) and measure the magnitude of the light intensity at a location (e.g., on the table 106 or the desk 220). For example, the system controller 110 may be configured to turn on the lighting load 122 at night and control the first visible light sensor 180 to record an image of the room, to apply a mask to focus on a region of interest that the lighting load 122 illuminates (e.g., the surface of table 106 or the desk 220), to measure the light intensity in that region of interest, and to communicate that value to the system controller 110. The system controller 110 may store this value as a baseline value. At a time and/or date thereafter, the system controller 110 may repeat the measurement and compare the measurement to the baseline value. If the system controller 110 determines there to be a degradation, it may control the lighting load 122 to compensate for the degradation, alert maintenance, etc.

The first visible light sensor 180 may also be configured to operate in the color sensor mode to sense a color (e.g., measure a color temperature) of the light emitted by one or more of the lighting loads in the space (e.g., to operate as a color sensor and/or a color temperature sensor). For example, the first visible light sensor 180 may be configured to apply a mask to focus on a region of interest in the room 102 and may use a color sensing algorithm to determine a measured color and/or color temperature in the room. For example, the first visible light sensor 180 may integrate color values of the pixels of the image across the region of interest to determine the measured color and/or color temperature in the room. The first visible light sensor 180 may transmit messages (e.g., including the measured color temperature) to the system controller 110 via the RF signals 108 for controlling the color (e.g., the color temperatures) of the lighting load 122 and/or the LED light source in response to the measured light intensity (e.g., color tuning of the light in the space). Alternatively, the first visible light sensor 180 may transmit messages directly to the lighting loads. An example of a load control system for controlling the color temperatures of one or more lighting loads is described in greater detail in commonly-assigned U.S. Pat. No. 9,538,603, issued Jan. 3, 2017, entitled SYSTEMS AND METHODS FOR CONTROLLING COLOR TEMPERATURE, the entire disclosure of which is hereby incorporated by reference.

The first visible light sensor 180 may be configured to operate in a glare detection sensor mode. For example, the first visible light sensor 180 may be configured execute a glare detection algorithm to determine a depth of direct sunlight penetration into the space from the image recorded by the camera. For example, the first visible light sensor 180 may be configured to apply a mask to focus on a region of interest on the floor of the room 102 near the windows 104 to sense the depth of direct sunlight penetration into the room. Based on a detection and/or measurement of the depth of direct sunlight penetration into the room, the first visible light sensor 180 may transmit messages to the system controller 110 via the RF signals 108 to limit the depth of direct sunlight penetration into the space, for example, to prevent direct sunlight from shining on a surface (e.g., a table or a desk). The system controller 110 may be configured to lower the window treatment fabric 152 of each of the motorized window treatments 150 to prevent the depth of direct sunlight penetration from exceeded a maximum sunlight penetration depth. Alternatively, the first visible light sensor 180 may be configured to directly control the window treatments 150 to lower of the window treatment fabric 152. Examples of methods for limiting the sunlight penetration depth in a space are described in greater detail in previously-referenced U.S. Pat. No. 8,288,981.

The first visible light sensor 180 may be configured to focus only on daylight entering the space through, for example, one or both of the windows 104 (e.g., to operate as a window sensor). The system controller 110 may be configured to control the lighting loads (e.g., the lighting load 122 and/or the LED light source) in response to the magnitude of the daylight entering the space. The system controller 110 may be configured to override automatic control of the motorized window treatments 150, for example, in response to determining that it is a cloudy day or an extremely sunny day. Alternatively, the first visible light sensor 180 may be configured to directly control the window treatments 150 to lower of the window treatment fabric 152. Examples of load control systems having window sensors are described in greater detail in commonly-assigned U.S. Pat. No. 9,933,761, issued Apr. 3, 2018, entitled METHOD OF CONTROLLING A MOTORIZED WINDOW TREATMENT, the entire disclosure of which is hereby incorporated by reference.

The first visible light sensor 180 may be configured to detect a glare source (e.g., sunlight reflecting off of a surface) outside or inside the room 102 in response to the image recorded by the camera. The system controller 110 may be configured to lower the window treatment fabric 152 of each of the motorized window treatments 150 to eliminate the glare source. Alternatively, the first visible light sensor 180 may be configured to directly control the window treatments 150 to lower of the window treatment fabric 152 to eliminate the glare source.

The first visible light sensor 180 may also be configured to operate in the occupant count mode and may execute an occupant count algorithm to count the number of occupants a particular region of interest, and/or the number of occupants entering and/or exiting the region of interest. For example, the system controller 110 may be configured to control the HVAC system 162 in response to the number of occupants in the space. The system controller 110 may be configured to control one or more of the load control devices of the load control system 100 in response to the number of occupants in the space exceeding an occupancy number threshold. Alternatively, the first visible light sensor 180 may be configured to directly control the HVAC system 162 and other load control devices.

The second visible light sensor 182 may be configured to operate in a glare detection sensor mode. For example, the second visible light sensor 182 may be configured to execute a glare detection algorithm to determine if a glare condition may exist in the room 102 from one or more images recorded by the camera. The glare condition in the room 102 may be generated by a glare source outside of the room, such as the sun, an external lamp (e.g., an outdoor building light or a streetlight), and/or a reflection of the sun or other bright light source. The second visible light sensor 182 may be configured to analyze one or more images recorded by the camera to determine if a glare condition exists outside of the room 102 as viewed from one of the windows 104.

The second visible light sensor 182 may be configured to detect multiple (e.g., different) types of glare condition. For example, the types of glare conditions may comprise a luminance-based glare condition, an illuminance-based glare condition, and/or a window sill glare condition. The luminance-based glare condition may comprise, for example, a direct glare condition and/or an indirect glare condition. A direct glare condition may occur when a glare source is a light source (e.g., a natural light source, such as the sun, and/or an artificial light source, such as a lamp) that is shining directly on a window. An indirect glare condition may occur when the glare source is a reflection of a light source that is shining on a window. In addition, the luminance-based glare condition may comprise an absolute luminance glare condition and/or a relative luminance glare condition. An absolute luminance glare condition may occur when the light level (e.g., the light intensity or luminance) of a potential glare source is too high (e.g., exceeds an absolute glare threshold). A relative luminance glare condition (e.g., a contrast glare condition) may occur when the difference between the light level of a potential glare source and a background light level (e.g., a baseline) is too high (e.g., exceeds a relative glare threshold). An illuminance-based glare condition may occur when a total illuminance of the light shining on the window is too high. A window sill glare condition may occur when a total illuminance of the light shining on a window sill outside of the window is too high.

Based on a detection of a glare condition, the second visible light sensor 182 may transmit messages to the system controller 110 via the RF signals 108 to open, close, or adjust the position of the window treatment fabric 152 of each of the motorized window treatments 150. The second visible light sensor 182 may execute various procedures to detect the glare condition(s), and may use the worst-case shade position (e.g., the lowest shade position) for controlling the window treatment fabric 152. For example, the system controller 110 may be configured to lower the window treatment fabric 152 of each of the motorized window treatments 150 (e.g., to a fully-lowered position and/or an intermediate position) to block the glare condition and/or to prevent direct sunlight penetration onto a task surface in the room 102 (e.g., a desk or a table). If the second visible light sensor 182 does not detect a glare condition, the system controller 110 may be configured to open the motorized window treatments 150 (e.g., to control the position of the window treatment fabric 152 to a fully-raised position or a visor position). Alternatively, the second visible light sensor 182 may be configured to directly control the motorized window treatments 150.

The system controller 110 may be configured to open, close, or adjust the position of the window treatment fabric 152 of each of the motorized window treatments 150 based on input received from an occupant of the area. For example, the occupant may be a user of the mobile device 190 (e.g., via an app running on the mobile device 190). The user may adjust the operation of a glare prevention procedure via a glare maintenance procedure. The mobile device 190 may display a user interface through which the user may perform the glare maintenance procedure. For example, the glare prevention procedure may be an automated procedure that may be used to prevent glare based on the detection of a glare condition using an image of an area. The glare condition may be detected by comparing the luminance of one or more pixels the image (e.g., the luminance of the pixel or group of pixels having high luminance in the image) to a first threshold value and/or by comparing the total illuminance of the image (e.g., the sum of the illuminance of the pixels in the image) to a second threshold value. The glare maintenance procedure may be initiated by an occupant of the area (e.g., a user of the mobile device 190) when a glare problem exists after the glare prevention procedure is performed.

For example, the mobile device 190 may receive the input from the user after the glare prevention procedure is performed. The input from the user may indicate that the glare prevention procedure did not perform appropriately, for example, to block and/or prevent a glare condition. For example, the input from the user may indicate that a glare problem exists after performing the glare prevention procedure. For example, the user may indicate that a glare condition remains after the glare prevention procedure is performed. The user may indicate that the user control environment is too bright after the glare prevention procedure is performed. The user may indicate that the user control environment is too dim after the glare prevention procedure is performed. The mobile device 190 (e.g., an app running on the mobile device 190) may prompt the user to select the type of glare problem via a display of the mobile device 190.

After receiving an indication of the type of the glare problem from the user, the system controller 110 may send control instructions to adjust the shade position of the window treatment fabric 152 of each of the motorized window treatments 150. For example, if a glare condition remains or if the user control environment is too bright, the system controller 110 may cause the shade positions of the motorized window treatments 150 to be lowered. If the user control environment is too dim, the system controller 110 may cause the shade positions of the motorized window treatments 150 to be raised. The system controller 110 may send the control instructions based on input from the user. For example, the mobile device 190 may prompt the user to raise or lower the shade positions of the motorized window treatments 150 until the glare problem is eliminated. After the shade positions of the motorized window treatments 150 have been raised or lowered, the mobile device 190 may prompt the user to indicate that the glare problem has been addressed.

Alternatively or additionally, the glare maintenance procedure may be performed based on input of the occupant via the remote control device 170. For example, the remote control device 170 may include one or more buttons that the occupant may press in order to initiate the glare maintenance procedure and/or move the shade position up or down. The remote control device 170 may receive the input from the occupant and may transmit corresponding messages to the motorized window treatment (e.g., via the system controller 110). The messages may include control instructions that instruct the motorized window treatment to raise or lower the shade position. The occupant may indicate that they have finished adjusting the shade position by pressing an adjustment button on the remote control device (e.g., to initiate the glare maintenance procedure).

As described herein, the glare maintenance procedure may be performed if a glare prevention procedure is undercompensating and/or overcompensating for a glare condition. For example, the glare maintenance procedure may be performed if a glare problem exists after a glare prevention procedure has been performed. The glare problem may be, for example, that the user is seeing a luminance-based glare condition (e.g., a direct luminance glare condition), that the user is experiencing a bright view condition (e.g., an illuminance-based glare condition), and/or that the user would like to increase the view to see more of the outdoors through the window (e.g., the user is not experiencing a glare condition). For example, the glare maintenance procedure may be performed when a luminance-based glare condition and/or a bright view condition is present in an image looking out from the window, but the second visible light sensor 182 and/or the system controller 110 fails to lower the position of the motorized window treatment (e.g., because the glare condition is not detected). Alternatively, the glare maintenance procedure may be performed if the second visible light sensor 182 and/or the system controller 110 erroneously detects a glare condition when none exists and lowers the position of the motorized window treatment.

The existence of the glare problem may indicate that a threshold value (e.g., a luminance threshold value and/or an illuminance threshold value) used in the glare prevention procedure is inaccurate. After the glare maintenance procedure is performed, the threshold value may be updated via an update procedure. The update procedure may be performed based on the type of the glare problem and the adjusted shade position received from the user. The type of the glare problem may be determined based on, for example, input received from the user and/or an analysis of one or more images looking from the window. For example, if the glare problem is a luminance-based glare condition (e.g., a direct luminance glare condition), the mobile device 190 and/or the system controller may execute a luminance-based glare update procedure, which may result in a decreased luminance threshold. If the glare problem is a bright view condition (e.g., an illuminance-based glare condition), the mobile device 190 and/or the system controller may execute a bright view update procedure. The bright view update procedure may result in a decreased illuminance threshold, which may increase the likelihood of determining that a glare condition is detected when the glare prevention procedure is performed. If the glare problem is that the user would like an increased view through the windows, the mobile device 190 and/or the system controller may execute an increase view update procedure. The increase view update procedure may result in an increased luminance threshold and/or an increased illuminance threshold, which may decrease the likelihood of determining that a glare condition is detected when the glare prevention procedure is performed. The updated threshold value may be used for future instances of the glare prevention procedure.

The updated threshold value may be stored in a profile associated with the user in a memory of the mobile device 190 and/or the system controller 110. For future instances of the glare prevention procedure, the system controller 110 and/or the second visible light sensor 182 may determine that the user is in the area, and may access the profile associated with the user. The system controller 110 and/or the second visible light sensor 182 may use the updated threshold value stored in the profile as part of the glare prevention procedure.

The second visible light sensor 182 and/or the system controller 110 may be configured to determine when to control the motorized window treatments 150 based on the change in the position of the motorized window treatments 150. For example, when the command to control one of the motorized window treatments 150 causes the motorized window treatment to be lowered to block a glare source and/or to prevent a glare condition, the second visible light sensor 182 and/or the system controller 110 may be configured to control the motorized window treatments with a minimum delay period (e.g., zero second, such that the motorized window treatments are immediately lowered to prevent the glare condition). When the command to control the motorized window treatment 150 causes the motorized window treatment to be raised (e.g., to provide more view to the user), the second visible light sensor 182 and/or the system controller 110 may be configured to control the motorized window treatments with a raise delay period (e.g., a raise timeout) since the last movement of the motorized window treatment. For example, the raise delay period may be approximately 30 minutes.

The operation of the load control system 100 may be programmed and configured using, for example, the mobile device 190 or other computing device (e.g., when the mobile device is a personal computing device). The mobile device 190 may execute a graphical user interface (GUI) configuration software for allowing a user 192 to program how the load control system 100 will operate. For example, the configuration software may run as a PC application or a web interface. The configuration software and/or the system controller 110 (e.g., via instructions from the configuration software) may generate the system configuration data that may include the load control dataset that defines the operation of the load control system 100. For example, the load control dataset may include information regarding the operational settings of different load control devices of the load control system (e.g., the lighting control device 120, the plug-in load control device 140, the motorized window treatments 150, and/or the thermostat 160). The load control dataset may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Pat. No. 10,027,127, issued Jul. 17, 2018, entitled COMMISSIONING LOAD CONTROL SYSTEMS, the entire disclosure of which is hereby incorporated by reference.

The operation of the visible light sensors 180, 182 may be programmed and configured using the mobile device 190 or other network device. Each visible light sensor 180, 182 may comprise a second communication circuit for transmitting and receiving the RF signals 109 (e.g., directly with the network device 190 using a standard protocol). During the configuration procedure of the load control system 100, the visible light sensors 180, 182 may each be configured to record an image of the space and transmit the image to the network device 190 (e.g., directly to the network device via the RF signals 109 using the standard protocol). The network device 190 may display the image on the visual display and a user may configure the operation of each visible light sensor 180, 182 to set one or more configuration parameters (e.g., configuration information) of the visible light sensor. For example, for different environmental characteristics to be sensed and controlled by the visible light sensors 180, 182 (e.g., occupant movements, light level inside of the room, daylight level outside of the room), the user may indicate different regions of interest on the image by tracing (such as with a finger or stylus) masked areas on the image displayed on the visual display. The visible light sensors 180, 182 may each be configured to establish different masks and/or operational characteristics depending upon the environmental characteristic to be sensed (e.g., occupant movements, light level inside of the room, daylight level outside of the room, color temperature, etc.).

After configuration of the visible light sensors 180, 182 is completed at the network device 190, the network device may transmit configuration information to the visible light sensors (e.g., directly to the visible light sensors via the RF signals 109 using the standard protocol). The visible light sensors 180, 182 may each store the configuration information in memory, such that the visible light sensors may operate appropriately during normal operation. For example, for each sensor event the visible light sensors 180, 182 are to monitor, the network device 190 may transmit to the respective visible light sensor the sensor mode for the event, one or more masks defining regions of interest for the event, possibly an indication of the algorithm to be used to sense the environmental characteristic of the event, and one or more operational characteristics for the event.

While the load control system 100 of FIG. 1 has been described above with reference to two visible light sensors 180, 182, the load control system 100 could also simply include either one of the visible light sensors 180, 182. For example, the load control system 100 may not include the first visible light sensor 180 and may only include the second visible light sensor 182, which may be mounted to the window 104 and may operate to prevent sun glare from occurring on a task surface in the room 102. In addition, the load control system 100 may have more than two visible light sensors. Each window may have a respective visible light sensor, or a visible light sensor may receive an image through a window that is representative of a group of windows having motorized window treatments that are collectively controlled based on the image of a single visible light sensor.

Figure 2:
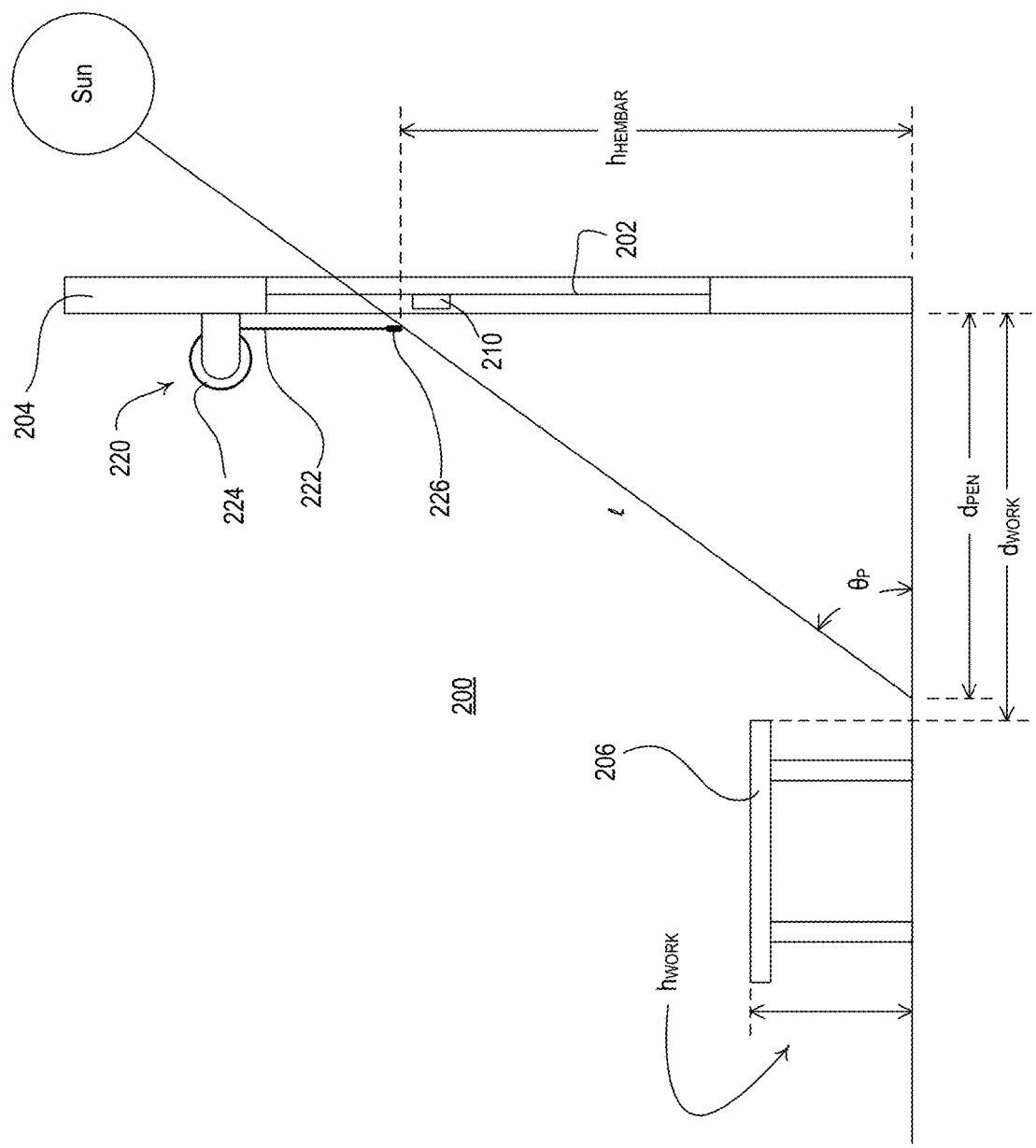
FIG. 2 is a side view of an example space in a load control environment.

FIG. 2 is a simplified side view of an example space 200 having a visible light sensor 210 (e.g., such as the visible light sensor 182 of the load control system 100 shown in FIG. 1). The visible light sensor 210 may be mounted to a window 202, which may be located in a façade 204 of a building in which the space 200 is located and may allow light (e.g., sunlight) to enter the space. The visible light sensor 210 may be mounted to an inside surface of the window 202 (e.g., as shown in FIG. 2) or an outside surface of the window 202. The window 202 may be characterized by a height $h_{WIN-BOT}$ of the bottom of the window and a height $h_{WIN-TOP}$ of the top of the window. The space 200 may also comprise a work surface, e.g., a table 206, which may have a height $h_{WORK}$ and may be located at a distance $d_{WORK}$ from the window 202.

A motorized window treatment, such as a motorized roller shade 220 may be mounted over the window 202. The motorized roller shade 220 may comprise a roller tube 222 around which a shade fabric 224 may be wrapped. The shade fabric 224 may have a hembar 226 at the lower edge of the shade fabric that may be a height $h_{HEMBAR}$ above the floor. The motorized roller shade 220 may comprise a motor drive unit (not shown) that may be configured to rotate the roller tube 222 to move the shade fabric 224 between a fully-raised position $P_{FULLY-RAISED}$ (e.g., a fully-open position at which the window 202 is not covered and the hembar 226 may be at the top of the window) and a fully-lowered position $P_{FULLY-LOWERED}$ (e.g., a fully-closed position at which the window 202 is fully covered and the hembar 226 may be at the bottom of the window). Further, the motor drive unit may control the position of the shade fabric 222 to one of a plurality of preset positions between the fully-raised position and the fully-lowered position.

A glare condition for an occupant of the room 200 may be caused by a glare source, such as the sun, an external lamp (e.g., an outdoor building light or a streetlight), or a reflection of the sun or other bright light source, that may be located outside of the window 202. For example, light from the glare source may shine through the window 202 into the room 200 and may extend into the room (e.g., onto the floor) for a penetration distance $d_{PEN}$ from the window 202 and/or from the façade 204. The penetration distance $d_{PEN}$ of the light may be measured in a direction normal to the window 202 and/or from the façade 204. The penetration distance $d_{PEN}$ of the light from the glare source may be a function of the height $h_{HEMBAR}$ of the hembar 226 of the motorized roller shade 220 and a profile angle $\theta_P$ of the glare source. The profile angle $\theta_P$ may represent the position of the glare source outside of the window 202. The position of the glare source may be defined by an altitude angle (e.g., a vertical angle) and an azimuth angle (e.g., a horizontal angle) from the center of view of the visible light sensor 210 (e.g., a direction perpendicular to the window 202 and/or the façade 204. The profile angle $\theta_P$ may be defined as an angle of a projection of the line from the glare source to the visible light sensor onto a vertical plane that is perpendicular to the window 202 and/or the façade 204. The penetration distance $d_{PEN}$ of light from the glare source onto the floor of the space 200 (e.g., in the direction normal to the window 202 and/or the façade 204) may be determined by considering a triangle formed by the penetration distance $d_{PEN}$, the height $h_{HEMBAR}$ of the hembar 226, and a length $\ell$ of the light shining into the space 200 in the normal direction to the window 202, as shown in the side view of the window 202 in FIG. 2, e.g., $$\tan(\theta_P) = h_{HEMBAR}/d_{PEN}. \quad \text{(Equation 1)}$$

In response to the visible light sensor 210 detecting a glare source outside of the window 202, the visible light sensor 210 and/or a system controller (e.g., the system controller 110) may be configured to determine a position to which to control the shade fabric 224 (e.g., the hembar 226 of the shade fabric 224) of the motorized roller shade 220 to prevent a glare condition in the space. For example, the position of the hembar 226 of the motorized roller shade 220 may be adjusted to prevent the penetration distance $d_{PEN}$ from exceeding a maximum penetration distance $d_{PEN-MAX}$. For example, if the sun is shining in the window 220, the visible light sensor 210 may be configured to process the image to determine the profile angle $\theta_S$ that defines the location of the glare source. The visible light sensor 210 and/or the system controller may be configured to calculate the desired height $h_{HEMBAR}$ above the floor to which to control the hembar 226 to prevent the light from the glare source from exceeding the maximum penetration distance $d_{PEN-MAX}$, e.g., $$h_{HEMBAR} = \tan(\theta_P) \cdot d_{PEN-MAX}. \quad \text{(Equation 2)}$$

The visible light sensor 210 and/or the system controller may be configured with values for the top and bottom heights $h_{WIN-TOP}$, $h_{WIN-BOT}$ of the window 220, e.g., during configuration of the visible light sensor and/or the system controller. The visible light sensor 210 and/or the system controller may be configured to determine a desired position of the hembar 226 between the fully-raised position $P_{FULLY-RAISED}$ and the fully-lowered position $P_{FULLY-LOWERED}$ of the motorized roller shade 220 using the top and bottom heights $h_{WIN-TOP}$, $h_{WIN-BOT}$ and the calculated height $h_{HEMBAR}$ of the hembar.

In addition, the position of the hembar 226 of the motorized roller shade 220 may be adjusted to prevent light from the glare source from shining on the table 206. For example, the visible light sensor 210 and/or the system controller may be configured to calculate the desired height $h_{HEMBAR}$ above the floor to which to control the hembar 226 to prevent the light from the glare source from shining on the table 206, e.g., $$h_{HEMBAR} = (\tan(\theta_P) \cdot d_{WORK}) + h_{WORK}. \quad \text{(Equation 3)}$$

The position of the hembar 226 of the motorized roller shade 220 may be adjusted to prevent light from the glare source from shining on in the eyes of occupants of the space 200. For example, the visible light sensor 210 and/or the system controller may be configured to calculate the desired height $h_{HEMBAR}$ above the floor to which to control the hembar 226 based on an estimated height of the occupant's eyes and/or an estimated distance of the occupants from the window. For example, if the room 200 includes a visible light sensor located within the room (e.g., as the visible light sensor 180 of the load control system 100 of FIG. 1), that visible light sensor may be configured to process an image of the room to determine the values for the height of the occupant's eyes and/or the distance of the occupants from the window.

The visible light sensor 210 and/or the system controller may store values for the maximum penetration distance $d_{PEN-MAX}$, the height $h_{WORK}$ of the table 206, and the distance $d_{WORK}$ of the table 206 from the window 202. For example, the visible light sensor 210 and/or the system controller may be configured with these values during the configuration of the visible light sensor 210 and/or the system controller (e.g., using the mobile device 190 or other network device). Additionally or alternatively, the visible light sensor 206 and/or the system controller may be configured with default values for the maximum penetration distance $d_{PEN-MAX}$, the height $h_{WORK}$ of the table 206, and the distance $d_{WORK}$ of the table 206 from the window 202. For example, if the room 200 includes a visible light sensor located within the room (e.g., as the visible light sensor 180 of the load control system 100 of FIG. 1), that visible light sensor may be configured to process an image of the room to determine the values for the maximum penetration distance $d_{PEN-MAX}$, the height $h_{WORK}$ of the table 206, and the distance $d_{WORK}$ of the table 206 from the window 202, and transmit those values to the visible light sensor 210 on the window 202 and/or the system controller.

Figure 3:
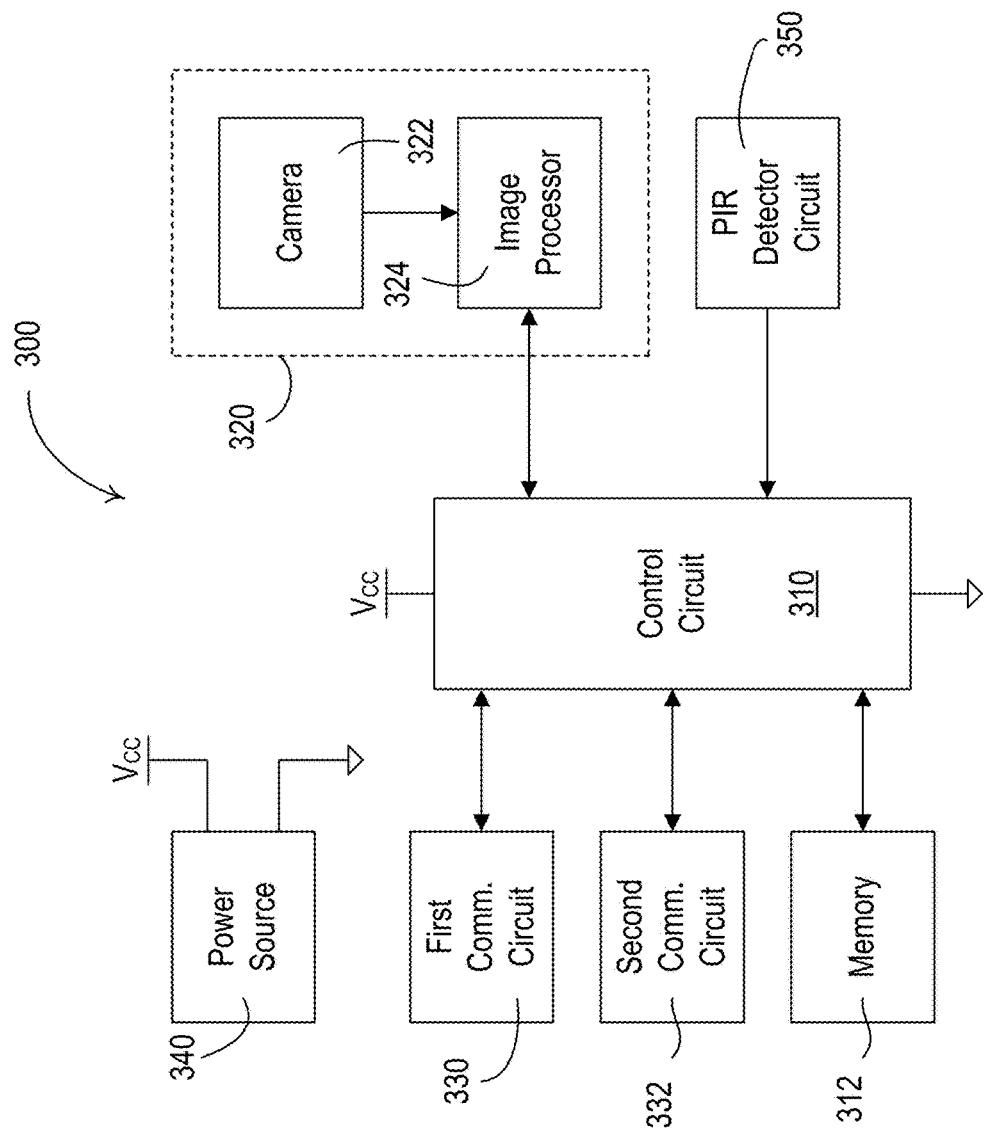
FIG. 3 is a block diagram of an example visible light sensor.

FIG. 3 is a simplified block diagram of an example visible light sensor 300, which may be deployed as one or both of the visible light sensors 180, 182 of the load control system 100 shown in FIG. 1 and/or the visible light sensor 210 of FIG. 2. The visible light sensor 300 may comprise a control circuit 310, for example, a microprocessor, a programmable logic device (PLD), a microcontroller, an application specific integrated circuit (ASIC), a field-programmable gate array (FPGA), or any suitable processing device. The control circuit 310 may be coupled to a memory 312 for storage of sensor events, masks, operational characteristics, etc. of the visible light sensor 300. The memory 312 may be implemented as an external integrated circuit (IC) or as an internal circuit of the control circuit 310. The memory 312 may comprise a computer-readable storage media or machine-readable storage media that maintains a device dataset of associated device identifiers, network information, and/or computer-executable instructions for performing as described herein. For example, the memory 312 may comprise computer-executable instructions or machine-readable instructions that include one or more portions of the procedures described herein. For example, the computer-executable instructions or machine-readable instructions may, when executed, cause the control circuit 310 to perform one or more of the procedures 700, 800, 850, 900, 1000, 1100, 1300, 1400, 1600, 1700, 1900, and/or 2100.

The visible light sensor 300 may comprise a visible light sensing circuit 320 having an image recording circuit, such as a camera 322, and an image processing circuit, such as a processor 324. The image processor 324 may comprise a digital signal processor (DSP), a microprocessor, a programmable logic device (PLD), a microcontroller, an application specific integrated circuit (ASIC), a field-programmable gate array (FPGA), or any suitable processing device. The camera 322 may be positioned towards a space in which one or more environmental characteristics are to be sensed in a space (e.g., into the room 102). The camera 322 may be configured to capture or record an image. For example, the camera 322 may be configured to capture images at a particular sampling rate, where a single image may be referred to as a frame acquisition. One example frame acquisition rate is approximately ten frames per second. The frame acquisition rate may be limited to reduce the required processing power of the visible light sensor. Each image may consist of an array of pixels, where each pixel has one or more values associated with it. A raw RGB image may have three values for each pixel: one value for each of the red, green, and blue intensities, respectively. One implementation may use the existing RGB system for pixel colors, where each component of the intensity has a value from 0-255. For example, a red pixel would have an RGB value of (255, 0, 0), whereas a blue pixel would have an RGB value of (0, 0, 255). Any given pixel that is detected to be a combination of red, green, and/or blue may be some combination of (0-255, 0-255, 0-255). One will recognize that over representations for an image may be used.

The camera 322 may provide the captured image (e.g., a raw image) to the image processor 324. The image processor 324 may be configured to process the image and provide to the control circuit 310 one or more sense signals that are representative of the sensed environmental characteristics (e.g., an occurrence of movement, an amount of movement, a direction of movement, a velocity of movement, a counted number of occupants, a light intensity, a light color, an amount of direct sunlight penetration, etc.). For example, the one or more sense signals provided to the control circuit 310 may be representative of movement in the space and/or a measured light level in the space.

In addition, the image processor 324 may provide a raw image or a processed (e.g., preprocessed) image to the control circuit 310, which may be configured to process the image to determine sensed environmental characteristics. Regardless, the control circuit 310 may then use the sensed environmental characteristics to transmit control commands to load devices (e.g., directly or through system controller 110).

One example of a processed image, as is known in the art, is an HDR image, which may include the luminance of a pixel in the data of the image. The luminance of the pixel may be measured from an LDR image RGB by adding R, G, B intensity values, weighted according to the following formula:

$$\text{Luminance (perceived)} = (0.299*R + 0.587*G + 0.114*B). \quad \text{(Equation 4)}$$

The example weighting coefficients may factor in the non-uniform response of the human eye to different wavelengths of light. However, other coefficients may alternatively be used.

Figure 4A:
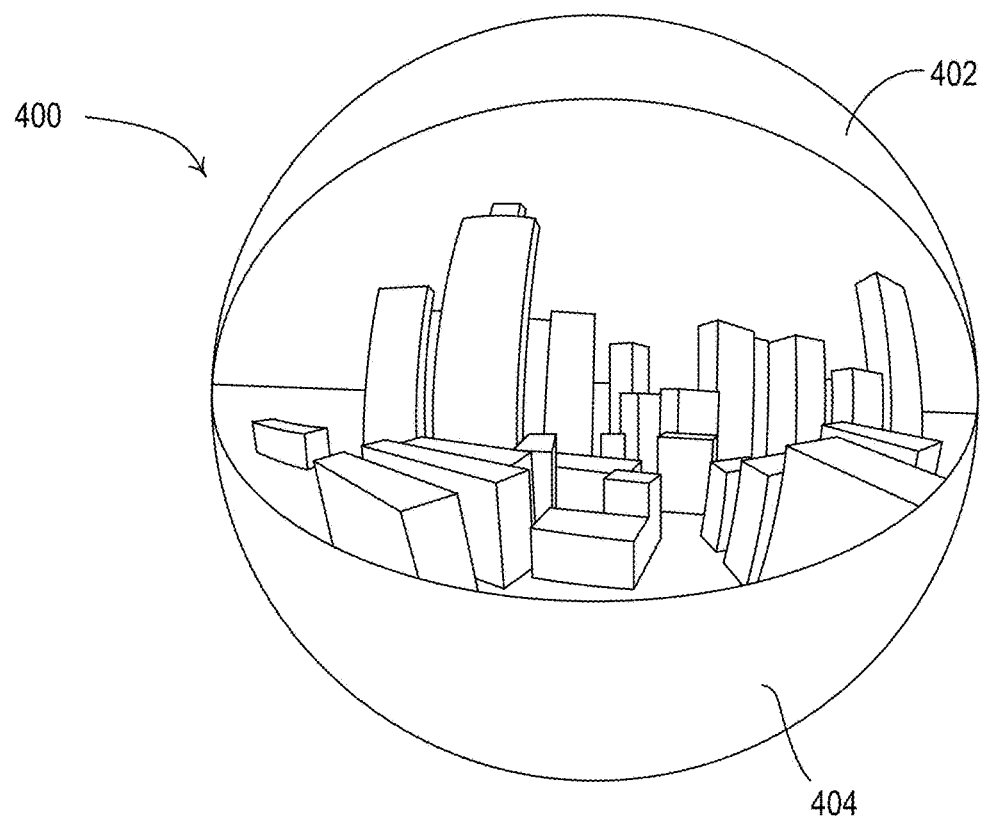
FIG. 4A shows an example of a warped image.
Figure 4B:
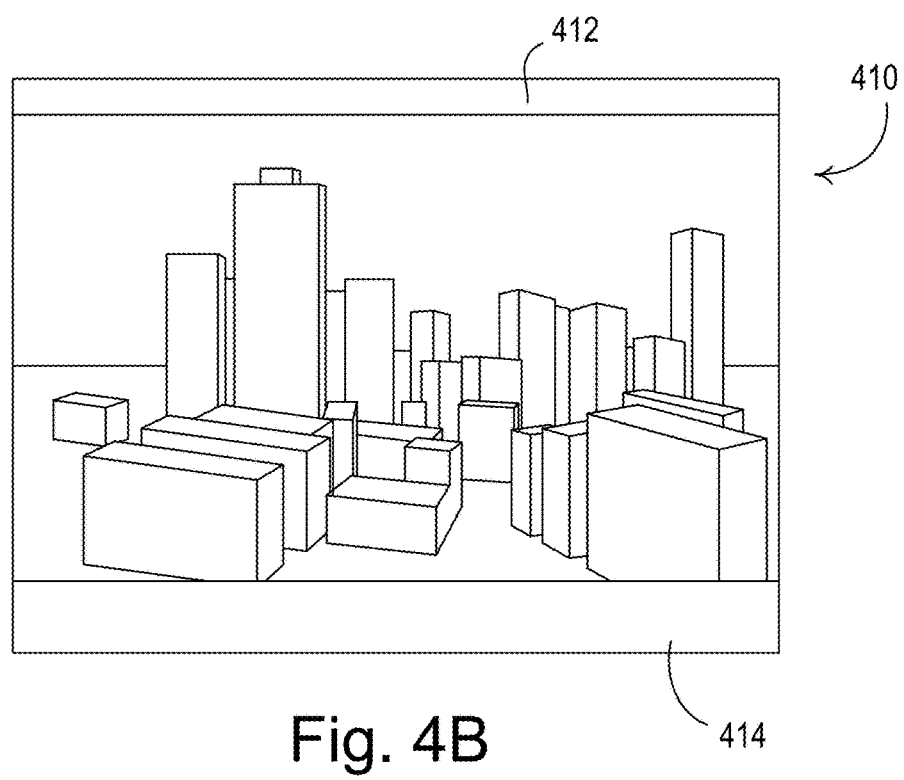
FIG. 4B shows an example of a non-warped image.

If the visible light sensor 300 have a fish-eye lens, the image captured by the camera 322 may be a warped image 400, for example, as shown in FIG. 4A. The image processor 324 may be configured to preprocess the image to de-warp the image and to generate a non-warped image 410, for example as in FIG. 4B. As shown in FIG. 4A, the warped image 400 may include a head area 402 located above the window on which the visible light sensor 300 is located, and a sill area 404 located below the window. As shown in FIG. 4B, the non-warped image 410 may include a head area 412 located above the window on which the visible light sensor 300 is located, and a sill area 414 located below the window. While not shown in FIG. 4A, the warped image 400 and the non-warped image 410 may each comprise respective jamb areas located at one or both of the sides of the window on which the visible light sensor 300 is located.

Another image processing technique may include mapping the RGB sensor response to CIE tristimulus values to acquire chromaticity coordinates and thereby the Correlated Color Temperature (CCT). An example method is described by Joe Smith in the following reference: *Calculating Color Temperature and Illuminance using the TAOS TCS3414CS Digital Color Sensor, Intelligent Opto Sensor Designer's Notebook*, Feb. 27, 2009. Another example of a processed image may be an image to which a digital filter, or a digital mask has been applied. A digital mask may be used to eliminate regions within the image, which may not have value for further analysis and processing. Alternatively, a complement of a digital mask may be a region of interest (e.g., an area within an image that has been identified for further processing or analysis). A processed image may also be created via a technique known as background subtraction. For example, using background subtraction, a background image, which may incorporate the history of the image over time (e.g., the previous state of the room), may be subtracted from the present image (e.g., the current state of the room). This technique may identify differences in the images. Background subtraction may be useful for detecting movement in an image and for occupancy and vacancy detection. Various algorithms may be used for background maintenance, to determine how to effectively combine pixels over time into the background image. Some example background maintenance algorithms may include: adjusted frame difference, mean and threshold, mean and covariance, mixture of Gaussians, and normalized block correlation. These and other similar details inherent to image processing would be familiar to one skilled in the art.

The control circuit 310 and/or the image processor 324 may be configured to apply one or more masks to focus on one or more regions of interest in the image (e.g., the raw image and/or the preprocessed image) to sense one or more environmental characteristics of the space. As used herein, a mask may be any definition to define a region of interest of an image. For example, assuming an image may be defined as an N×M array of pixels where each pixel has a defined coordinate/position in the array, a mask be defined as a sequence of pixel coordinates that define the outer perimeter of a region of interest within the image. As another example, a mask may be defined as an N×M array that corresponds to the N×M array of pixels of an image. Each entry of the mask may be a 1 or 0, for example, whereby entries having a 1 may define the region of interest. Such a representation may allow an image array and a mask array to be "ANDED," which may cancel or zero out all pixels of the image that are not of interest. As another alternative, rather than a mask defining the region of interest of the image, a mask may define the region that is not of interest. These are merely examples and other representations may be used.

For example, the image captured by the camera 332 may include portions on the sides of the image that have an obstructed view. For example, there may be a window landing at the bottom of the window and/or an overhang at the top of the window that may obstruct the view of the camera 332 (e.g., as shown in FIGS. 4A and 4B). While not shown in FIGS. 4A and 4B, the image may have obstructed areas on the sides of the window. Since the obstructed areas may not have glare sources, there is no need for the image processor 334 to process the pixels in the obstructed areas. Accordingly, the control circuit 310 and/or the image processor 324 may be configured to apply respective masks to the top and bottom obstructed areas. For example, the control circuit 310 and/or the image processor 334 may be configured to focus a region of interest (e.g., a field of view of the image) as shown in FIGS. 4A and 4B.

Figure 4C:
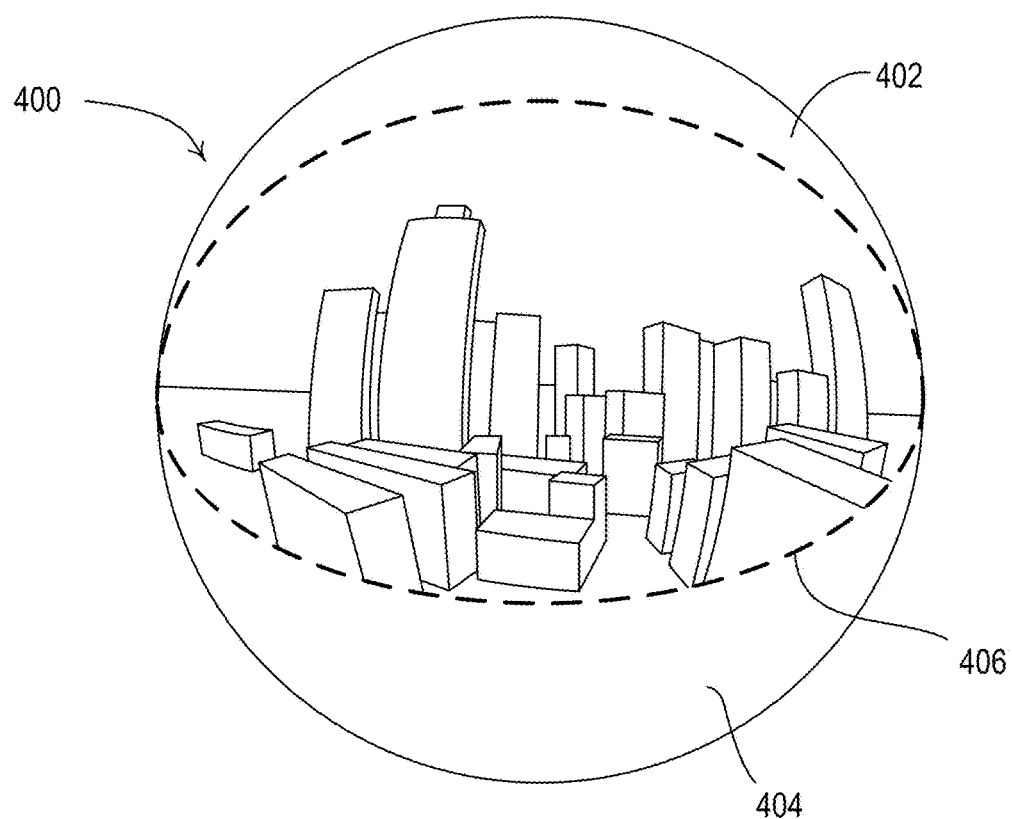
FIG. 4C shows an example of a warped image illustrating a region of interest.
Figure 4D:
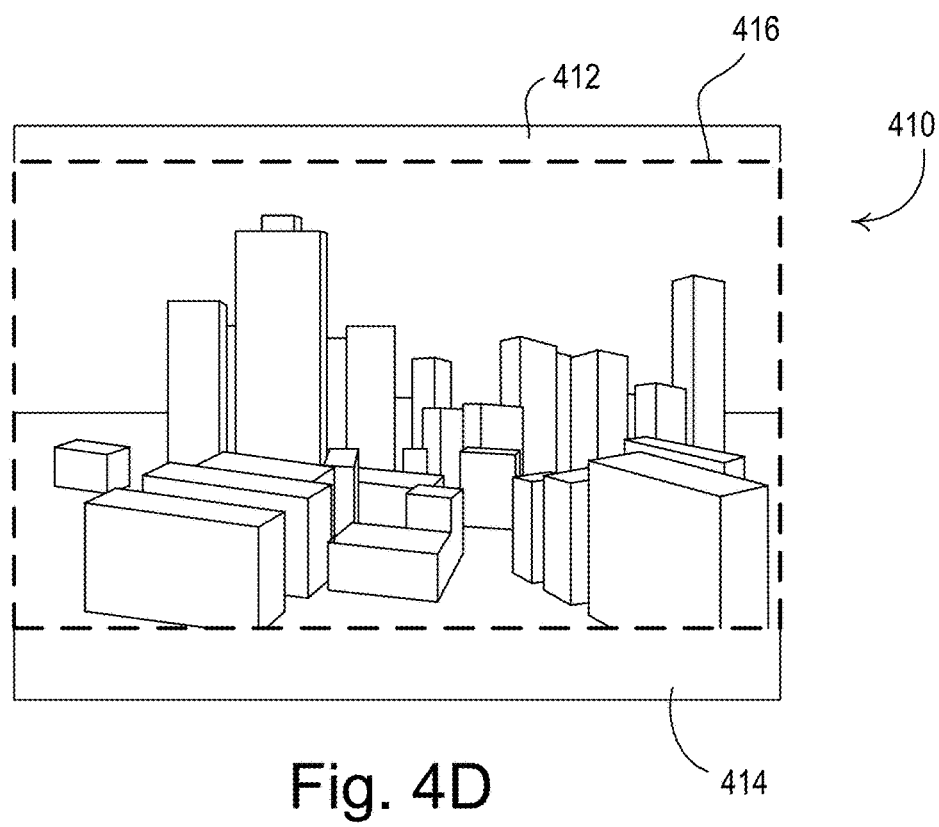
FIG. 4D shows an example of a non-warped image illustrating a region of interest.

The control circuit 310 may be configured to use regions of interest 406, 416 shown in FIGS. 4C and 4D, respectively, to detect a luminance-based glare condition and/or an illuminance-based glare condition. When processing the warped image 400, the control circuit 310 may use the region of interest 406 that has curved upper and lower bounds (e.g., as shown in FIG. 4C) to detect the luminance-based glare condition and/or the illuminance-based glare condition. For example, the region of interest 406 may have an upper bound to exclude the head area 402 and a lower bound to exclude the sill area 404. While not shown in FIG. 4C, the region of interest 406 may be configured to have side bounds to exclude the jamb areas at the sides of the window. When processing the non-warped image 410, the control circuit 310 may use the region of interest 416 that may be rectangularly shaped (e.g., having straight bounds as shown in FIG. 4D) to detect the luminance-based glare condition and/or the illuminance-based glare condition. For example, the region of interest 416 may have an upper bound to exclude the head area 412 and a lower bound to exclude the sill area 414. While not shown in FIG. 4D, the region of interest 416 may be configured to have side bounds to exclude the jamb areas at the sides of the window.

Figure 4E:
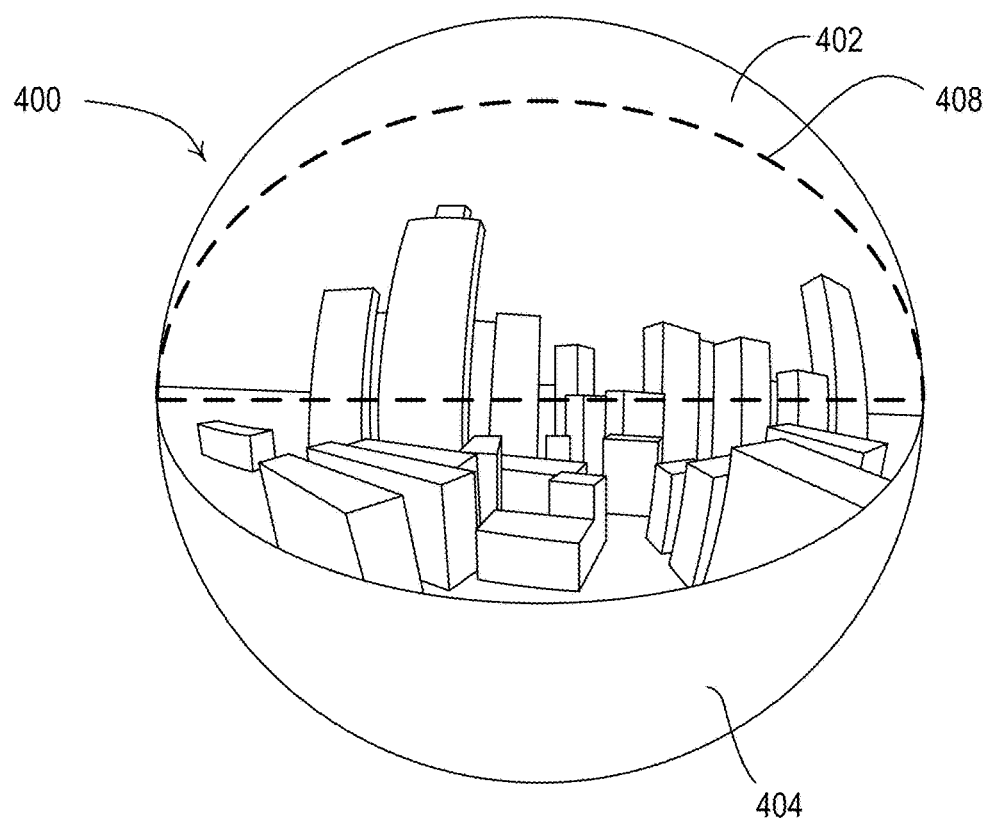
FIG. 4E shows another example of a warped image illustrating a region of interest.
Figure 4F:
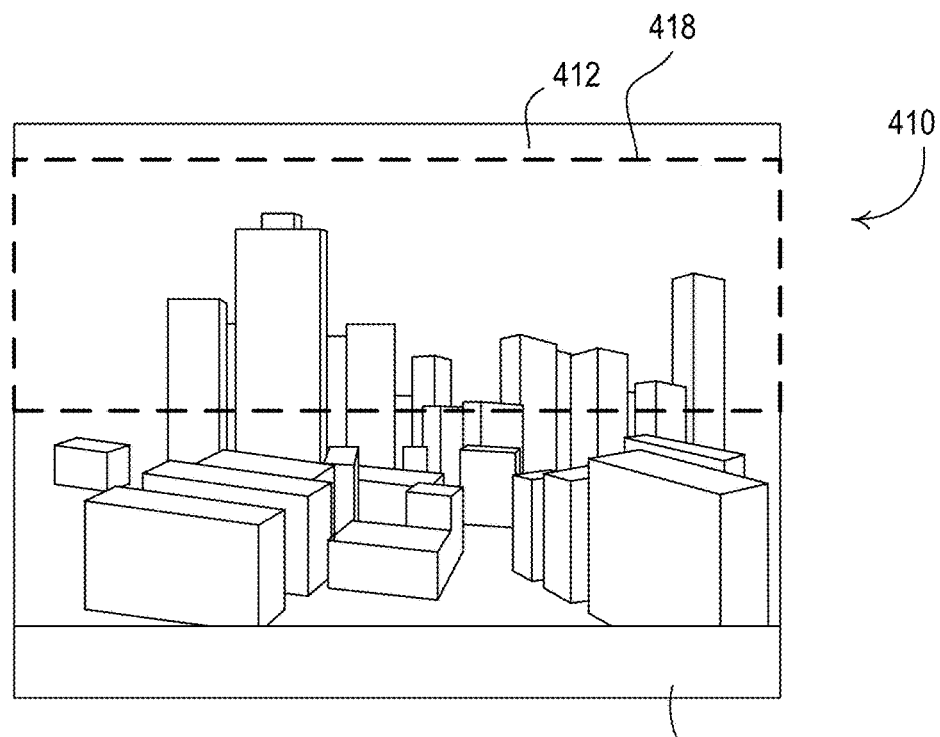
FIG. 4F shows another example of a non-warped image illustrating a region of interest.

The control circuit 310 may be configured to use regions of interest 408, 418 shown in FIGS. 4E and 4F, respectively, to detect a window sill glare condition. When processing the warped image 400, the control circuit 310 may use the region of interest 408 that has curved upper and lower bounds (e.g., as shown in FIG. 4E) to detect the window sill glare condition. For example, the region of interest 408 may have an upper bound to exclude the head area 402 and a lower bound located at the center of the warped image 400 (e.g., the horizon line). While not shown in FIG. 4E, the region of interest 408 may be configured to have side bounds to exclude the jamb areas at the sides of the window. When processing the non-warped image 410, the control circuit 310 may use the region of interest 418 that may be rectangularly shaped (e.g., having straight bounds as shown in FIG. 4F) to detect the window sill glare condition. For example, the region of interest 418 may have an upper bound to exclude the head area 412 and a lower bound located at the center of the non-warped image 410 (e.g., the horizon line). While not shown in FIG. 4F, the region of interest 418 may be configured to have side bounds to exclude the jamb areas at the sides of the window.

The visible light sensor 300 may comprise a first communication circuit 330 configured to transmit and receive messages via a first communication link using a first protocol. For example, the first communication link may comprise a wireless communication link and the first communication circuit 330 may comprise an RF transceiver coupled to an antenna. In addition, the first communication link may comprise a wired digital communication link and the first communication circuit 330 may comprise a wired communication circuit. The first protocol may comprise a proprietary protocol. The control circuit 310 may be configured to transmit and receive messages via the first communication link during normal operation of the visible light sensor 300. The control circuit 310 may be configured to transmit an indication of the sensed environmental characteristic via the first communication link during normal operation of the visible light sensor 300. For example, the control circuit 310 may be configured to transmit an indication of a detected state (e.g., an occupancy or vacancy condition) and/or a measured environmental characteristic (e.g., a measured light level) via the first communication link during normal operation of the visible light sensor 300.

The visible light sensor 300 may comprise a second communication circuit 332 configured to transmit and receive messages via a second communication link using a second protocol. For example, the second communication link may comprise a wireless communication link and the second communication circuit 332 may comprise an RF transceiver coupled to an antenna. In addition, the second communication link may comprise a wired digital communication link and the second communication circuit 332 may comprise a wired communication circuit. The second protocol may comprise a standard protocol. The control circuit 310 may be configured to transmit and receive messages via the second communication link during configuration of the visible light sensor 300. For example, the control circuit 310 may be configured to transmit an image recorded by the camera 322 via the second communication link during configuration of the visible light sensor 300.

The visible light sensor 300 may comprise a power source 340 for producing a DC supply voltage $V_{CC}$ for powering the control circuit 310, the memory 312, the image processor 324, the first and second communication circuits 330, 332, and other low-voltage circuitry of the visible light sensor 300. The power source 340 may comprise a power supply configured to receive an external supply voltage from an external power source (e.g., an AC mains line voltage power source and/or an external DC power supply). In addition, the power source 340 may comprise a battery for powering the circuitry of the visible light sensor 300.

The visible light sensor 300 may further comprise a low-power occupancy sensing circuit, such as a passive infrared (PIR) detector circuit 350. The PIR detector circuit 350 may generate a PIR detect signal $V_{PIR}$ (e.g., a low-power occupancy signal) that is representative of an occupancy and/or vacancy condition in the space in response to detected passive infrared energy in the space. The PIR detector circuit 350 may consume less power than the visible light sensing circuit 320. However, the visible light sensing circuit 320 may be more accurate than the PIR detector circuit 350. For example, when the power source 340 is a battery, the control circuit 310 may be configured to disable the visible light sensing circuit 320 and use the PIR detector circuit 350 to detect occupancy conditions. The control circuit 310 may disable the light sensing circuit 320, for example, when the space is vacant. The control circuit 310 may detect an occupancy condition in the space in response to the PIR detect signal $V_{PIR}$ and may subsequently enable the visible light sensing circuit 320 to detect a continued occupancy condition and/or a vacancy condition. The control circuit 310 may enable the visible light sensing circuit 320 immediately after detecting an occupancy condition in the space in response to the PIR detect signal $V_{PIR}$. The control circuit 310 may also keep the visible light sensing circuit 320 disabled after detecting an occupancy condition in the space (in response to the PIR detect signal $V_{PIR}$). The control circuit 310 may keep the visible light sensing circuit 320 disabled until the PIR detect signal $V_{PIR}$ indicates that the space is vacant. The control circuit 310 may not make a determination that the space is vacant until the visible light sensing circuit 320 subsequently indicates that the space is vacant.

When the visible light sensor 300 is mounted to a window (e.g., as the visible light sensor 180 of the load control system of FIG. 1), the control circuit 310 may be configured to record one or more images of the space outside of the window via the camera 322 and process the one or more images to determine if a glare condition exists. The visible light sensor 300 may comprise a fish-eye lens (not shown), which may cause the images recorded by the camera 322 to be warped. The control circuit 310 and/or the image processor 324 may be configured to de-warp the images recorded by the camera 322 to produce non-warped images, which may be characterized by rows of constant profile angle.

The control circuit 310 may be configured to process each pixel of the non-warped images to determine if a glare conditions exists for each pixel. The control circuit 310 may begin processing the image at a portion of the image which may be relative to a position on a window or group of windows from which the image is taken. For example, the portion of the image may represent a bottom portion of the window and the control circuit may begin processing the non-warped image at the bottom portion. The bottom portion may include a predefined number of pixel rows from the bottom of the image (e.g., a bottom row of pixels in the non-warped image). The control circuit may also, or alternatively, begin processing the image from a top portion (e.g., a top row of pixels) of the image. The portion of the image that is processed first may depend on the direction from which the motorized window treatment moves the covering material to close the covering material and/or the current position of the covering material to reduce the processing resources utilized to identify a glare condition in the image.

The control circuit 310 may be configured to start at the bottom row of pixels of the non-warped image (e.g., at the left or right side). The control circuit 310 may step through each pixel in the bottom row and process each pixel to determine if a glare condition exists before moving up to the next row. After the control circuit 310 determines that a glare condition exists, the control circuit 310 may stop processing the non-warped image and may operate to control one or more motorized window treatments (e.g., such as the motorized window treatments 140 of FIG. 1 and/or the motorized roller shade 220 of FIG. 2) to remove the glare condition (e.g., as will be described in greater detail below). This may prevent the rest of the image from being processed to detect the glare condition. If the control circuit 310 processes the entire image without detecting a glare condition, the control circuit may conclude that no glare conditions exist and may control the motorized window treatment to open. Since the control circuit 310 processes the pixels of the non-warped image starting at the bottom row of the non-warped image, the control circuit 310 may find the lowest pixel that indicates a glare source before detecting other higher glare sources. The lowest pixel that indicates a glare source is an important parameter for determining the shade position to which to control the motorized window treatments to prevent glare on the task surface. This allows allow the control circuit 310 to minimize the amount of processing that is needed to determine the shade control command to prevent glare in the room.

When processing the non-warped images to determine if a glare condition exists, the control circuit 310 may be configured to determine if an absolute glare condition exists and/or a relative glare condition (e.g., a contrast glare condition) exists. The control circuit 310 may be configured to determine that an absolute glare condition exists if a luminance $L_P$ (e.g., absolute intensity or light level) of a pixel exceeds an absolute glare threshold (e.g., approximately 10,000 cd/m$^2$). The control circuit 310 may be configured to determine that a relative glare condition exists if the luminance $L_P$ of a pixel as compared to a background luminance $L_B$ (e.g., the difference between the luminance $L_P$ of the pixel and the background luminance $L_B$) exceeds a relative glare threshold (e.g., approximately 4,000 cd/m$^2$). If the control circuit 310 detects that either an absolute glare condition exists or a relative glare condition exists, the control circuit may stop processing the non-warped image and move to control the motorized window treatment(s) to remove the glare condition. For example, the motorized window treatments(s) may remove the glare condition by determining a shade position based on the location of the glare condition. The thresholds may be adjustable to adjust a sensitivity of the visible light sensor 300. For example, the thresholds may be adjusted by a user during configuration of the visible light sensor 300.

To determine if a relative glare condition exists, the control circuit 310 may determine a background light level from the non-warped image (e.g., a baseline). The background light level may be a value representative of a luminance of the background of the non-warped image. For example, the background light level may be a percentile luminance of the non-warped image (e.g., a 25$^{th}$ percentile luminance). The 25$^{th}$ percentile luminance may be a luminance, where 25% of the pixels of the non-warped image are darker than the 25$^{th}$ percentile luminance. To detect the relative glare condition, the control circuit 310 may calculate a contrast ratio $C_P$ based on the luminance $L_P$ of a pixel and the 25$^{th}$ percentile luminance $L_{25}$ (e.g., $C_P=L_P/L_{25}$). If the contrast ratio $C_P$ is greater than a contrast threshold $C_{TH}$ (e.g., approximately 15), the control circuit may determine that a relative glare condition exists.

Examples of visible light sensors configured to detect absolute and relative glare conditions are described in greater detail in commonly-assigned U.S. Patent Application Publication No. 2018/0252035, published Sep. 6, 2018, entitled VISIBLE LIGHT SENSOR CONFIGURED FOR GLARE DETECTION AND CONTROLLING MOTORIZED WINDOW TREATMENTS, the entire disclosure of which is hereby incorporated by reference.

When the control circuit 310 has determined that a glare condition exists, the control circuit 310 may process the pixel to determine a profile angle of the glare source. For example, each pixel of the image may be characterized by a value of the profile angle. The values for the profile angle may be stored in the memory 312. The control circuit 310 may retrieve the appropriate profile angle based on the processed pixel. In addition, the profile angle may be determined and/or calculated from the data of the image. The control circuit 310 may determine a position to which to control the motorized window treatments using the profile angle (e.g., as shown in Equations 2 and/or 3 above). In addition, the control circuit 310 may transmit the profile angle to another device (e.g., the system controller 110), which may determine a position to which to control the motorized window treatments to avoid a glare condition in the room.

Figure 5A:
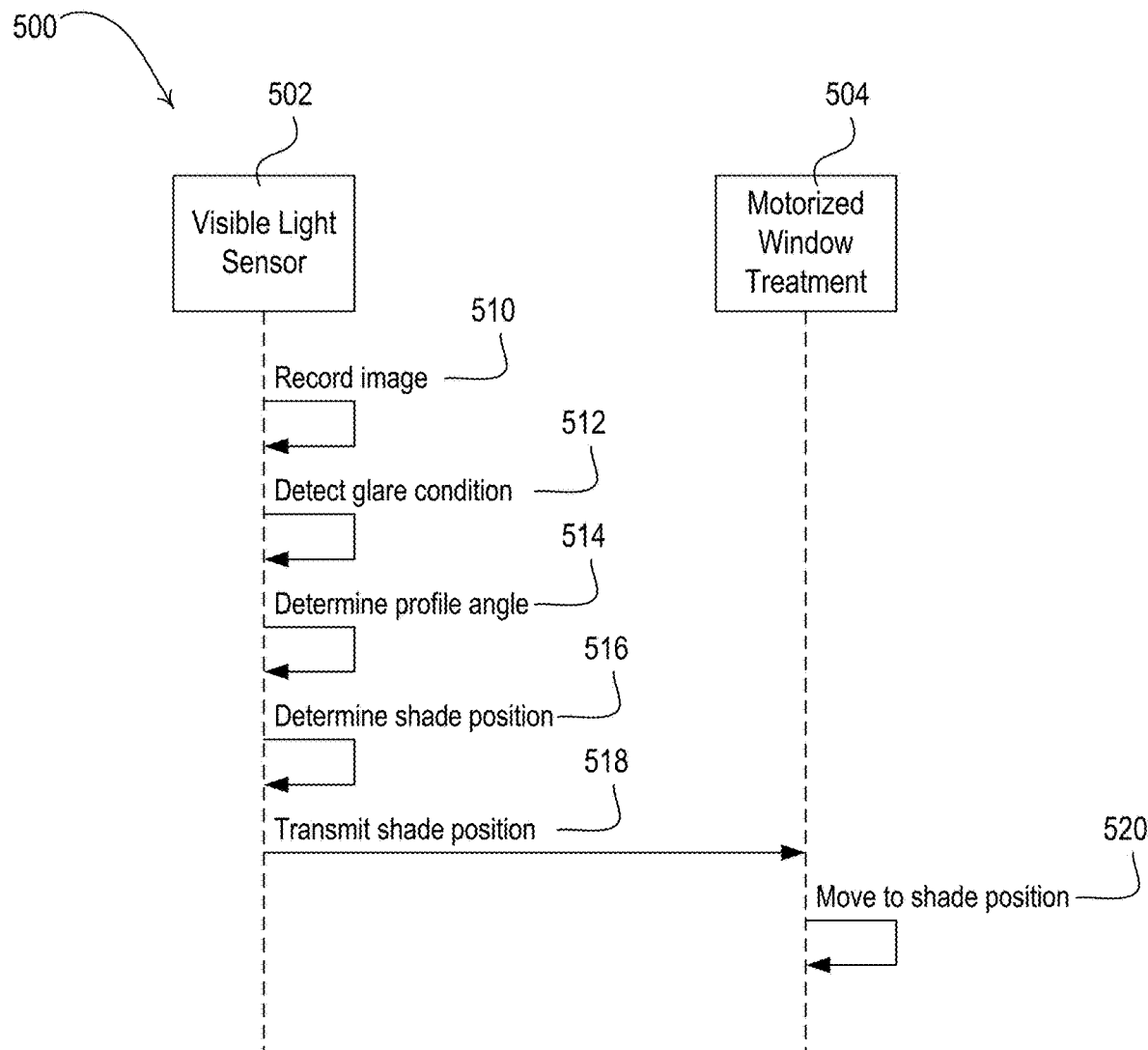
FIG. 5A is a sequence diagram of an example glare detection procedure that may be executed by a visible light sensor and a motorized window treatment.

FIG. 5A is a sequence diagram of an example glare prevention procedure 500. As seen in FIG. 5A the glare prevention procedure 500 may be performed by a visible light sensor 502 (e.g., the visible light sensors 180, 182, 210, 300) and a motorized window treatment 504 (e.g., the motorized roller shade 220). At 510, the visible light sensor 502 may record an image of the outside of a room and/or building. At 512, the visible light sensor may process the image to detect a glare condition. For example, the detection of a glare condition may include calculating the luminance $L_P$ of a pixel in the image and comparing them to luminance thresholds.

If a glare condition is detected, the visible light sensor 502 may determine a profile angle of the glare condition at 514. As described herein, the profile angle may define the position of the glare source outside of a window (e.g., the window 202 in FIG. 2). The profile angle may be determined based on the location of the detected glare source (e.g., a pixel in the image recorded at 510). The visible light sensor 502 may comprise a lookup table to determine the profile angle. For example, the lookup table may provide an indication of the profile angle based on the location (e.g., a pixel in the image recorded at 510) of the detected glare source.

At 516, the visible light sensor 502 may determine the shade position for the motorized window treatment 504. The shade position may prevent a glare condition from affecting a room (e.g., the room 102 and/or the space 200). For example, the shade fabric may be positioned such that the shade fabric blocks light from the glare source represented by the pixel where the glare was detected. At 518, the shade position may be transmitted to the motorized window treatment 504. After receiving the shade position, the motorized window treatment may move the shade fabric to the indicated position at 520.

Figure 5B:
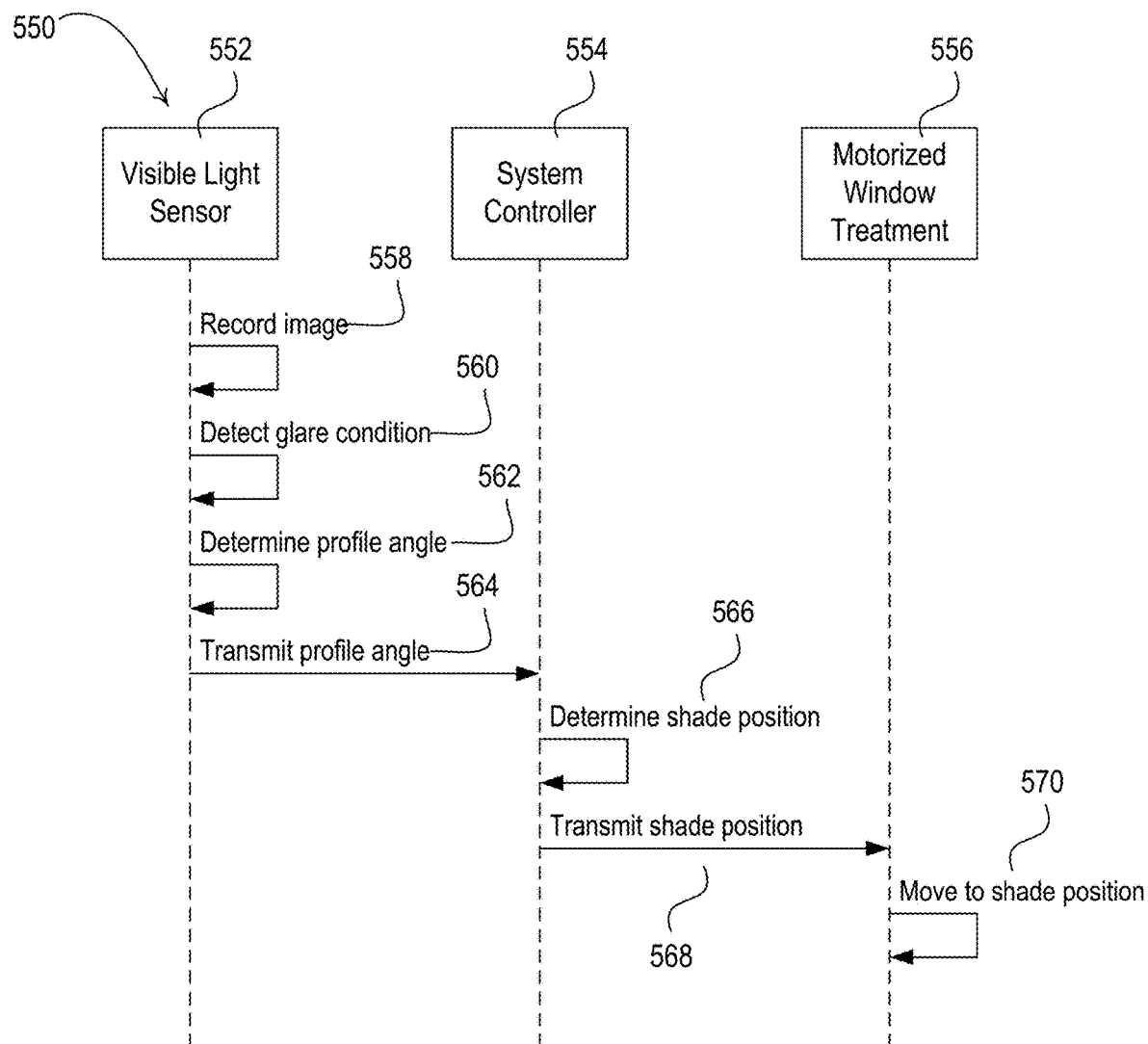
FIG. 5B is a sequence diagram of an example glare detection procedure that may be executed by a visible light sensor, a system controller, and a motorized window treatment.

FIG. 5B is a sequence diagram of an example glare prevention procedure 550. As seen in FIG. 5B, the glare prevention procedure 550 may be performed by a visible light sensor 552 (e.g., the visible light sensors 180, 182, 210, 300), a system controller 554 (e.g., the system controller 110), and a motorized window treatment 556 (e.g., the motorized roller shade 220). At 558, the visible light sensor 552 may record an image of the outside of a room and/or building. At 560, the visible light sensor may process the image to detect a glare condition. For example, the detection of a glare condition may include calculating the luminance $L_{PI}$ of a pixel in the image and comparing them to luminance thresholds (e.g., 520, 522, 530, 536, and/or 538 of FIG. 5A).

If a glare condition is detected, the visible light sensor 552 may determine a profile angle of the glare condition at 562. As described herein, the profile angle may define the position of the glare source outside of a window (e.g., the window 202 in FIG. 2). The profile angle may be determined based on the location of the detected glare source (e.g., a pixel in the image recorded at 558). The visible light sensor 552 may comprise a lookup table to determine the profile angle. For example, the lookup table may provide an indication of the profile angle based on the location (e.g., a pixel in the image recorded at 558) of the detected glare source.

At 564, the visible light sensor 552 may transmit the profile angle to the system controller 554 (e.g., the system controller 110). At 566, the system controller 554 may determine a shade position for the motorized window treatment 556. For example, the shade fabric may be positioned such that the shade fabric blocks light from the glare source represented by the pixel where a glare was detected. At 568, the system controller 554 may transmit the shade position to the motorized window treatment 556. After receiving the shade position, the motorized window treatment may move the shade fabric to the indicated position at 570. Though the visible light sensor 552 is shown as processing the image, the system controller 554 may also, or alternatively, perform the image processing after the visible light sensor 552 generates the image.

Figure 6A:
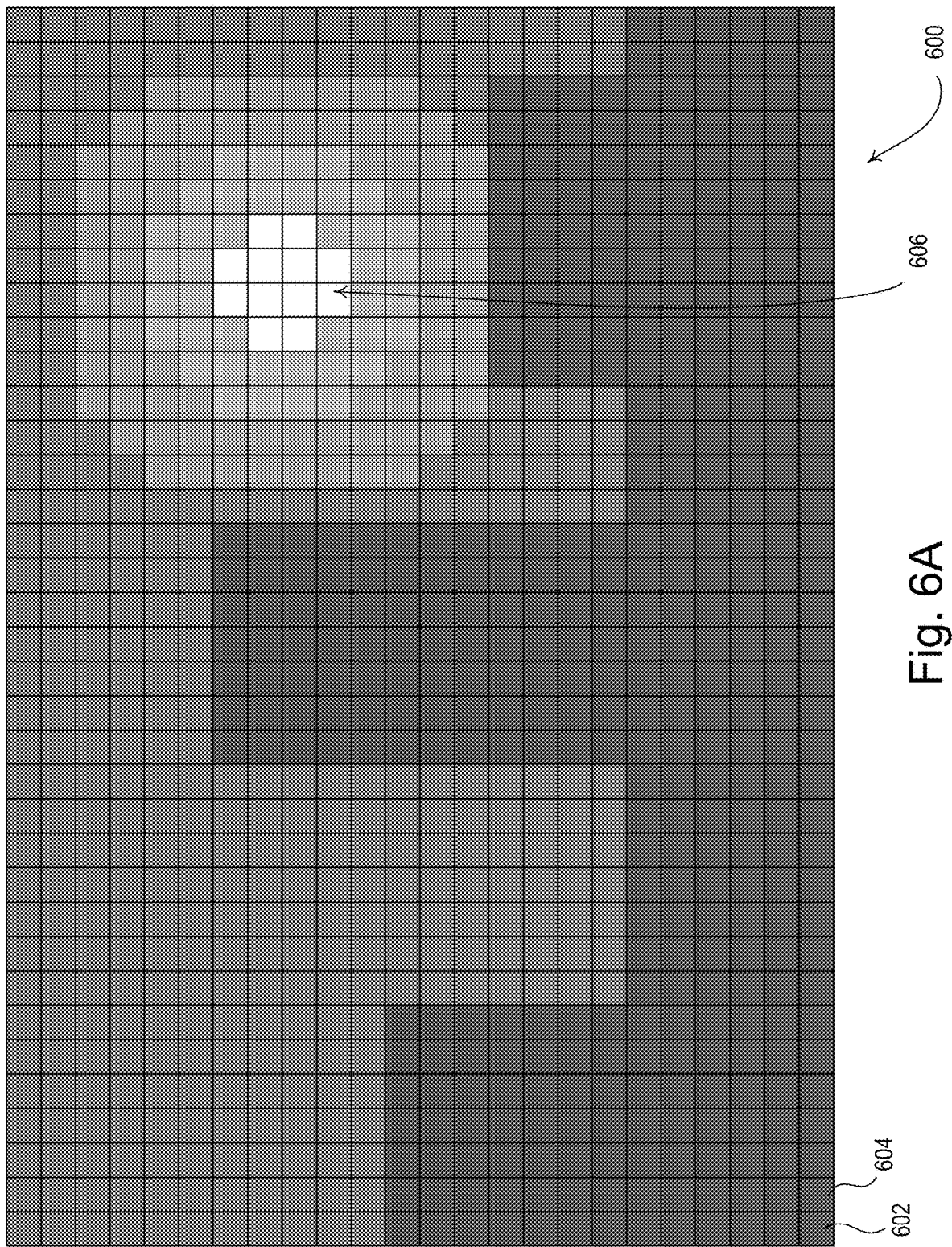

FIG. 6A is a simplified example of a non-warped image 600 used to detect a glare condition. As seen in FIG. 6A, the image 600 may include one or more pixels (e.g., pixel 602, 604 and 606). The pixels may be organized in one or more pixel rows and/or one or more pixel columns. A visible light sensor (e.g., the visible light sensor 300) may retrieve the image 600 and process the image to determine if a glare condition exists. The visible light sensor may process the image to determine if a glare condition is present. This determination may include determining whether an absolute glare condition exist and/or a relative glare condition exists.

The visible light sensor may begin processing the first pixel in the bottom portion of the image 600. For example, the visible light sensor may begin processing the image 600 at pixel 602. The visible light sensor may determine the luminance of the pixel 602 to determine whether an absolute glare condition and/or a relative glare condition exists. If the visible light sensor determines that a glare condition (e.g., an absolute glare condition and/or a relative glare condition) does not exist, the visible light sensor may process the next pixel in the image (e.g., pixel 604).

The visible light sensor may continue processing the pixels in the image until the visible light sensor determines that a glare condition exists or finishes processing the image. For example, the visible light sensor may determine that a relative glare condition or an absolute glare condition exists at pixel 806 (e.g., the luminance of the pixel 806 is higher than a high luminance threshold or relative luminance threshold) and stop processing the image at pixel 806.

FIG. 6B is a simplified example of a non-warped image 650 used to detect a glare condition. The non-warped image 650 may be similar to the non-warped image 600. The non-warped image 650 may include one or more pixels that indicate a smaller glare source, but have a high intensity (e.g., pixels 652, 654). For example, the glare source indicated by pixels 652, 654 may be caused by reflections on small surfaces, ripples in a body of water, and/or rain drops on the window. Even though these pixels indicate a smaller glare source than other glare sources, such as the glare source indicated by pixels 656, the higher intensity (e.g., higher than an established threshold) may cause glare conditions to be incorrectly detected. The visible light sensor may process the image to account for the smaller high-intensity glare conditions. For example, the visible light sensor may reduce the resolution of the image and/or group adjacent pixels having similar intensities into pixel groups. Reducing the resolution of the image and/or grouping pixels with similar intensities into pixel groups may allow the visible light sensor adjust glare condition thresholds to perform improved glare condition detection (e.g., by adjusting glare condition thresholds based on the size of a pixel group and/or the resolution of an image). Other techniques may be used to account for small but high intensity glare sources.

Figure 7:
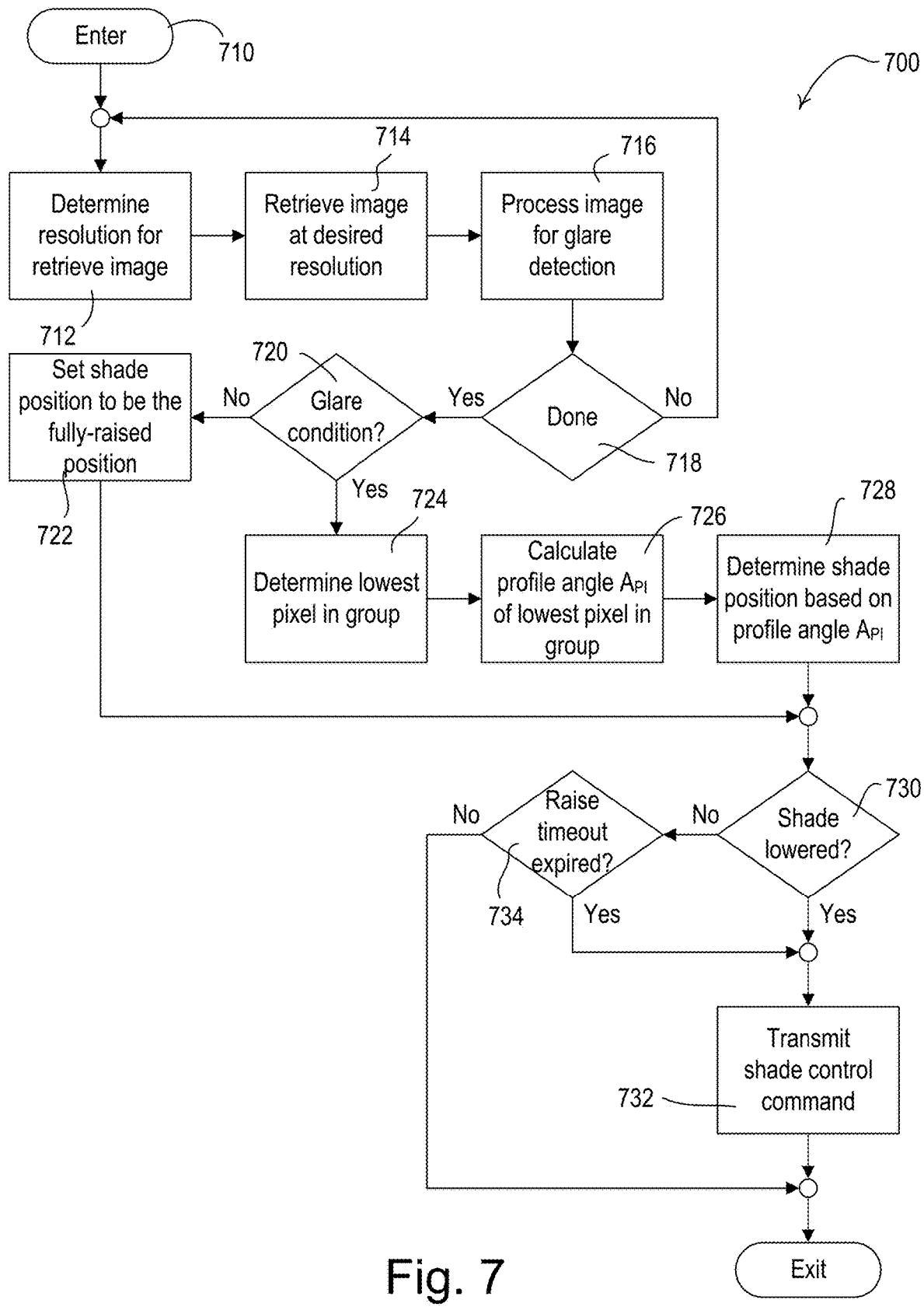
FIG. 7 is a flowchart of an example glare prevention procedure.

FIG. 7 shows a flowchart of an example glare prevention procedure 700 executed periodically by a control circuit of a visible light sensor (e.g., the control circuit 310 of the visible light sensor 300) at 710. At 712, the control circuit may determine a resolution at which to retrieve and process an image. The determined resolution may be based on how the image is to be processed and/or a type of glare to be detected. For example, the control circuit may choose a particular resolution at which to retrieve and process the image in order to detect large glare sources rather than small glare sources and vice versa. The control circuit may process an image multiple times at multiple resolutions to detect different glare conditions using different thresholds that correspond to the particular resolution. The processing of different resolution images may allow the control circuit to appropriately detect glare conditions due to small high-intensity glare sources and/or large low-intensity glare sources. For example, small glare sources may be more easily detected in a higher resolution image because there are more pixels in the image. The small glare sources may be less easily detected in a lower resolution images (e.g., the small glare sources may be removed from and/or filtered out of the lower resolution image), which may allow a large low intensity glare source to be detected.

At 714, the control circuit may retrieve the image at the determined resolution. For example, the control circuit may adjust the resolution of the visible light sensor (e.g., the image capturing circuit 320) to the determined resolution prior to recording (e.g., capturing) a new image. In addition, the control circuit may record (e.g., capture) a new image at an initial resolution (e.g., a fixed resolution) and reduce the resolution of the captured image to the determined resolution. For example, the image may be captured at an initial resolution that may be a high resolution image, which may include approximately one million pixels (e.g., a one megapixel image or a 1280×1024 image). Further, the control circuit may retrieve a stored image from memory (e.g., the memory 312) and reduce the resolution of the stored image to the determined resolution. The retrieved image may be a warped image or a non-warped image. If the retrieved image is a warped image (e.g., if the visible light sensor has a fish-eye lens), the control circuit may produce a non-warped image at 714.

At 716, the control circuit may process the image to determine if a glare condition exists in the image and the location of the glare source within the image if a glare condition does exist. The control circuit may process one or more images using different techniques to detect different types of glare sources and/or different sizes of glare sources. If the control circuit is not done processing images to detect glare conditions at 718, the glare prevention procedure 700 may loop around to determine the resolution for the next image to retrieve and process.

When the control circuit is done processing images at 718, the control circuit may determine if at least one glare condition was detected during the processing of the one or more images at 720. If the control circuit did not detect any glare conditions at 720, the control circuit may set the shade position to be a raised position (e.g., the fully-raised position $P_{FULLY-RAISED}$) at 722. As described herein, when a glare condition is not present, the motorized window treatment may be moved to or remain in the fully-raised position $P_{FULLY-RAISED}$. If the control circuit detected at least one glare condition at 720, the control circuit may determine the lowest location of a glare source (e.g., the lowest pixel in the images that were processed at 716 and indicates a glare condition) at 724. At 726, the control circuit may determine a profile angle $A_{PI}$ for the determined lowest location of a glare source (e.g., the determined lowest pixel). As described herein, the profile angle may represent an approximate location of the glare source and/or may indicate where glare may occur inside the room based on the location of a detected glare condition. For example, the control circuit may recall the profile angle $A_{PI}$ for the determined lowest pixel from memory and/or may calculate the profile angle $A_{PI}$ using the data of the determined lowest pixel.

At 728, the control circuit may determine a shade position based on the profile angle $A_{PI}$. For example, the control circuit may determine a shade position for preventing light from the glare source by determining the position of the motorized window treatment that will cover the profile angle $A_{PI}$. In addition, the control circuit may determine a shade position for preventing light from the glare source from exceeding a maximum penetration distance and/or preventing glare on a task surface based on the profile angle $A_{PI}$ (e.g., using Equation 2 and/or Equation 3 shown above). The shade position for preventing light from the glare source from exceeding a maximum penetration distance and/or for preventing glare on the task surface may also be dependent upon the maximum penetration distance, a height of the task surface, and/or a distance of the task surface from the windows, which may be stored in memory. Determining the shade position based on the profile angle may allow the motorized window to cover the location where the glare condition is detected and/or may prevent glare inside the room.

After determining the shade position at 728, the control circuit may determine at 730 if the motorized window treatments will be lowered to move to the shade position determined at 728. If the control circuit determines that the motorized window treatments will be lowered at 728, the control circuit may transmit, at 732, a shade control command for controlling the position of motorized window treatments in the space to the determined shade position for preventing glare on the task surface (e.g., directly or via the system controller 110), before the glare prevention procedure 700 exits. For example, the shade control command may move the motorized window treatment corresponding to the determined lowest location of a glare source (e.g., the location of the determined lowest pixel). Alternatively, the control circuit may be configured to transmit the profile angle $A_{PI}$ to the system controller, which may determine the shade position for preventing glare on the task surface and transmit the shade control command to the motorized window treatments.

If the control circuit determines that the motorized window treatments will be raised at 730, the control circuit may determine at 734 if the raise timeout has expired (e.g., the raise delay period has passed) since the last movement of the motorized window treatments. When the raise timeout has not expired at 734, the glare prevention procedure 700 may exit. When the raise timeout has expired at 734, the control circuit may transmit a shade control command for controlling the position of the motorized window treatments at 730, before the glare prevention procedure 700 exits. Though the image processing may be described as being performed at the visible light sensor, the image processing may be performed at the system controller or another image processing device in the load control system.

Figure 8A:
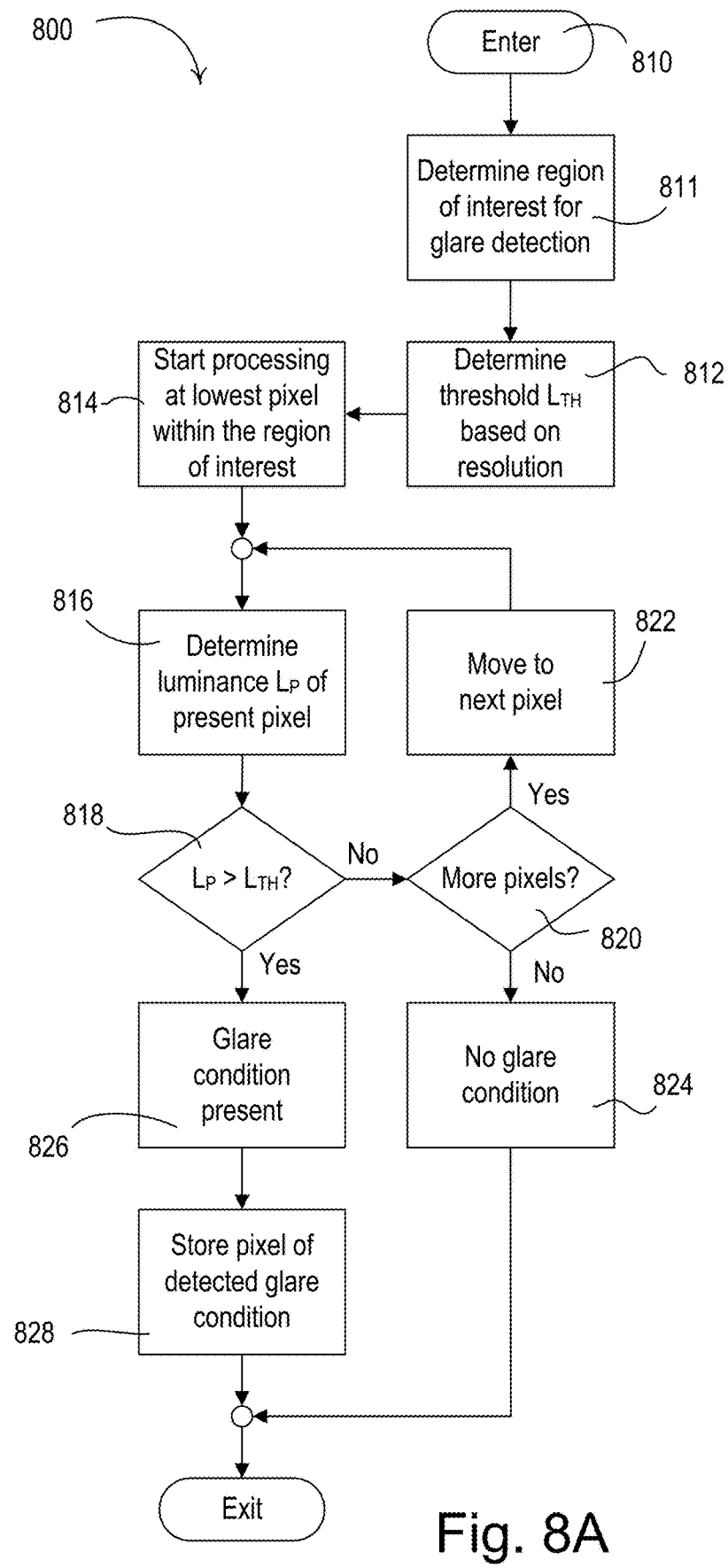
FIGS. 8A-10 are flowcharts of example glare detection procedures.

FIG. 8 shows a flowchart of an example glare detection procedure 800 (e.g., a luminance-based glare detection procedure) for processing an image to detect a glare condition. The glare detection procedure 800 may be executed by a control circuit of a visible light sensor (e.g., the control circuit 310 of the visible light sensor 300) and/or a system controller (e.g., system controller 110). For example, the glare detection procedure 800 may be executed at 716 of the glare prevention procedure 700 shown in FIG. 7.

The glare detection procedure 800 may begin at 810. At 811, the control circuit may determine a region of interest for detecting the glare condition during the glare detection procedure 800. When detecting a luminance-based glare condition during the glare detection procedure 800, the control circuit may select a region of interest that excludes a head area (e.g., the head areas 402, 412), a sill area (e.g., the sill areas 404, 414), and jamb areas around the window (e.g., to focus on all unblocked portions of the image). For example, when the image is a warped image (e.g., the warped image 400), the control circuit may select the region of interest 406 (e.g., as shown in FIG. 4C) to detect the luminance-based glare condition during the glare detection procedure 800. In addition, when the image is a non-warped image (e.g., the warped image 410), the control circuit may select the region of interest 416 (e.g., as shown in FIG. 4D) to detect the luminance-based glare condition during the glare detection procedure 800.

At 812, the control circuit may determine a glare condition luminance threshold $L_{TH}$ (e.g., an absolute glare condition threshold and/or a relative glare condition threshold) for processing the image (e.g., the image retrieved at 614 of the glare detection procedure 600 of FIG. 6). The control circuit may determine the glare condition luminance threshold $L_{TH}$ based on, for example, the resolution of the image. For example, when the resolution of the image is higher, in which the size of the individual pixels are smaller, the glare condition luminance threshold $L_{TH}$ may be higher. When the resolution is lower, in which the size of the individual pixels are larger, the glare condition luminance threshold $L_{TH}$ may be lower. For example, the glare condition luminance threshold $L_{TH}$ may be approximately 25,000 candelas per square meter for a high resolution image (e.g., a one megapixel image), and approximately 5,000 candelas per square meter for a low resolution image (e.g., a 200×200 image).

At 814, the control circuit of the visible light sensor or the system controller may begin processing a first pixel in the selected region of interest of the image. For example, the pixel may be located at a predetermined location in the region of interest of the image, such as a bottom portion (e.g., a bottom row of pixels) or top portion (e.g., a top row of pixels) of the region of interest of the image. The control circuit of the visible light sensor may begin processing the image at a pixel that is located at a bottom right-hand corner or a bottom left-hand corner of the region of interest of the image for shades that lower from and raise to a window treatment mounted at the top of the window. The control circuit of the visible light sensor may begin analyzing a pixel in the image that is located at a top right-hand corner or a top left-hand corner of the region of interest of the image for shades that raise from and lower to a motorized window treatment mounted at the bottom of the window. The direction of the analysis may depend on the location the motorized window treatment is mounted and/or the location at which a critical glare condition (e.g., a highest glare condition or a lowest glare condition) is expected to be detected for controlling the motorized window treatments to reduce processing resources for processing images.

The control circuit may then process the pixel to attempt to detect a glare condition. For example, the control circuit may determine a luminance $L_P$ of the pixel at 816 and compare the luminance $L_P$ to the glare condition luminance threshold $L_{TH}$ at 818. If the retrieved image is an HDR image, the control circuit may retrieve the luminance $L_P$ of the pixel from the data of the HDR image at 816. The control circuit may also calculate the luminance $L_P$ of the pixel (e.g., using Equation 4 shown above) at 816. If, at 818, the luminance $L_P$ of the pixel is less than the glare condition luminance threshold $L_{TH}$ (e.g., a glare condition is not present), the control circuit may determine if there are additional pixels in the region of interest to process at 820. If there are additional pixels in the region of interest to process, the control circuit may move to a next pixel at 822 and process the next pixel to attempt to detect a glare condition. When the control circuit moves onto the next pixel at 822, the control circuit may move to the pixel adjacent to the previous pixel in the present row of pixels (e.g., to the left or the right of the previous pixel). When the control circuit has processed each pixel in a row, the control circuit may move up to the next row of pixels. In this way, the control circuit may step through multiple pixels in the non-warped image by starting at the bottom row and moving up through the rows of the image. If there are not additional pixels in the region of interest to process at 820, the control circuit may determine that a glare condition is not present in the image at 824, and the glare detection procedure 800 may exit.

If, at 818, the control circuit determines that the luminance $L_P$ of the pixel is greater than the glare condition luminance threshold $L_{TH}$, the control circuit may determine that a glare condition is present at 826 and store the location of the glare condition (e.g., the location of the pixel) at 828, before the glare detection procedure 800 exits. The location of the glare condition may be used to determine a shade position and/or a critical glare condition. The critical glare condition may be the highest or lowest glare condition detected in the image. The critical glare condition may be the lowest glare condition in the image for shades that lower from and raise to a window treatment mounted at the top of the window. The critical glare condition may be the highest glare condition in the image for shades that raise from and lower to a motorized window treatment mounted at the bottom of the window.

The control circuit may execute the glare detection procedure 800 multiple times to process an image at multiple resolutions to detect different glare conditions. The processing of different resolution images may allow the control circuit to appropriately detect glare conditions due to small high-intensity glare sources and/or large low-intensity glare sources. The control circuit may use a different glare condition luminance threshold $L_{TH}$ when processing the image at each of the different resolutions. For example, small glare sources may be more easily detected in a higher resolution image because there are more pixels in the image. Since glare conditions may be caused due to a small glare source having a high intensity, the glare condition luminance threshold $L_{TH}$ used to detect the glare conditions in a high resolution image may be higher (e.g., a higher pixel intensity may trigger the detection of a glare condition). The small glare sources may be less easily detected in a lower resolution images (e.g., the small glare sources may be removed from and/or filtered out of the lower resolution image), which may allow a large low intensity glare source to be detected. Since glare conditions may also be caused due to a large glare source having a low intensity, the glare condition luminance threshold $L_{TH}$ used to detect the glare conditions in a low resolution image may be lower (e.g., a lower pixel intensity may trigger the detection of a glare condition).

Figure 8B:
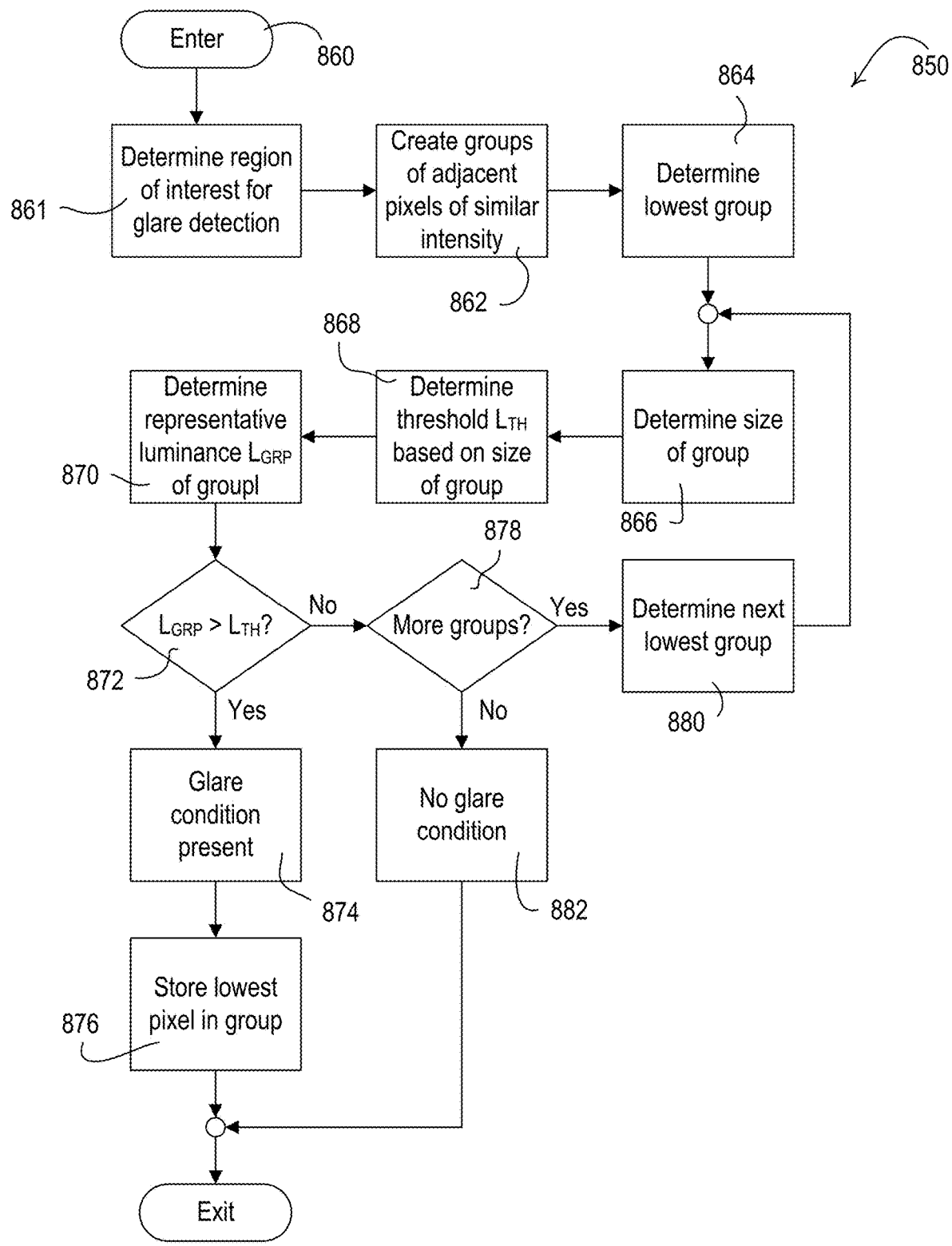

FIG. 8B shows a flowchart of another example glare detection procedure 850 (e.g., a luminance-based glare detection procedure) for processing an image to detect a glare condition. The glare detection procedure 850 may be executed by a control circuit of a visible light sensor (e.g., the control circuit 210 of the visible light sensor 200) or a system controller (e.g., system controller 110). For example, the glare detection procedure 850 may be executed at 716 of the glare prevention procedure 700 shown in FIG. 7.

The glare detection procedure 850 may begin at 860. At 861, the control circuit may determine a region of interest for detecting the glare condition during the glare detection procedure 850. When detecting a luminance-based glare condition during the glare detection procedure 850, the control circuit may select a region of interest that excludes a head area (e.g., the head areas 402, 412), a sill area (e.g., the sill areas 404, 414), and jamb areas around the window (e.g., to focus on all unblocked portions of the image). For example, when the image is a warped image (e.g., the warped image 400), the control circuit may select the region of interest 406 (e.g., as shown in FIG. 4C) to detect the luminance-based glare condition during the glare detection procedure 850. In addition, when the image is a non-warped image (e.g., the warped image 410), the control circuit may select the region of interest 416 (e.g., as shown in FIG. 4D) to detect the luminance-based glare condition during the glare detection procedure 850.

One or more neighboring pixels having similar intensities may be grouped together to form a group of pixels. Pixel groups may be dynamically sized and/or shaped. Dynamically shaped and/or dynamically sized pixel groups may provide improved glare detection (e.g., as group shapes are not limited to a square of a certain size). At 862, the control circuit of the visible light sensor or the system controller may group one or more adjacent pixels having similar luminance (e.g., similar intensities). For example, when the control circuit of the visible light sensor or the system controller processes a pixel with a high luminance, the control circuit may look to group the surrounding pixels. Referring now to FIG. 6B, pixel 652 and its surrounding pixels may be grouped together (e.g., depending on whether a given surrounding pixel has a similar intensity). Similarly, pixel 656 and its surrounding pixels may be grouped together to form pixel group 658. Pixel 654, for example, may be a group of a single pixel (e.g., because the pixels surrounding pixel 608 do not have a similar intensity).

After the control circuit of the visible light sensor or the system controller groups surrounding pixels having similar intensities at 862, the control circuit may determine the lowest group in the image at 864. For example, the lowest group may be the group of pixels having one or more pixels closest to the bottom portion of the image (e.g., pixel 652 and its surrounding pixels as shown in FIG. 6B). After the determining the lowest group in the image, the control circuit may determine the size of the group at 866. The size of the group may be a function of the number of the pixels in the group, the shape of the group, and/or the size of the individual pixels in the group. The size of the group may be used to determine if the group of pixels present a glare condition. For example, the size of the group may be used to determine a group glare condition threshold.

Glare conditions may be caused to small high-intensity glare sources and/or large low-intensity glare sources. At 868, the control circuit of the visible light sensor or the system controller may determine a group glare condition luminance threshold $L_{TH}$ based on the group size. For example, large groups may have a lower group glare condition threshold (e.g., to detect glare conditions due to large low-intensity glare sources), and small groups may have larger group glare condition thresholds (e.g., to detect glare conditions due to small high-intensity glare sources). For example, the pixel group 658 including pixel 656 may have the smallest group glare condition threshold, and the pixel group including pixel 654 may have the largest group glare condition of the pixel groups shown in FIG. 6B. Determining the group glare condition luminance threshold $L_{TH}$ based on the group size may allow for the control circuit of the visible light sensor to avoid the detection of pixels groups that do not present glare conditions, while continuing to detect pixel groups that present glare conditions (e.g., as the group size and/or threshold may be smaller).

At 870, the control circuit may determine a representative group luminance $L_{GRP}$. The representative group luminance $L_{GRP}$ may provide the control circuit of the visible light sensor a luminance that represents the values of the luminance $L_P$ of the pixels in the group (e.g., each of the pixels in the group). Determining a representative group luminance $L_{GRP}$ for the pixels in the group may increase glare detection efficiency (e.g., because the control circuit may process the group using the representative group luminance $L_{GRP}$, rather than processing luminance values for each pixel in the group). For example, the representative group luminance $L_{GRP}$ may be an average, mean, or median value of the luminance values of the pixels in the group. The representative group luminance $L_{GRP}$ may be the maximum or minimum value of the luminance values of the pixels in the group. The representative group luminance $L_{GRP}$ may be determined in multiple ways (e.g., in any way that represents an aggregate of the values of the luminance $L_P$ of the pixels in the group).

The control circuit of the visible light sensor or the system controller may detect glare conditions in an efficient manner. The control circuit may begin processing groups of pixels in a location relative to the fully-lowered position $P_{FULLY-LOWERED}$ of a motorized window treatment. For example, if a motorized window treatment is located at a top of the window and lowers a shade fabric towards the bottom of the window (e.g., to a fully-lowered position $P_{FULLY-LOWERED}$), the control circuit of the visible light sensor may begin detecting glare conditions from the lowest group of pixels. At 872, the control circuit of the visible light sensor or the system controller may process the lowest group of pixels to detect a glare condition by comparing the representative group luminance and the group glare condition threshold. If the representative group luminance is greater than the group glare condition threshold, the control circuit of the visible light sensor or the system controller may determine that a glare condition is present at 874. The control circuit may store the location of the glare condition (e.g., the lowest pixel in the group) at 876, and the glare detection procedure 850 may exit.

When a representative group luminance is greater than a group glare condition threshold, the control circuit of the visible light sensor may stop detecting glare conditions, which may improve the efficiency of glare detection (e.g., because the control circuit may stop processing the groups remaining in the image once a glare condition is detected). For example, if, at 872, the representative group luminance is not greater than the group glare condition threshold, the control circuit of the visible light sensor or system controller may determine if there are additional groups in the image at 878. If, at 878, additional groups are in the image, the control circuit may determine the next lowest group in the image at 880. Alternatively, if additional groups are not present in the image, the control circuit or system controller may determine that a glare condition is not present in the image at 882 and the glare detection procedure 850 may exit.

Figure 9:
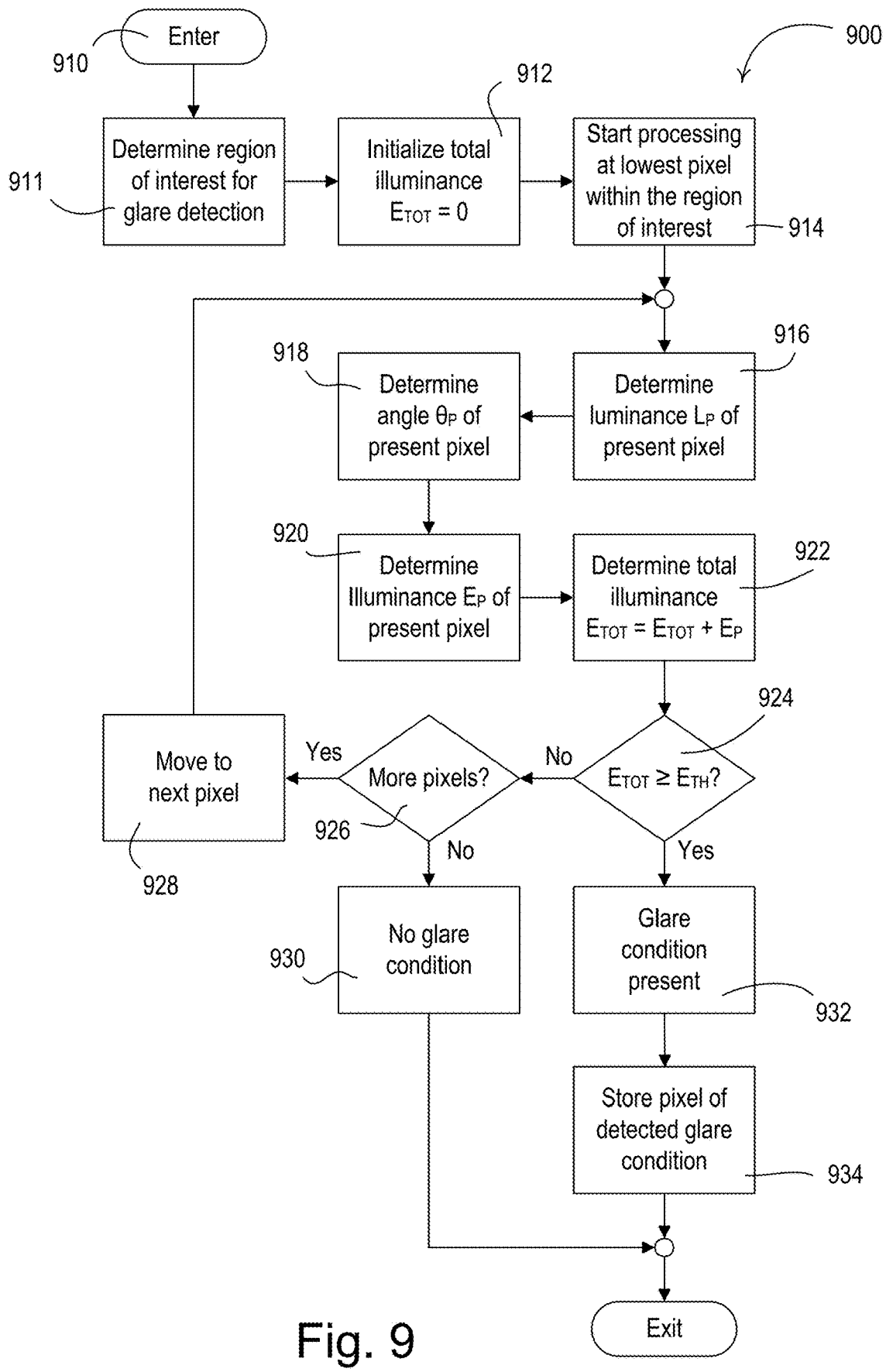

FIG. 9 shows a flowchart of another example glare detection procedure 900 (e.g., a illuminance-based glare detection procedure) for processing an image to detect a glare condition (e.g., an illuminance-based glare condition). The glare detection procedure 900 may be executed by a control circuit of a visible light sensor (e.g., the control circuit 210 of the visible light sensor 200) or a system controller (e.g., system controller 110). For example, the glare detection procedure 900 may be executed at 716 of the glare prevention procedure 700 shown in FIG. 7.

The glare detection procedure 900 may begin at 910. At 911, the control circuit may determine a region of interest for detecting the glare condition during the glare detection procedure 900. When detecting an illuminance-based glare condition during the glare detection procedure 900, the control circuit may select a region of interest that excludes a head area (e.g., the head areas 402, 412), a sill area (e.g., the sill areas 404, 414), and jamb areas around the window (e.g., to focus on all unblocked portions of the image). For example, when the image is a warped image (e.g., the warped image 400), the control circuit may select the region of interest 406 (e.g., as shown in FIG. 4C) to detect the illuminance-based glare condition during the glare detection procedure 900. In addition, when the image is a non-warped image (e.g., the warped image 410), the control circuit may select the region of interest 416 (e.g., as shown in FIG. 4D) to detect the illuminance-based glare condition during the glare detection procedure 900.

At 912, a total illuminance $E_{TOT}$ for the image may be initialized to zero. At 914, the control circuit may begin processing a first pixel in the image. For example, the pixel may be located at a predetermined location in the image, such as a bottom portion (e.g., a bottom row of pixels) or top portion (e.g., a top row of pixels) of the image. The control circuit may begin processing the image at a pixel that is located at a bottom right-hand corner or a bottom left-hand corner of the image for shades that lower from and raise to a window treatment mounted at the top of the window.

The control circuit may then process the pixel to attempt to detect a glare condition. For example, the control circuit may determine a luminance $L_P$ of the pixel at 916. For example, if the retrieved image is an HDR image, the control circuit may retrieve the luminance $L_P$ of the pixel from the data of the HDR image at 1016. The control circuit may also calculate the luminance $L_P$ of the pixel (e.g., using Equation 4 shown above) at 916. At 918, the control circuit may determine a pixel angle $\theta_P$ of the pixel. For example, the pixel angle $\theta_P$ may be an angle between a vector directed towards a location of the pixel and a vector that is normal to the fish-eye lens of the visible light sensor. The pixel angle $\theta_P$ may be dependent upon a type of the fish-eye lens of the visible light sensor and/or an orientation of the visible light sensor when mounted to the window. The pixel angle $\theta_P$ may be stored in memory. For example, the control circuit may simply retrieve the pixel angle $\theta_P$ from memory based on the present pixel at 918. At 920, the control circuit may determine an illuminance contribution $E_P$ of the pixel. For example, the control circuit may calculate the illuminance contribution $E_P$ of the pixel using the luminance $L_P$ and the pixel angle $\theta_P$ of the pixel, e.g., $E_P=(2\pi/N_P)\cdot L_P\cdot\cos(\theta_P)$, where $N_P$ is the total number of pixels in the image being processed. At 922, the total illuminance $E_{TOT}$ of the image may be updated by adding the illuminance contribution $E_P$ (e.g., as determined at 1020) to the total illuminance $E_{TOT}$, e.g., $E_{TOT}=E_{TOT}+E_P$.

If, at 924, the total illuminance $E_{TOT}$ of the image is less than a glare condition illuminance threshold $E_{TH}$ (e.g., a glare condition due to the total illuminance $E_{TOT}$ in the image is not present), the control circuit may determine if there are additional pixels to process at 926. If there are additional pixels to process at 926, the control circuit may move to a next pixel at 928 and process the next pixel to attempt to detect a glare condition. When the control circuit moves onto the next pixel at 928, the control circuit may move to the pixel adjacent to the previous pixel in the present row of pixels (e.g., to the left or the right of the previous pixel). When the control circuit has processed each pixel in a row, the control circuit may move up to the next row of pixels. In this way, the control circuit may step through multiple pixels in the non-warped image by starting at the bottom row and moving up through the rows of the image. If there are not additional pixels to process, the control circuit may determine that a glare condition is not present in the image at 926, and the glare detection procedure 900 may exit.

If the control circuit determines that the luminance $L_P$ of the pixel is greater than (e.g., greater than or equal to) the glare condition illuminance threshold $E_{TH}$ at 924, the control circuit may determine that a glare condition is present at 932 and store the location of the glare condition (e.g., the location of the pixel) at 934, before the glare detection procedure 900 exits. The location of the glare condition may be used to determine a shade position (e.g., a position of a covering material) for preventing a glare condition in the space. For example, the determined shade position may be a fully-lowered position. The glare condition stored at 934 may be the highest or lowest glare condition detected in the image (e.g., a critical glare condition). The glare condition may be the lowest glare condition in the image for shades that lower from and raise to a window treatment mounted at the top of the window. The glare condition may be the highest glare condition in the image for shades that raise from and lower to a motorized window treatment mounted at the bottom of the window.

Figure 10:
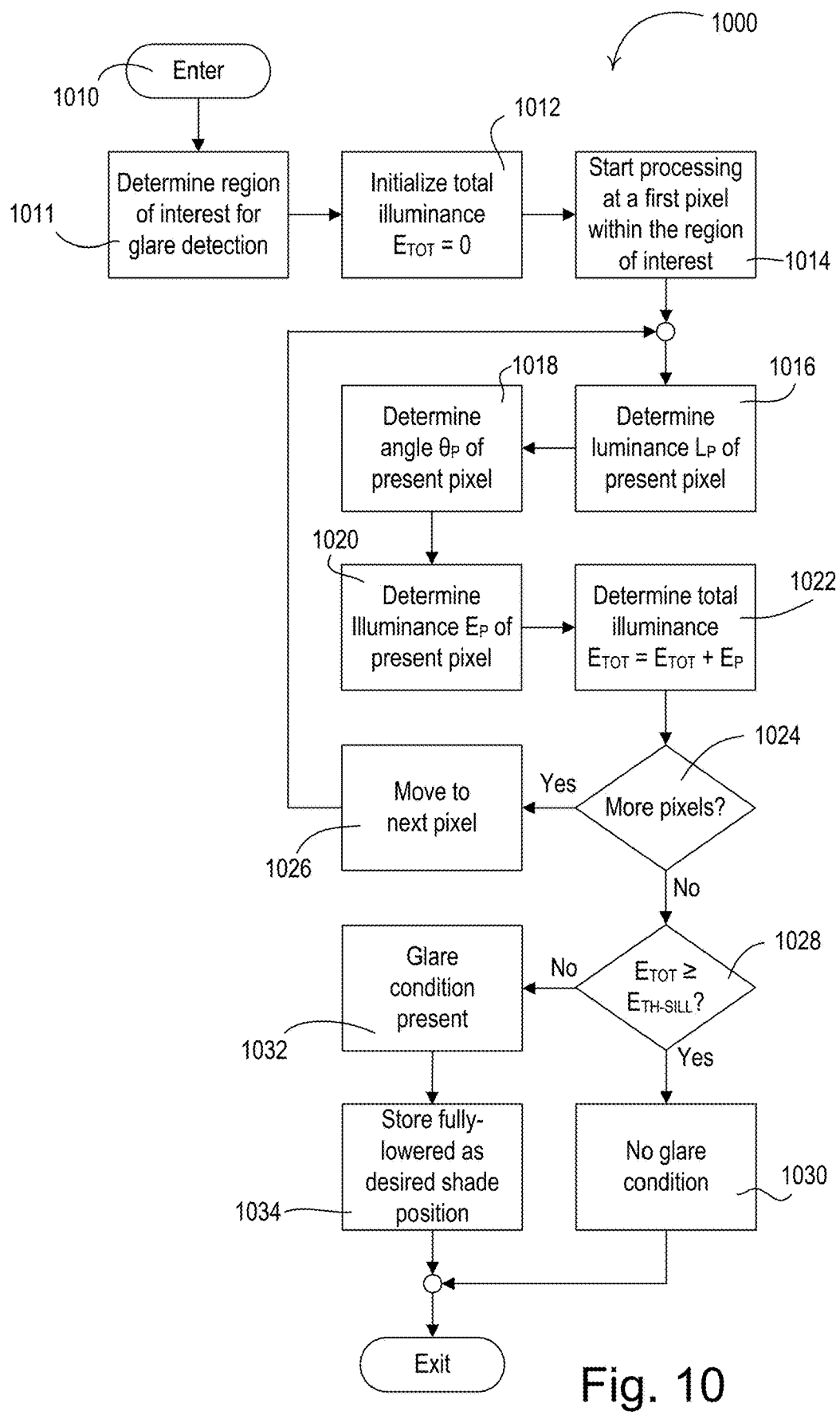

FIG. 10 shows a flowchart of another example glare detection procedure 1000 (e.g., a window sill glare detection procedure) for processing an image to detect a glare condition (e.g., a window sill glare condition). The glare detection procedure 1000 may be executed by a control circuit of a visible light sensor (e.g., the control circuit 210 of the visible light sensor 200) or a system controller (e.g., system controller 110). For example, the glare detection procedure 1000 may be executed at 716 of the glare prevention procedure 700 shown in FIG. 7.

The glare detection procedure 1000 may begin at 1010. At 1011, the control circuit may determine a region of interest for detecting the glare condition during the glare detection procedure 1000. When detecting an illuminance-based glare condition during the glare detection procedure 1000, the control circuit may select a region of interest that has an upper bound to exclude a head area (e.g., the head areas 402, 412) and a lower bound at a center of the image (e.g., a horizon line), for example, to focus the upper hemisphere of the image. In addition, the region of interest may exclude jamb areas at the sides of the window. For example, when the image is a warped image (e.g., the warped image 400), the control circuit may select the region of interest 408 (e.g., as shown in FIG. 4E) to detect the window sill glare condition during the glare detection procedure 1000. In addition, when the image is a non-warped image (e.g., the warped image 410), the control circuit may select the region of interest 418 (e.g., as shown in FIG. 4F) to detect the window sill glare condition during the glare detection procedure 1000.

At 1012, a total illuminance $E_{TOT}$ for the region of interest of the image may be initialized to zero. At 1014, the control circuit may begin processing a first pixel in the region of interest of the image. For example, the pixel may be located at a predetermined location in the image, such as a bottom portion (e.g., a bottom row of pixels) or top portion (e.g., a top row of pixels) of the region of interest of the image.

The control circuit may then process the pixels of the region of interest of the image to determine if the window sill glare condition exists. For example, the control circuit may determine a luminance $L_P$ of the pixel (e.g., the first pixel) at 1016. For example, if the retrieved image is an HDR image, the control circuit may retrieve the luminance $L_P$ of the pixel from the data of the HDR image at 1016. The control circuit may also calculate the luminance $L_P$ of the pixel (e.g., using Equation 4 shown above) at 1016. At 1018, the control circuit may determine a pixel angle $\theta_P$ of the pixel. For example, the pixel angle $\theta_P$ may be an angle between a vector directed towards a location of the pixel and a vector that is normal to the fish-eye lens of the visible light sensor. The pixel angle $\theta_P$ may be dependent upon a type of the fish-eye lens of the visible light sensor and/or an orientation of the visible light sensor when mounted to the window. The pixel angle $\theta_P$ may be stored in memory. For example, the control circuit may retrieve the pixel angle $\theta_P$ from memory based on the present pixel at 1018. At 1020, the control circuit may determine an illuminance contribution $E_P$ of the pixel. For example, the control circuit may calculate the illuminance contribution $E_P$ of the pixel using the luminance $L_P$ and the pixel angle $\theta_P$ of the pixel, e.g., $E_P=(2\pi/N_P) \cdot L_P \cdot \cos(\theta_P)$, where $N_P$ is the total number of pixels in the image being processed. At 1022, the total illuminance $E_{TOT}$ of the region of interest of the image may be updated by adding the illuminance contribution $E_P$ (e.g., as determined at 1020) to the total illuminance $E_{TOT}$, e.g., $E_{TOT}=E_{TOT}+E_P$. In addition, the control circuit may transform the total illuminance $E_{TOT}$ of the region of interest of the image (e.g., by 90 degrees) at 1022 to determine the total illuminance shining down on the window sill rather than shining into the window.

If there are additional pixels to process at 1024, the control circuit may move to a next pixel at 1026 and process the next pixel to determine the luminance $L_P$ of the next pixel at 1016. When the control circuit moves onto the next pixel at 1026, the control circuit may move to the pixel adjacent to the previous pixel in the present row of pixels (e.g., to the left or the right of the previous pixel). When the control circuit has processed each pixel in a row, the control circuit may move up to the next row of pixels. In this way, the control circuit may step through multiple pixels in the non-warped image by starting at the bottom row and moving up through the rows of the image.

If there are not additional pixels in the region of interest of the image to process at 1024, the control circuit may determine if the total illuminance $E_{TOT}$ of the image is less than a window sill glare condition illuminance threshold $E_{TH-SILL}$ at 1028. If, at 1028, the total illuminance $E_{TOT}$ of the image is less than the window sill glare condition illuminance threshold $E_{TH-SILL}$, the control circuit may determine that a window sill glare condition is not present in the image at 1030, and the glare detection procedure 1000 may exit. If the control circuit determines that the luminance $L_P$ of the pixel is greater than (e.g., greater than or equal to) the window sill glare condition illuminance threshold $E_{TH-SILL}$ at 1028, the control circuit may determine that a glare condition is present at 1032 and store the fully-lowered position $P_{FULLY-LOWERED}$ as the shade position for preventing a glare condition in the space at 1034, before the glare detection procedure 1000 exits.

While the glare detection procedures 800-1000 of FIGS. 8A-10 are described herein with the control circuit processing the non-warped image starting at the bottom portion (e.g., a bottom row) and working up through the rows of the image, the procedure may be reversed when the room 102 includes motorized window treatments that are bottom-up window treatments, e.g., the window treatment fabric moves from the bottom of the window to the top to cover the window. For example, when the motorized window treatments are bottom-up window treatments, the glare detection procedures 800-1000 may process the image starting at the top portion (e.g., a top row) and work down through the rows of the image, e.g., until a glare source is detected.

The glare prevention procedure (e.g., the glare prevention procedure 700 shown in FIG. 7) may sometime undercompensate and/or overcompensate for a detected glare condition. For example, a glare condition may persist and/or re-occur within an area (e.g., a room of a building) following performance of the glare prevention procedure. Alternatively or additionally, an occupant of the area may determine that the natural lighting in the area is too bright or too dim. A glare maintenance procedure (e.g., the glare maintenance procedure 1100 shown in FIG. 11) may be performed based on input from the occupant. Using a glare maintenance procedure may allow for corrections for errors that may occur in using the glare prevention procedure, and/or may allow tailoring of the glare prevention procedure to accommodate individual occupant preferences.

In an example, the occupant may indicate that a glare problem exists via a mobile device (e.g., the mobile device 190). The occupant may indicate the type of the glare problem, and may resolve the glare problem by changing the lighting in the area. For example, the user may send a command to a system controller that may cause a shade position of a motorized window treatment (e.g., the motorized window treatment 150) to be raised or lowered. After the motorized window treatment is raised or lowered, the user may confirm that the glare problem has been resolved via the mobile device.

Figure 11:
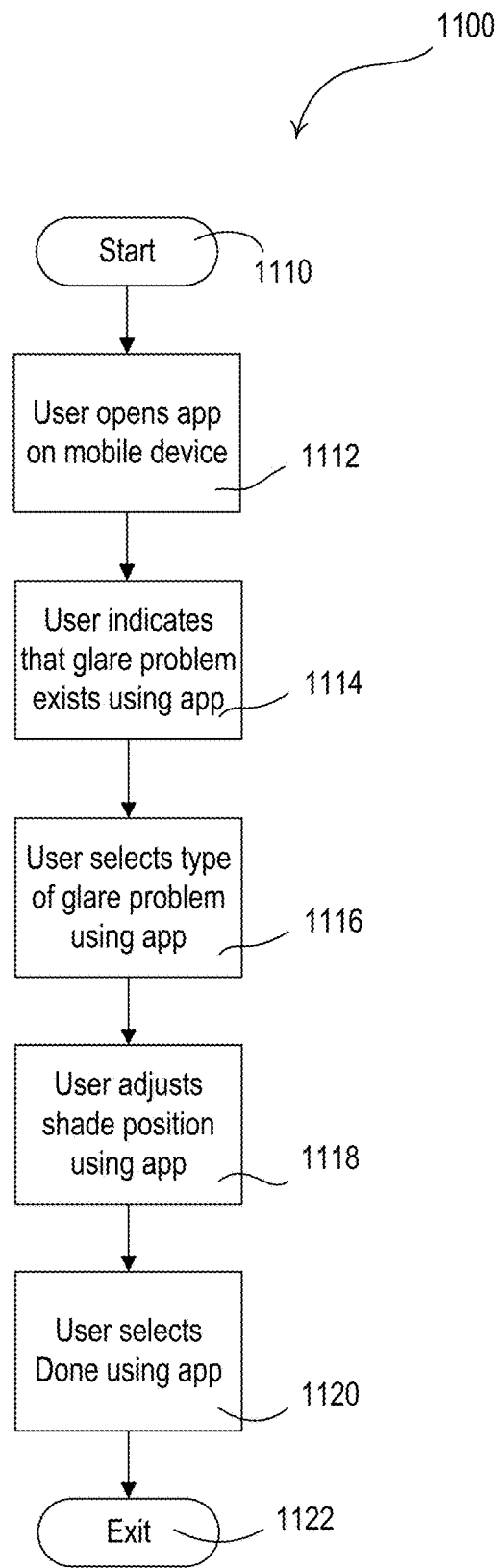
FIG. 11 is a flowchart of an example maintenance procedure.

FIG. 11 is an example flowchart of a glare maintenance procedure 1100 that may be completed by a user of a load control system (e.g., the load control system 100) for adjusting the operation of a glare prevention procedure (e.g., the glare prevention procedure 700). The glare maintenance procedure 1100 may be used to change the state of one or more control devices in a load control system (e.g., the load control system 100 shown in FIG. 1). For example, the glare maintenance procedure 1100 may be used to adjust the shade position of a motorized window treatment (e.g., the motorized window treatment 150) when the user would prefer a different shade position in response to a problem (e.g., to enable a better view or when the user is experiencing glare). In addition, the adjusted shade position may be used to update one or more threshold values (e.g., a luminance threshold and/or an illuminance threshold) used in the glare prevention procedure. Future instances of the glare prevention procedure may use the updated threshold(s), which may prevent the glare problem from occurring again. The glare maintenance procedure 1100 may be performed by an occupant of an area in which the control devices are located. For example, the occupant may be a user of a mobile device (e.g., the mobile device 190). The glare maintenance procedure 1100 may be performed after the glare prevention procedure has been performed. For example, the glare maintenance procedure 1100 may be performed if a glare problem persists after the glare prevention procedure is performed.

The glare maintenance procedure 1100 may begin at 1110. The glare maintenance procedure 1100 may begin when the user of the mobile device determines that a glare problem exists in the area. For example, the glare maintenance procedure 1100 may be performed after the shade position of the motorized window treatment has been adjusted (e.g., automatically) as part of a glare prevention procedure. At 1112, the user may open an application on the mobile device. The mobile device (e.g., via the application) may display information about one or more control devices in the load control system. For example, the mobile device may display information about a motorized window treatment. The information may include a current shade position of the motorized window treatment.

The mobile device may display one or more options (e.g., as buttons) that the user may select for configuring and/or controlling the shade position of the motorized window treatment. At 1114, the user may indicate that a glare problem exists, for example by selecting one of the options displayed on the mobile device. After receiving the indication that the glare problem exists from the user, the mobile device may display one or more types of glare problems that the user may select. At 1116, the user may indicate the type of glare problem that exists in the area, for example by selecting one of the options on the mobile device. For example, the user may indicate that a luminance-based glare exists, that the light in the area is too bright, and/or that the light in the area is too dark.

After receiving the indication of the type of glare problem from the user, the mobile device may prompt the user to adjust the shade position of the motorized window treatment at 1118. For example, the mobile device may display one or more buttons for adjusting the shade position (e.g., the arrow buttons 1252, 1254 in FIG. 12B, respectively). The user may move the shade position up or down by pressing the corresponding button on the mobile device. The mobile device may determine that the user is pressing a button to adjust the shade position up or down, and may send one or more messages to the motorized window treatment (e.g., via a system controller) that instruct the motorized window treatment to adjust the shade position. The motorized window treatment may adjust the shade position in response to the messages.

The user may continue to adjust the shade position at 1118 until the glare problem is eliminated. The user may indicate that they have finished adjusting the shade position by selecting a "done" button displayed on the mobile device (e.g., the button 1256 shown in FIG. 12B) at 1120, and the glare maintenance procedure 1100 may end at 1122. As described herein, the adjusted shade position may be used to modify the performance of future instances of the glare prevention procedure, for example by modifying one or more thresholds used in the glare prevention procedure (e.g., and therefore the likelihood that a glare condition will be detected). The adjusted shade position and/or the modified threshold(s) may be stored in a profile associated with the user. For example, future instances of the glare prevention procedure may use the modified threshold(s) if it is determined that the user is in the area.

Figure 12:
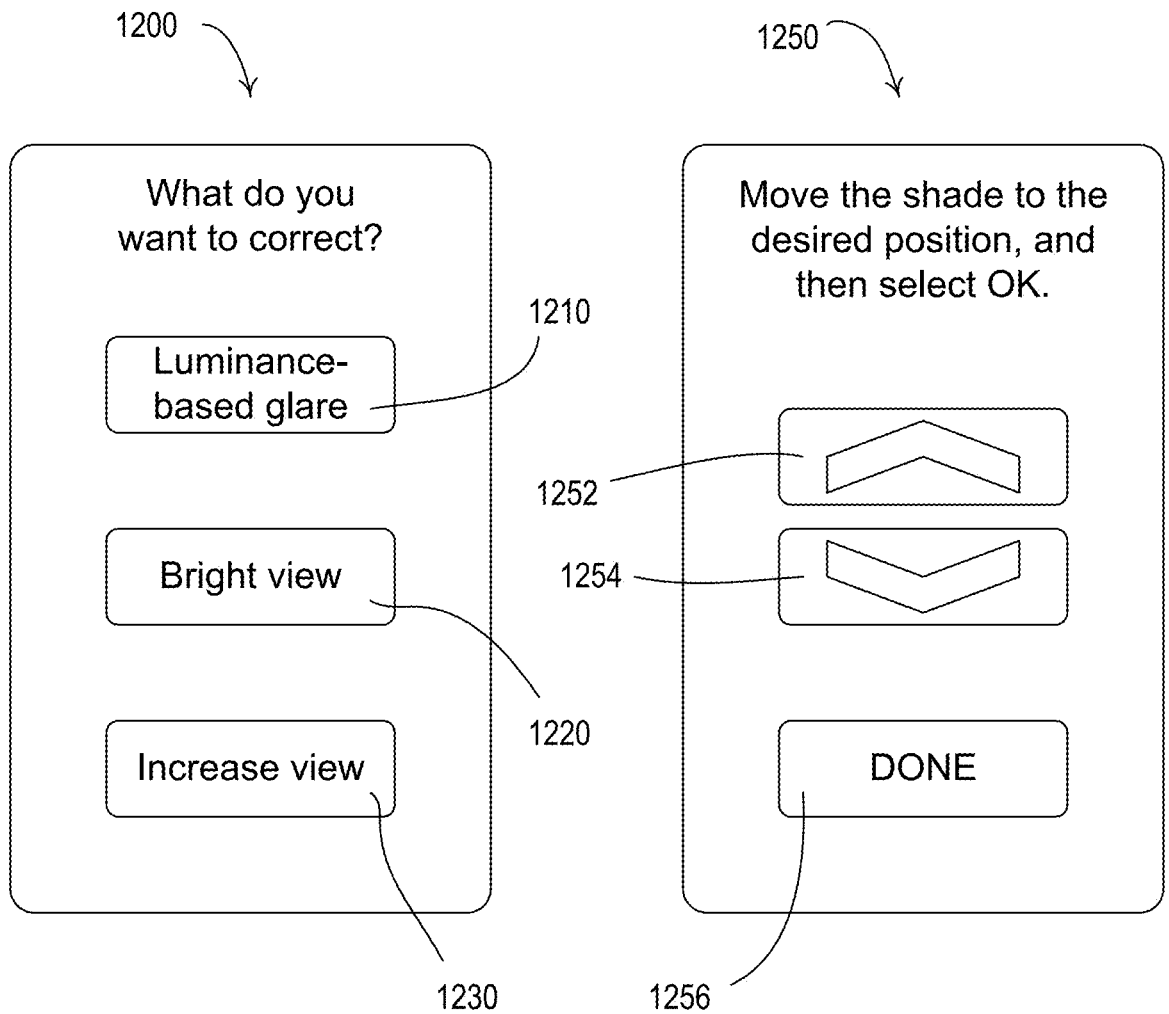
FIGS. 12A and 12B are example screens that may be displayed on a visible display of a network device during a maintenance procedure.

FIGS. 12A and 12B are example screens 1200, 1250 that may be displayed on a visible display of a network device, such as a mobile device (e.g., the mobile device 190) during the glare maintenance procedure 1100. For example, the example screen 1200 may be displayed after the user indicates that a glare problem exists at 1114, and the example screen 1250 may be displayed after the user selects the type of glare problem at 1116.

As shown in FIG. 12A, the example screen 1200 may include one or more buttons 1210, 1220, 1230. Each of the buttons 1210, 1220, 1230 may display text indicating a type of glare problem. A user of the mobile device may indicate the type of glare problem that exists in the area in which the mobile device is located by selecting one of the buttons 1210, 1220, 1230. For example, as shown in FIG. 12A, the user may select the button 1210 to indicate that a luminance-based glare exists in the area, the button 1220 to indicate that the area is too bright, or the button 1230 to indicate that the area is too dark. The text on the buttons 1210, 1220, 1230 may be the same as or different from that shown in FIG. 12A. For example, the button 1210 may be labeled "Luminance-based glare" (e.g., as shown in FIG. 12A), "Direct glare," or another term may be used.

After the user selects one of the buttons 1210, 1220, 1230, the mobile device may display example screen 1250. As shown in FIG. 12B, the example screen 1250 may include two arrow buttons (e.g., an up arrow button 1252 and a down button 1254) and/or a "done" button 1256. The user may press one of the arrow buttons 1252, 1254 to adjust the shade position of a motorized window position. For example, the user may press the up arrow button 1252 to move the shade position up and the down arrow button 1254 to move the shade position down. The user may select the "done" button 1256 once the shade position has been adjusted and the glare problem has been eliminated.

The input from the glare maintenance procedure may be used to update the settings for the glare prevention procedure. As described herein, a glare prevention procedure (e.g., the glare prevention procedure 700) may be performed when it is determined that a glare condition exists. The existence of a glare condition may be determined by processing an image, and comparing a value associated with the image to a threshold value. For example, the image may include one or more pixels, with each pixel having a luminance value $L_P$ and an illuminance value $E_P$. It may be determined that a glare condition exists if the luminance $L_P$ for a given pixel is above a glare condition luminance threshold $L_{TH}$, and/or if a total illuminance value $E_{TOT}$ for multiple pixels is above a glare condition illuminance threshold $E_{TH}$. If the user adjusts the shade position after the glare prevention procedure is performed, it may indicate that one or more of the luminance threshold $L_{TH}$ and the total illuminance value $E_{TOT}$ used in the glare prevention procedure is inaccurate. For example, if the user raises the shade position (e.g., allows more light into the area in which the motorized window treatment is located), the luminance threshold $L_{TH}$ and/or the total illuminance value $E_{TOT}$ may be too low. If the user lowers the shade position (e.g., allows less light into the area), the luminance threshold $L_{TH}$ and/or the total illuminance value $E_{TOT}$ may be too high. One or more of the luminance threshold $L_{TH}$ and/or the total illuminance value $E_{TOT}$ may be updated based on the adjusted shade position as described herein.

Figure 13:
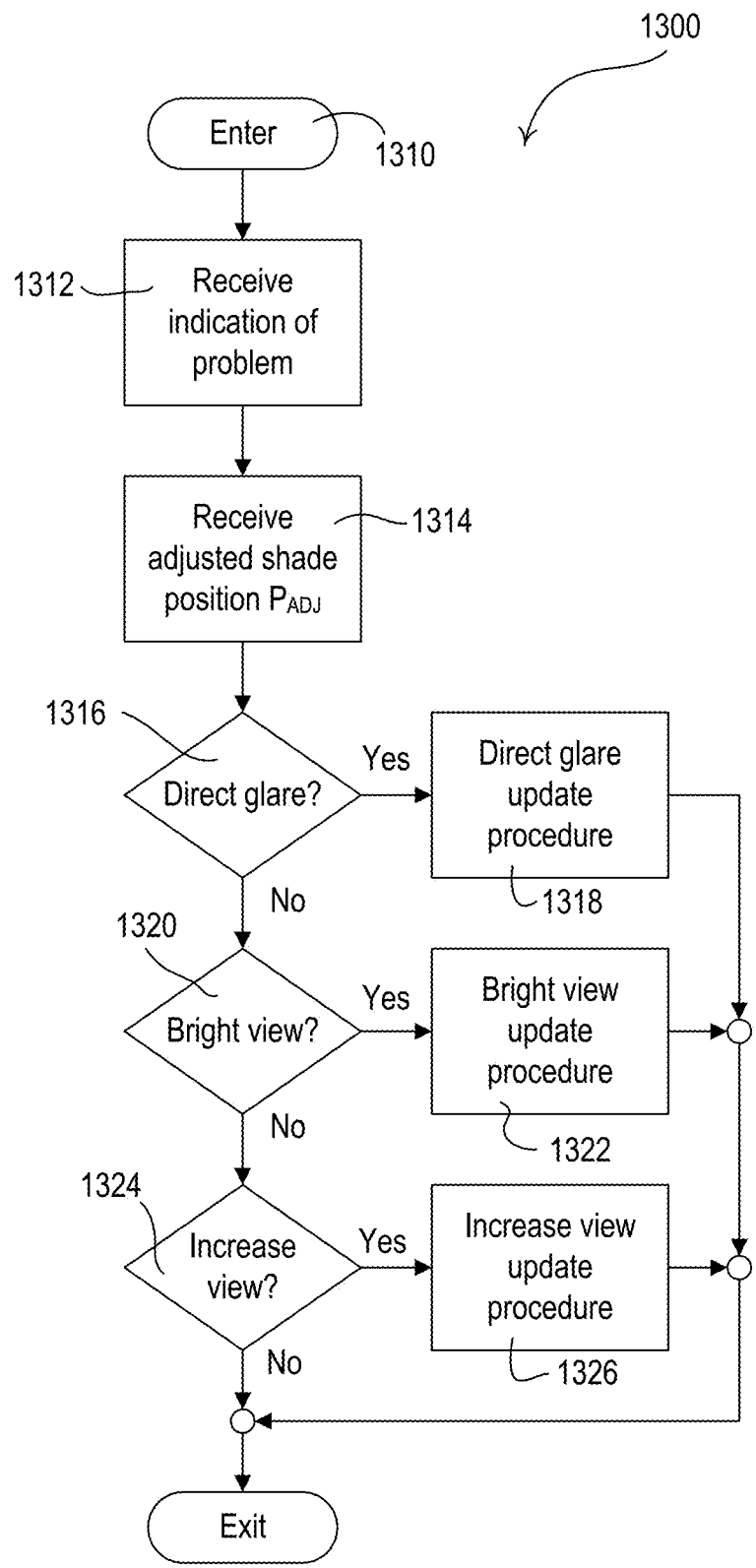
FIG. 13 is a flowchart of an example adjustment procedure.

FIG. 13 is an example flowchart of an adjustment procedure 1300 that may be executed by a control device of a load control system (e.g., the system controller 110 and/or the mobile device 190 of the load control system 100) for adjusting the operation of a glare prevention procedure (e.g., the glare prevention procedure 700). For example, the adjustment procedure 1300 may be executed after the maintenance procedure 1100 shown in FIG. 11.

The adjustment procedure 1300 may begin at 1310. At 1312, the control device may receive an indication that a glare problem exists in an area in which the load control system is located. For example, the control device may receive the indication based on input from an occupant of the area (e.g., at 1114 of the glare maintenance procedure 1100). The occupant may indicate that the glare problem exists via a mobile device (e.g., an application running thereon). The control device may receive an indication of the type of the glare problem, for example based on input from the occupant via the mobile device (e.g., at 1116 of the maintenance procedure 1100).

At 1314, the control device may receive an adjusted shade position $P_{ADJ}$ of a motorized window treatment. For example, the occupant may adjust the shade position by pressing a button (e.g., one of the arrow buttons 1252, 1254 shown in FIG. 12B) on a display of the mobile device until the glare problem is eliminated (e.g., at 1118 of the glare maintenance procedure 1100). The control device may receive the adjusted shade position $P_{ADJ}$ from, for example, the motorized window treatment, the mobile device, and/or the system controller.

The control device may determine whether the glare problem is that the user had indicated a luminance-based glare condition (e.g., a direct luminance glare condition) at 1316, for example based on the indication of the type of the glare problem received from the mobile device. If the control device determines that the glare problem is a luminance-based glare condition, the control device may execute a luminance-based glare update procedure at 1318. For example, the control device may execute the luminance-based glare update procedure 1700 shown in FIG. 17. The luminance-based glare update procedure may be used to update the value of the glare condition luminance threshold $L_{TH}$ to be an updated luminance threshold $L_{TH-NEW}$. For example, the updated luminance threshold $L_{TH-NEW}$ may be lower than the glare condition luminance threshold $L_{TH}$. The updated luminance threshold $L_{TH-NEW}$ may be stored in a profile associated with the occupant. After the control device has executed the luminance-based glare update procedure at 1318, the adjustment procedure 1300 may exit.

If the control device determines that the glare problem is not a luminance-based glare condition at 1316, the control device may determine whether the glare problem is that the user has indicated a bright view condition (e.g., an illuminance-based glare condition) at 1320, for example based on the indication of the type of the glare problem received from the mobile device. If the control device determines that the glare problem is a bright view condition, the control device may execute a bright view update procedure at 1322. For example, the control device may execute the bright view update procedure 1900 shown in FIG. 19. The bright view update procedure may be used to update the value of the glare condition illuminance threshold $E_{TH}$ to be an updated illuminance threshold $E_{TH-NEW}$. For example, the updated illuminance threshold $E_{TH-NEW}$ may be lower than the glare condition illuminance threshold $E_{TH}$. The updated illuminance threshold $E_{TH-NEW}$ may be stored in a profile associated with the occupant. After the control device has executed the bright view update procedure at 1322, the adjustment procedure 1300 may exit.

If the control device determines that the glare problem is not a bright view condition at 1316, the control device may determine whether the glare problem is that the user would like an increase view (e.g., the user would like to see of the outdoors more through the windows) at 1324, for example based on the indication of the type of the glare problem received from the mobile device. If the control device determines that the glare problem is a desire for an increased view, the control device may execute an increase view update procedure at 1326. For example, the control device may execute the increase view update procedure 2100 shown in FIG. 21. The increase view update procedure may be used to update the value of the glare condition illuminance threshold $E_{TH}$ to be an updated illuminance threshold $E_{TH-NEW}$. For example, the updated illuminance threshold $E_{TH-NEW}$ may be higher than the glare condition illuminance threshold $E_{TH}$. The increase view update procedure may (e.g., additionally or alternatively) be used to update the value of the glare condition luminance threshold $L_{TH}$ to be an updated luminance threshold $L_{TH-NEW}$. For example, the updated luminance threshold $L_{TH-NEW}$ may be higher than the glare condition luminance threshold $L_{TH}$. The updated illuminance threshold $E_{TH-NEW}$ and/or the updated luminance threshold $L_{TH-NEW}$ may be stored in a profile associated with the occupant. After the control device has executed the increase view update procedure at 1326, the adjustment procedure 1300 may exit.

Figure 14:
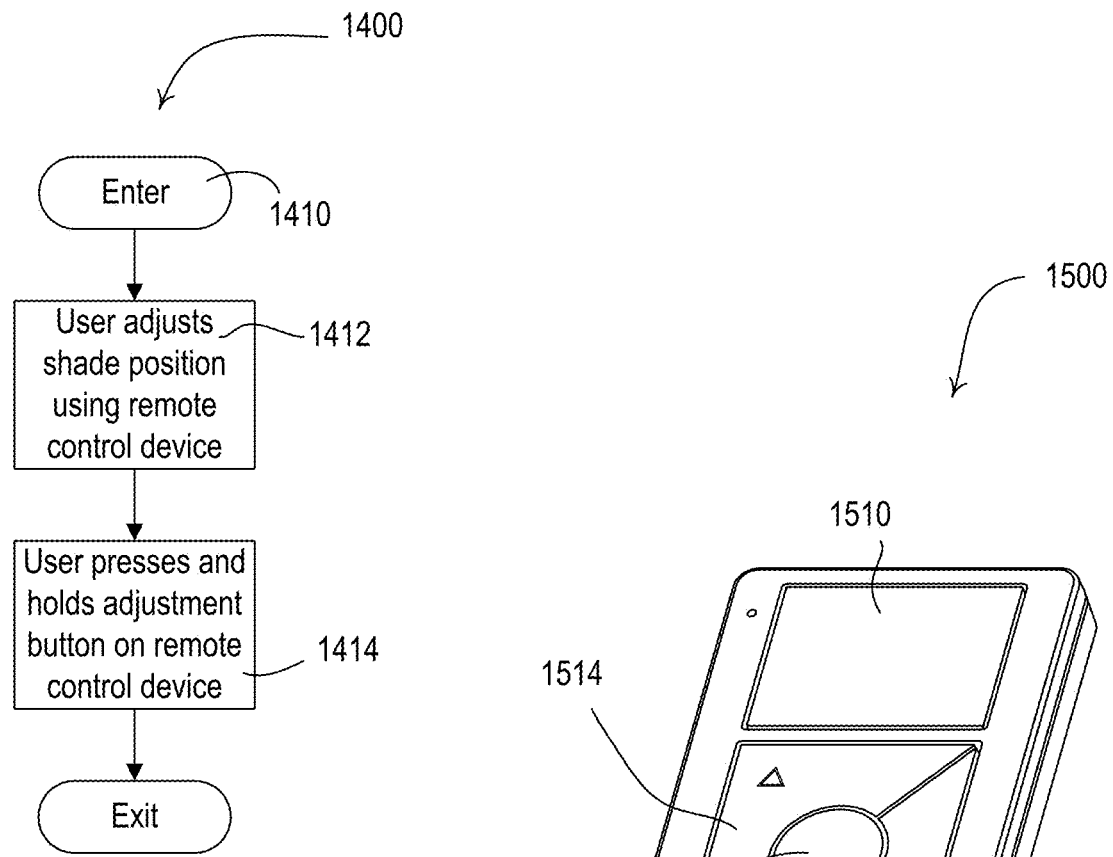
FIG. 14 is another flowchart of an example maintenance procedure.

Although the glare maintenance procedure 1100 shown in FIG. 11 may be performed using a mobile device, another type of control device may be used to perform a glare maintenance procedure. For example, as shown in FIG. 14, a glare maintenance procedure may be performed using a control device (e.g., a remote control device). A remote control device may be used, for example, when a mobile device is unavailable or unable to connect to a network. In addition, using the remote control device may simplify the glare maintenance procedure by removing the need to indicate that a glare problem exists or the type of the glare problem.

FIG. 14 is an example flowchart of a glare maintenance procedure 1400 that may be completed by a user of a remote control device in a load control system (e.g., the load control system 100) for adjusting the operation of a glare prevention procedure (e.g., the glare prevention procedure 700). The glare maintenance procedure 1400 may be used to change the state of one or more control devices in a load control system (e.g., the load control system 100 shown in FIG. 1). For example, the glare maintenance procedure 1400 may be used to adjust the shade position of a motorized window treatment (e.g., the motorized window treatment 150) when the user would prefer a different shade position in response to a problem (e.g., to enable a better view or when the user is experiencing glare). The glare maintenance procedure 1400 may be performed by an occupant of an area in which the control devices are located. For example, the occupant may be a user of a remote control device (e.g., the mobile device 170). The glare maintenance procedure 1400 may be performed after the glare prevention procedure has been performed. For example, the glare maintenance procedure 1400 may be performed if a glare problem persists after the glare prevention procedure is performed.

The glare maintenance procedure 1400 may begin at 1410. At 1412, the user may adjust the shade position of the motorized window treatment using the remote control device. For example, the remote control device may have one or more buttons for adjusting the shade position (e.g., the arrow buttons 1514, 1516 in FIG. 15, respectively). The user may move the shade position up or down by pressing the corresponding button on the remote control device. The remote control device may determine that the user is pressing a button to adjust the shade position up or down, and may send one or more messages to the motorized window treatment (e.g., via a system controller) that instruct the motorized window treatment to adjust the shade position. The motorized window treatment may adjust the shade position in response to the messages.

After the user has adjusted the shade position at 1412, the user may press and hold an adjustment button (e.g., the button 1520 shown in FIG. 15) on the remote control device at 1414. When the user presses the adjustment button, the remote control device may send the adjusted shade position to the system controller. The system controller may receive the adjusted shade position, and may use the adjusted shade position to modify future instances of a glare prevention procedure (e.g., the glare procedure 700 shown in FIG. 7). For example, the system controller may determine an updated luminance threshold $L_{TH-NEW}$ and/or an updated illuminance threshold $E_{TH-NEW}$ based on the adjusted shade position as described herein, and may use the updated thresholds during the glare prevention procedure. For example, the system controller may determine the updated luminance threshold $L_{TH-NEW}$ via a luminance-based glare update procedure (e.g., the luminance-based glare update procedure 1700 shown in FIG. 17) and/or via a increase view update procedure (e.g., the increase view update procedure 2100 shown in FIG. 21). The system controller may determine the updated illuminance threshold $E_{TH-NEW}$ via a bright view update procedure (e.g., the bright view update procedure 1900 shown in FIG. 19) and/or via the increase view update procedure. These thresholds may be updated in response to the adjusted shade position of the user and stored for use during future instances of the glare prevention procedure. For example, the updated thresholds may be stored in a profile associated with the user. After the user presses the adjustment button at 1414, the procedure 1400 may exit.

Figure 15:
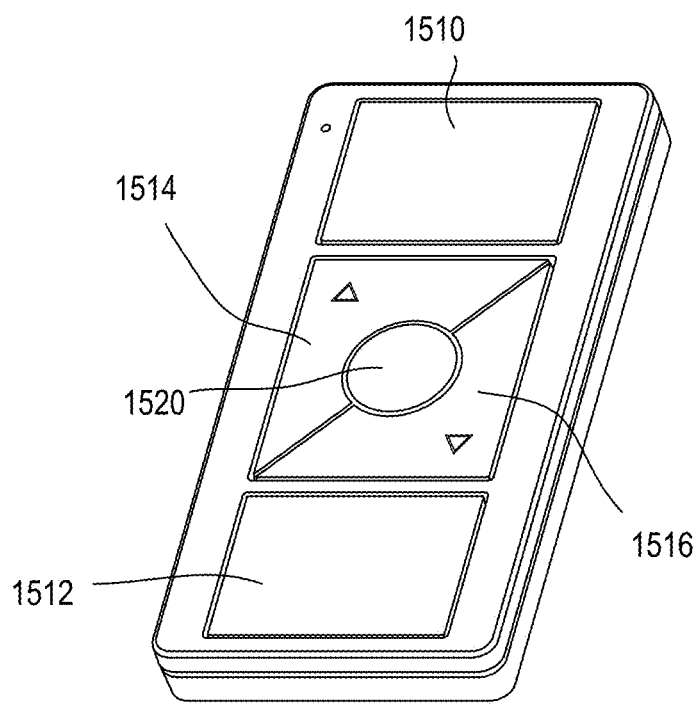
FIG. 15 is a perspective view of an example control device.

FIG. 15 is a perspective view of an example control device 1500 that may be used during the maintenance procedure 1400. For example, the control device 1500 may be a remote control device (e.g., the remote control device 170 shown in FIG. 1) for controlling one or more motorized window treatments. The control device 1500 may include one or more buttons. For example, the control device 1500 may include a fully-raised button 1510, a fully-lowered button 1512, a raise button 1514, a lower button 1516, and/or an adjustment button 1520. A user of the control device 1500 may press the raise button 1514 to raise the shade position of a motorized window treatment while the raise button 1514 is held or the lower button 1516 to lower the shade position while the lower button 1516 is held. The user may press the fully-raised button 1510 to raise the shade position to a fully-raised position $P_{FULLY-RAISED}$ or the fully-lowered button 1512 to lower the shade position to a fully-lowered position $P_{FULLY-LOWERED}$. The control device 1500 may include a wireless communication circuit (not shown) for transmitting messages (e.g., commands) to the motorized window treatment responsive to actuations of one or more of the buttons 1510, 1512, 1514, 1516, and/or 1520. For example, a user of the control device may press the raise button 1514, and the control device 1500 may send a command to the motorized window treatment to raise the shade position of the motorized window treatment. The control device 1500 may be handheld, mounted to a wall, and/or supported by a pedestal (e.g., a pedestal configured to be mounted on a tabletop).

The control device 1500 may be used as part of the glare maintenance procedure 1400 shown in FIG. 14. For example, at 1412 of the glare maintenance procedure 1412, a user of the control device 1500 may adjust the shade position by pressing the fully-raised button 1510 (e.g., to raise the shade position to the fully-raised position $P_{FULLY-RAISED}$), the fully-lowered button 1512 (e.g., to lower the shade position to the fully-lowered position $P_{FULLY-LOWERED}$), the raise button 1514 (e.g., to raise the shade position to an intermediate position between the fully-raised position $P_{FULLY-RAISED}$ and the fully-lowered position $P_{FULLY-LOWERED}$), and/or the lower button 1516 (e.g., to lower the shade position to an intermediate position between the fully-raised position $P_{FULLY-RAISED}$ and the fully-lowered position $P_{FULLY-LOWERED}$). After the user has completed adjusting the shade position at 1412, the user may press the adjustment button 1520 at 1414 to indicate that the user has completed adjusting the shade position.

As disclosed herein, after a glare maintenance procedure (e.g., the glare maintenance procedure 1100 shown in FIG. 11) has been performed, one or more threshold values used in a glare prevention procedure (e.g., the glare prevention procedure 700 shown in FIG. 7) may be updated. For example, as shown in FIG. 13, a control device may receive an indication that a problem exists, a type of the problem, and an adjusted shade position. The control device may select one or more threshold values to be updated based on the type of problem. The control device may then update the selected threshold value(s) based on the adjusted shade position. However, the control device may fail to receive an indication of the type of the problem in certain situations. For example, the shade position may be adjusted using a remote control (e.g., the remote control device 1500), or the user of a mobile device may fail to indicate the type of glare problem. If the control device fails to receive the indication of the type of the problem, the control device may determine a most likely type of problem, and may select the threshold value(s) to be updated based on the determined type, for example, as shown in FIG. 16.

Figure 16:
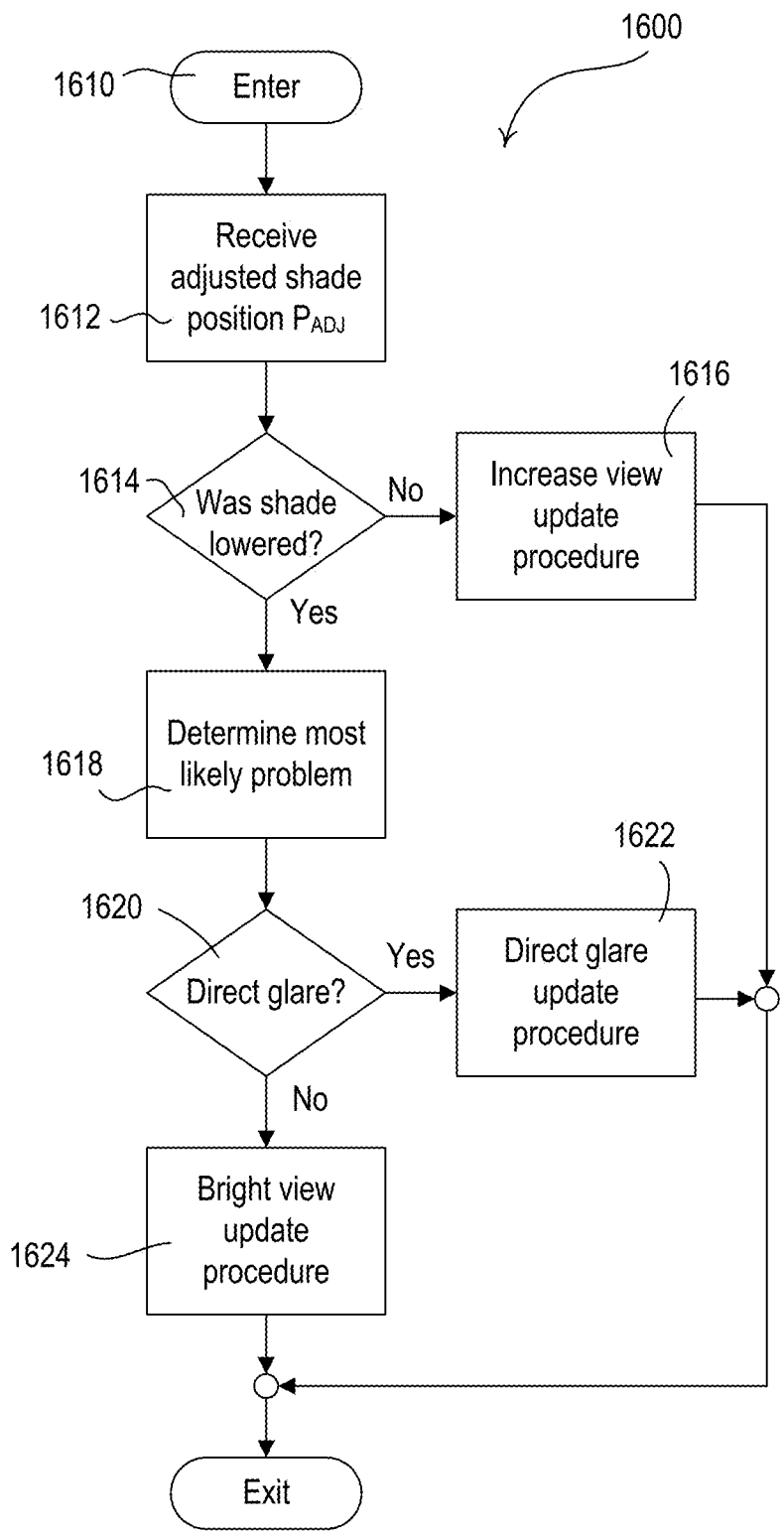
FIG. 16 is another flowchart of an example adjustment procedure.

FIG. 16 is an example flowchart of an adjustment procedure 1600 may that be executed by a control device of a load control system (e.g., the system controller 110 and/or the mobile device 190 of the load control system 100) for adjusting the operation of a glare prevention procedure (e.g., the glare prevention procedure 700). For example, the adjustment procedure 1600 may be executed after the glare maintenance procedure 1100 shown in FIG. 11.

The adjustment procedure 1600 may begin at 1610. At 1612, the control device may receive an adjusted shade position $P_{ADJ}$ of a motorized window treatment. For example, the control device may receive the adjusted shade position based on input from an occupant of the area in which the motorized window treatment and/or the control device is located (e.g., at 1114 of the glare maintenance procedure 1100). The occupant may adjust the shade position via a glare maintenance procedure when the occupant determines that a glare problem exists after performance of a glare prevention procedure. The occupant may adjust the shade position via a mobile device (e.g., an application running thereon) and/or a remote control device. For example, the occupant may adjust the shade position by pressing a button (e.g., one of the arrow buttons 1252, 1254 shown in FIG. 12B) on a display of the mobile device and/or a button (e.g., one of the arrow buttons 1514, 1516 shown in FIG. 15) on the remote control device until the glare problem is eliminated (e.g., at 1118 of the glare maintenance procedure 1100). The control device may receive the adjusted shade position $P_{ADJ}$ from, for example, the motorized window treatment, the mobile device, the remote control device, and/or the system controller.

At 1614, the control device may determine whether the shade position was lowered. For example, the control device may compare the adjusted shade position to a previous shade position, and may determine that the shade position was lowered if the adjusted shade position is lower than the previous shade position. Alternatively and/or additionally, the control device may receive an indication that the shade position was lowered from, for example, the motorized window treatment, the mobile device, the remote control device, and/or the system controller. If the control device determines that the shade position was raised at 1614, the control device may execute an increase view update procedure at 1616 to increase the view provided to the occupant of the space. For example, the control device may execute the increase view update procedure 2100 shown in FIG. 21. This increased view may be used to increase the view to the occupant of the space even though the possibility of glare conditions may increase, as this may be the occupant preference. The increase view update procedure may be used to update the value of a glare condition illuminance threshold $E_{TH}$ used in a glare prevention procedure to be an updated illuminance threshold $E_{TH-NEW}$. For example, the updated illuminance threshold $E_{TH-NEW}$ may be higher than the glare condition illuminance threshold $E_{TH}$. The increase view update procedure may (e.g., additionally or alternatively) be used to update the value of the glare condition luminance threshold $L_{TH}$ to be an updated luminance threshold $L_{TH-NEW}$. For example, the updated luminance threshold $L_{TH-NEW}$ may be higher than the glare condition luminance threshold $L_{TH}$. After the control device has executed the increase view update procedure at 1616, the adjustment procedure 1600 may exit.

If the control device determines at 1614 that the shade position was lowered, the control device may determine the most likely problem at 1618 (e.g., one of the luminance-based glare condition and/or the bright view condition). The control device may determine that the most likely problem was not a desire to increase view if the control device determines that the shade position was lowered. The control device may determine the most likely problem based on an analysis of one or more images looking out from the window. For example, the control device may analyze a previous image and a present image. The control device may determine respective maximum luminance values (e.g., the luminance of the pixel, or group of pixels, having the highest luminance value) and/or respective total illuminance values (e.g., a sum of the illuminance of each pixel) for the previous image and the present image. The control device may compare the maximum luminance values and/or the total illuminance values and may determine which value has the greatest relative difference across the two images. For example, the control device may determine that the maximum luminance value of the present image is 10% lower than the maximum luminance value of the previous image, and that the total illuminance value of the present image is 25% lower than the total illuminance value of the previous image. If the difference in the maximum luminance values is greater, the control device may determine that the problem was most likely a luminance-based glare condition. If the difference in the total illuminance value is greater, the control device may determine that the problem was most likely a bright view condition.

If the control device determines that the most likely problem is a luminance-based glare condition at 1620, the control device may execute a luminance-based glare update procedure at 1622. For example, the control device may execute a luminance-based glare update procedure 1700 shown in FIG. 17. The luminance-based glare update procedure may be used to update the value of a glare condition luminance threshold $L_{TH}$ to be an updated luminance threshold $L_{TH-NEW}$. For example, the updated luminance threshold $L_{TH-NEW}$ may be lower than the glare condition luminance threshold $L_{TH}$. After the control device has executed the luminance-based glare update procedure at 1622, the adjustment procedure 1600 may exit.

If the control device determines that the glare problem is a bright view condition at 1620, the control device may execute a bright view update procedure at 1624. For example, the control device may execute a bright view update procedure 1900 shown in FIG. 19. The bright view update procedure may be used to update the value of an illuminance-based glare condition threshold $E_{TH}$ to be an updated illuminance threshold $E_{TH-NEW}$. For example, the updated illuminance threshold $E_{TH-NEW}$ may be lower than the glare condition illuminance threshold $E_{TH}$. One or more other procedures may be performed to update thresholds other than the glare condition luminance threshold $L_{TH}$ and the glare condition illuminance threshold $E_{TH}$. After the control device has executed the bright view update procedure at 1624, the adjustment procedure 1600 may exit.

Figure 17:
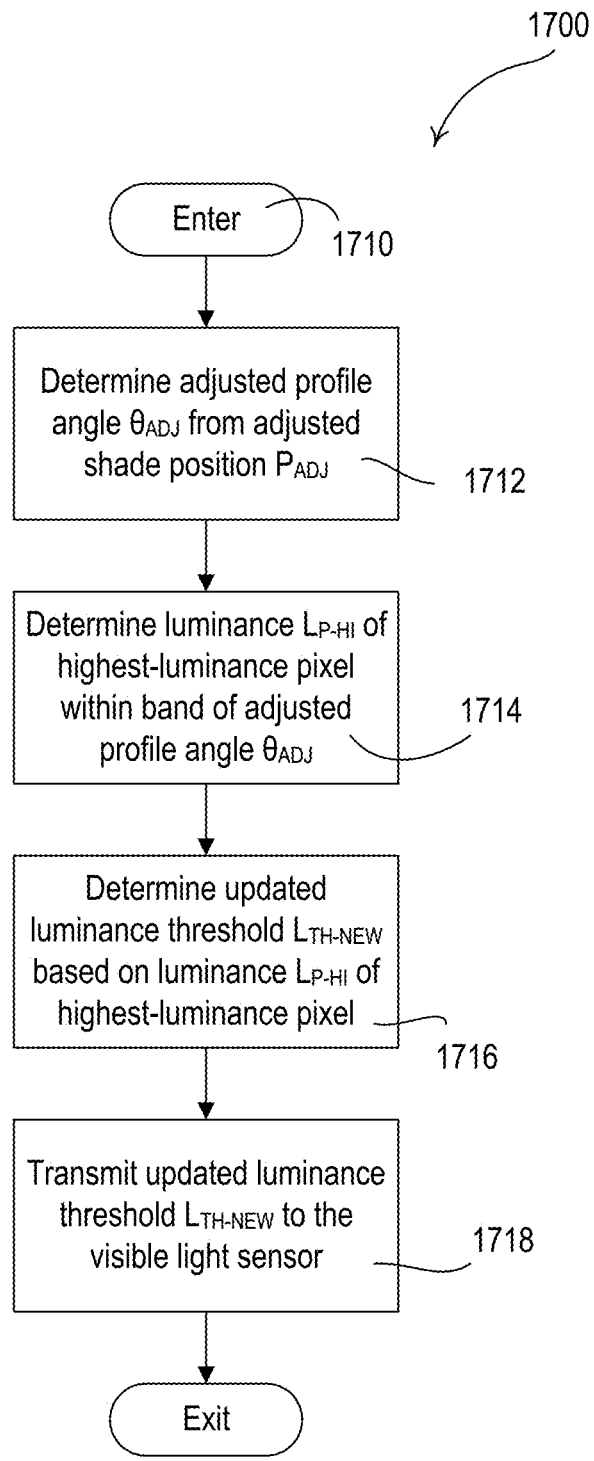
FIG. 17 is a flowchart of an example luminance-based glare update procedure.
Figure 18:
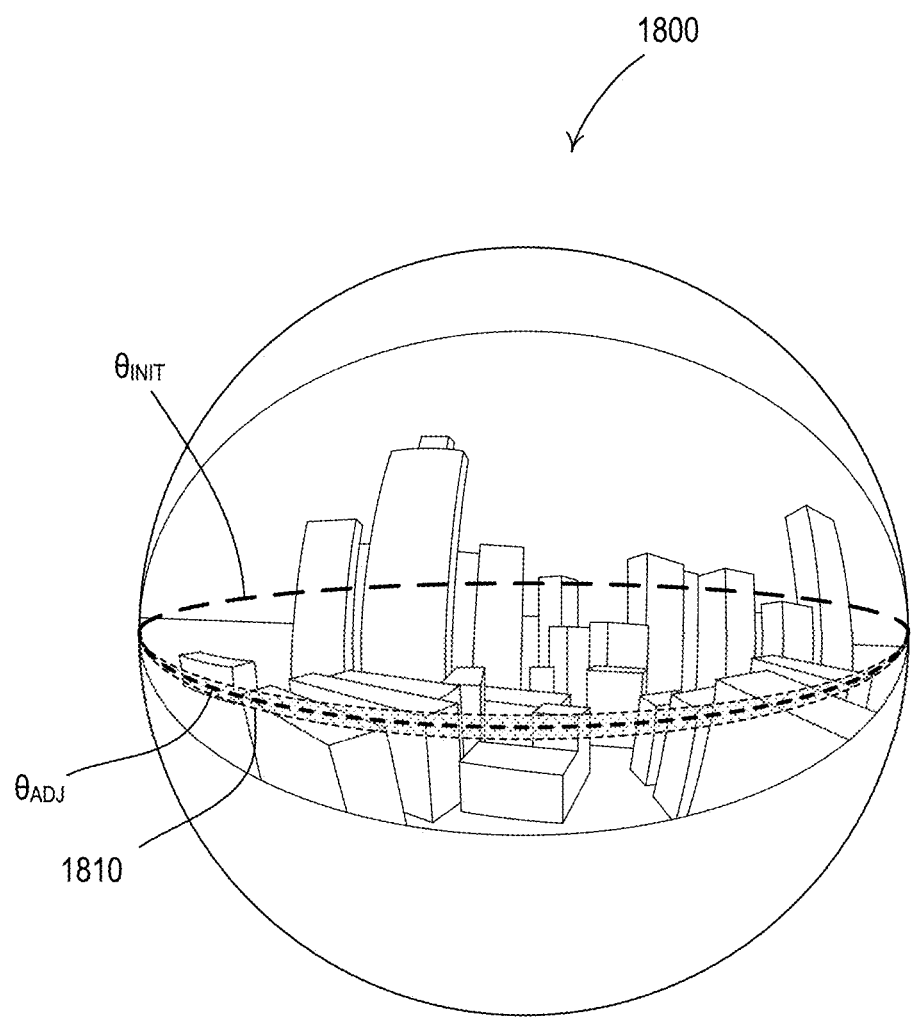
FIG. 18 is a warped image provided to illustrate the operation of a control device during a luminance-based glare update procedure.

FIG. 17 is an example flowchart of a luminance-based glare update procedure 1700 that maybe executed by a control device of the load control system (e.g., the system controller 110 and/or the mobile device 190 of the load control system 100) for adjusting the operation of a glare detection procedure (e.g., the glare detection procedure 800 and/or the glare detection procedure 900) of a sensor (e.g., the visible light sensor 180, 182). FIG. 18 is a warped image 1800 provided to illustrate the operation of the control device during the luminance-based glare update procedure 1700. For example, the luminance-based glare update procedure 1700 may be executed at 1318 of the adjustment procedure 1300 shown in FIG. 13 and/or at 1622 of the adjustment procedure 1600 shown in FIG. 16.

The control device may execute the luminance-based glare update procedure 1700 at 1710. At 1712, the control device may determine an adjusted profile angle $\theta_{ADJ}$ from an adjusted shade position $P_{ADJ}$ (e.g., as adjusted by the user at 1116 of the maintenance procedure 1110 and/or at 1412 of the maintenance procedure 1400). For example, the user may adjust (e.g., lower) the position of the motorized window treatment from an initial position $P_{INIT}$ (e.g., associated with an initial profile angle $\theta_{INIT}$) to the adjusted shade position $P_{ADJ}$ (e.g., associated with the adjusted profile angle $\theta_{ADJ}$) as shown in FIG. 18. The adjusted shade position $P_{ADJ}$ may be received by the control device, for example, at 1314 of the adjustment procedure 1300 and/or at 1612 of the adjustment procedure 1600. The operation completed by the control device at 1712 may be the opposite action of the operation completed at 728 of the glare prevention procedure 700. For example, the control device may determine the adjusted profile angle $\theta_{ADJ}$ as the lowest profile angle of the image that is covered by the motorized window treatment at the adjusted shade position $P_{ADJ}$.

At 1714, the control device may determine a luminance $L_{P-HI}$ of the highest-luminance pixel within a band 1810 surrounding the adjusted profile angle $\theta_{ADJ}$ (e.g., as shown in FIG. 18). For example, the control device may step through each of the pixels within the band 1810 and determine the luminance of each of the pixels within the band 1810 (e.g., in a similar manner as at step 816 of the glare detection procedure 800). The control device may then determine the maximum luminance of the determined luminances within the band 1810.

At 1716, the control device may be configured to set an updated luminance threshold $L_{TH-NEW}$ based on the luminance $L_{P-HI}$ of the highest-luminance pixel within a band 1810 (e.g., as determined at 1714). The control device may be configured to set the updated luminance threshold $L_{TH-NEW}$ to one of a number of discrete luminance threshold values $L_{TH-V}[x]$, where x represents the number of one of the discrete luminance threshold values. For example, the control device may be configured to set the updated luminance threshold $L_{TH-NEW}$ to one of the number of discrete luminance threshold values $L_{TH-V}[x]$ that is less than (e.g., the next less than) the luminance $L_{P-HI}$ of the highest-luminance pixel. At 1718, the control device may transmit the updated luminance threshold $L_{TH-NEW}$ determined at 1716 to the visible light sensor, and the luminance-based glare update procedure 1700 may exit.

Figure 19:
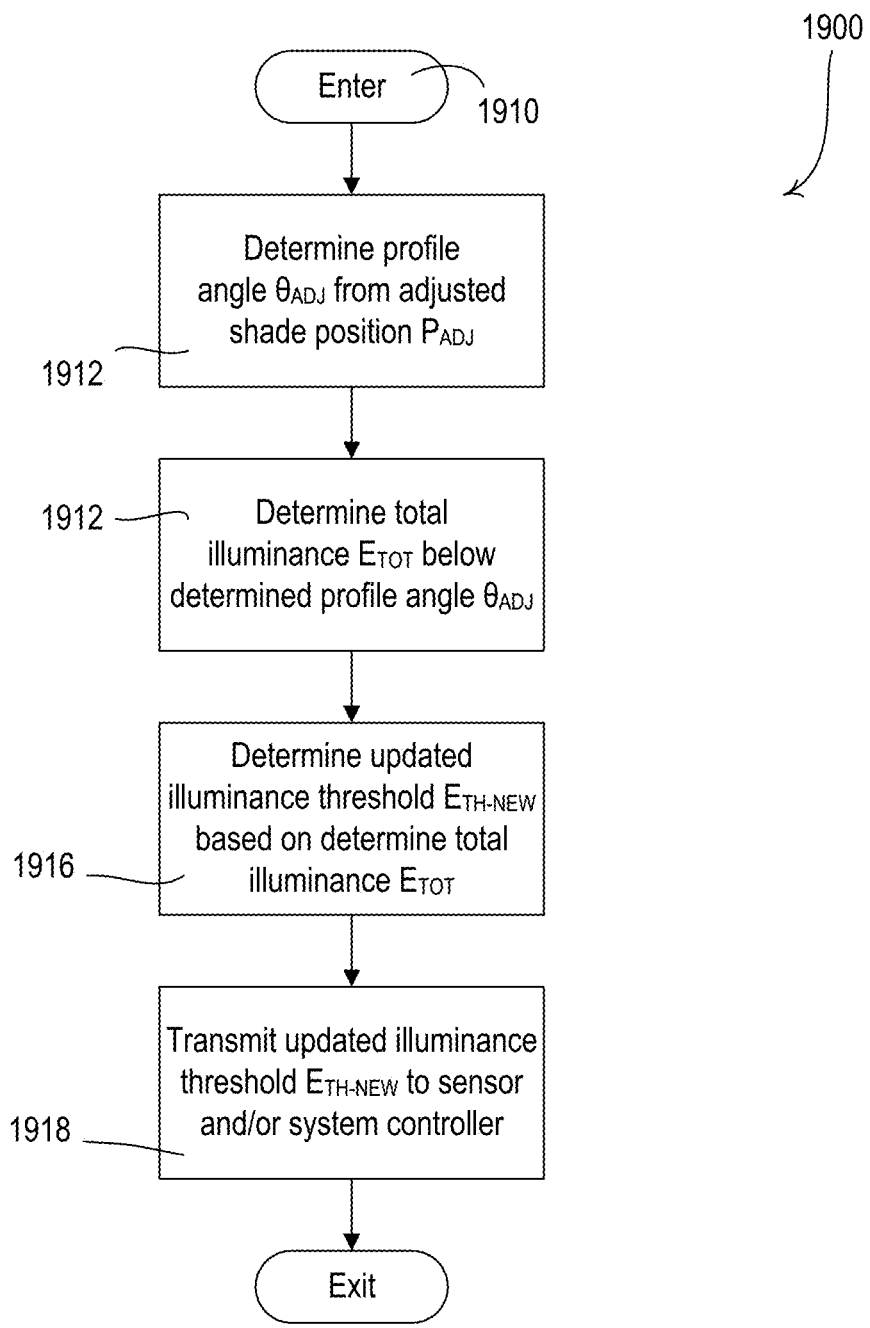
FIG. 19 is a flowchart of an example bright view update procedure.
Figure 20:
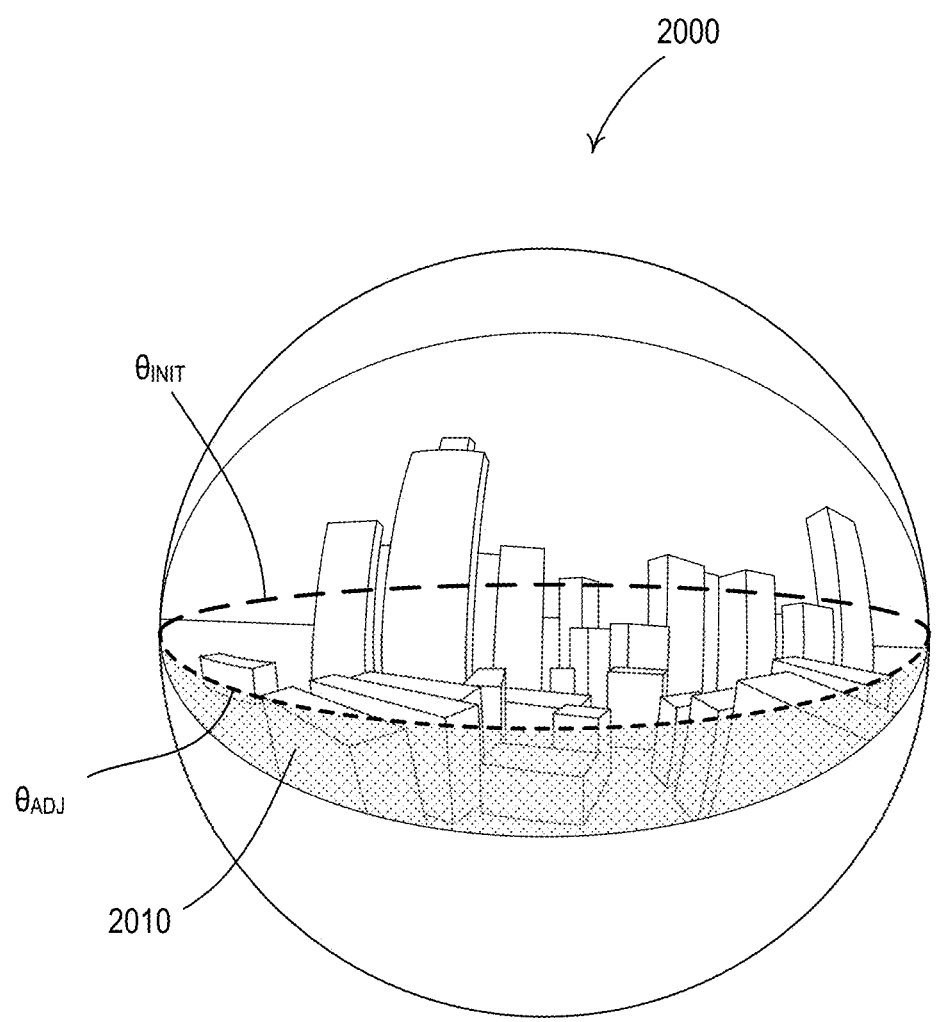
FIG. 20 is a warped image provided to illustrate the operation of a control device during a bright view update procedure.

FIG. 19 is an example flowchart of a bright view update procedure 1900 that maybe executed by a control device of the load control system (e.g., the system controller 110 and/or the mobile device 190 of the load control system 100) for adjusting the operation of a glare detection procedure (e.g., the glare detection procedure 1000) of a sensor (e.g., the visible light sensor 180, 182). FIG. 20 is a warped image 2000 provided to illustrate the operation of the control device during the bright view update procedure 1900. For example, the bright view update procedure 1900 may be executed at 1322 of the adjustment procedure 1300 shown in FIG. 13 and/or at 1624 of the adjustment procedure 1600 shown in FIG. 16.

The control device may execute the bright view update procedure 1900 at 1910. At 1912, the control device may determine an adjusted profile angle $\theta_{ADJ}$ from an adjusted shade position $P_{ADJ}$ (e.g., as adjusted by the user at 1116 of the maintenance procedure 1110 and/or at 1412 of the maintenance procedure 1400). For example, the user may adjust (e.g., lower) the position of the motorized window treatment from an initial position $P_{INIT}$ (e.g., associated with an initial profile angle $\theta_{INIT}$) to the adjusted shade position $P_{ADJ}$ (e.g., associated with the adjusted profile angle $\theta_{ADJ}$) as shown in FIG. 20. The adjusted shade position $P_{ADJ}$ may be received by the control device, for example, at 1314 of the adjustment procedure 1300 and/or at 1612 of the adjustment procedure 1600. The operation completed by the control device at 1912 may be the opposite of the operation completed at 728 of the glare prevention procedure 700. For example, the control device may determine the adjusted profile angle $\theta_{ADJ}$ as the lowest profile angle of the image that is covered by the motorized window treatment at the adjusted shade position $P_{ADJ}$.

At 1914, the control device may determine the total illuminance $E_{TOT}$ below the adjusted profile angle $\theta_{ADJ}$. For example, the control device may determine the total illuminance $E_{TOT}$ below the adjusted profile angle $\theta_{ADJ}$ by summing the illuminance contributions $E_P$ of all of the pixels in a region 2010 below the adjusted profile angle $\theta_{ADJ}$ (e.g., as shown in FIG. 20). For example, the control circuit may calculate the illuminance contribution $E_P$ of each of the pixels using the luminance $L_P$ of the pixel and the pixel angle $\theta_P$ of the pixel, e.g., $E_P=(2\pi/N_P) \cdot L_P \cdot \cos(\theta_P)$, where $N_P$ is the total number of pixels in the image being processed. At 1916, the control device may be configured to set an updated illuminance threshold $E_{TH-NEW}$ based on the total illuminance $E_{TOT}$ below the adjusted profile angle $\theta_{ADJ}$ (e.g., as determined at 1914). For example, the control device may set the updated illuminance threshold $E_{TH-NEW}$ equal to the total illuminance $E_{TOT}$ below the adjusted profile angle $\theta_{ADJ}$. At 1918, the control device may transmit the updated illuminance threshold $E_{TH-NEW}$ determined at 1916 to the visible light sensor, and the bright view update procedure 1900 may exit.

Figure 21:
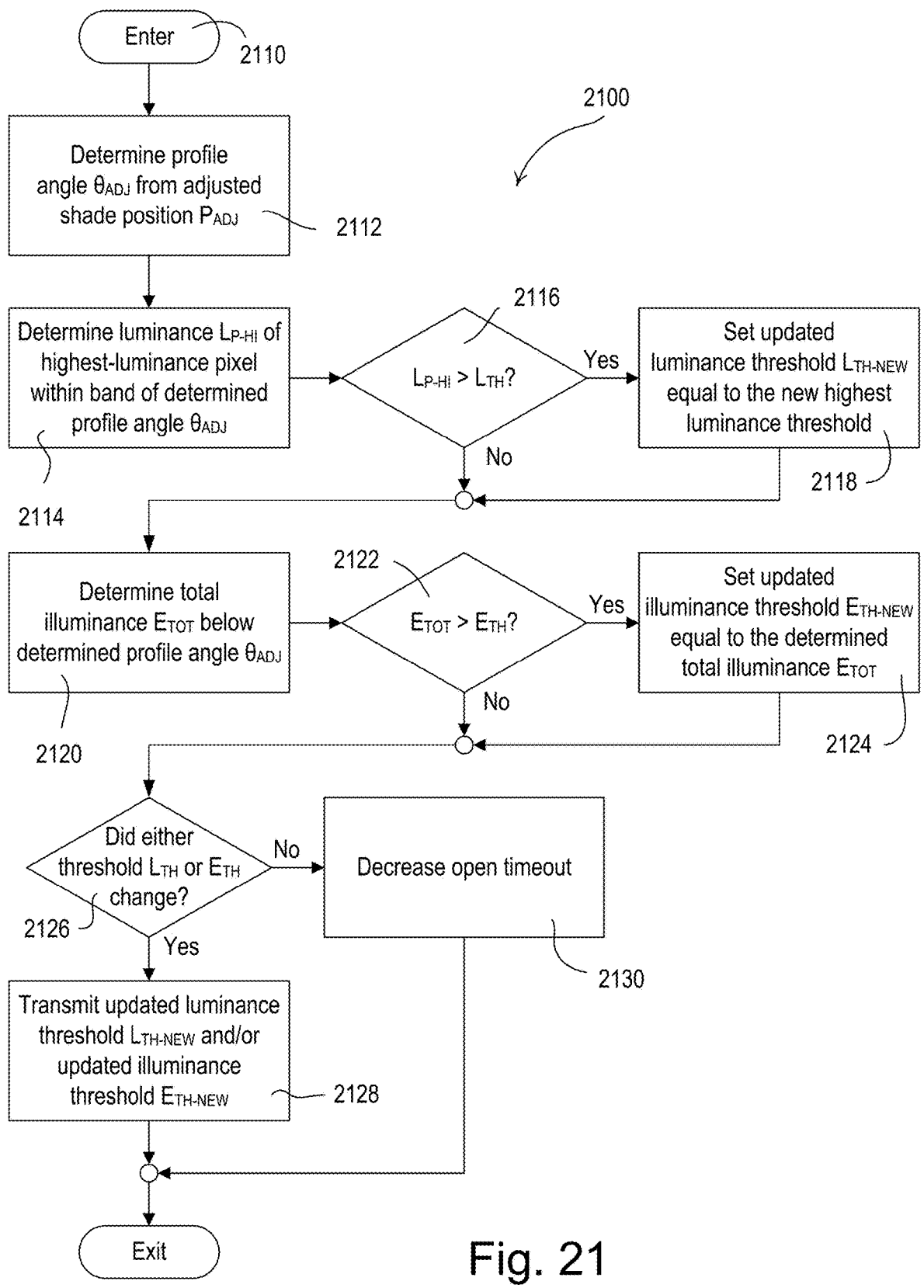
FIG. 21 is a flowchart of an example increase view update procedure.

FIG. 21 is an example flowchart of an increase view update procedure 2100 that maybe executed by a control device of the load control system (e.g., the system controller 110 and/or the mobile device 190 of the load control system 100) for adjusting the operation of a glare detection procedure (e.g., the glare detection procedures 800, 900, 1000) of a sensor (e.g., the visible light sensor 180, 182). For example, the increase view update procedure 2100 may be executed at 1326 of the adjustment procedure 1300 shown in FIG. 13 and/or at 1616 of the adjustment procedure 1600 shown in FIG. 16.

The control device may execute the increase view update procedure 2100 at 2110. At 2112, the control device may determine an adjusted profile angle $\theta_{ADJ}$ from an adjusted shade position $P_{ADJ}$ (e.g., as adjusted by the user at 1116 of the maintenance procedure 1110 and/or at 1412 of the maintenance procedure 1400). The adjusted shade position $P_{ADJ}$ may be received by the control device, for example, at 1314 of the adjustment procedure 1300 and/or at 1612 of the adjustment procedure 1600. The control device may determine the adjusted profile angle $\theta_{ADJ}$ as the lowest profile angle of the image that is covered by the motorized window treatment at the adjusted shade position $P_{ADJ}$ (e.g., in a similar manner as at 1712 of the luminance-based glare update procedure 1700 and at 1912 of the bright view update procedure 1900).

At 2114, the control device may determine a luminance $L_{P-HI}$ of the highest-luminance pixel within a band surrounding the adjusted profile angle $\theta_{ADJ}$ (e.g., in a similar manner as at 1714 of the luminance-based glare update procedure 1700). For example, the control device may step through each of the pixels within the band, determine the luminance of each of the pixels within the band, and determine the maximum luminance of the determined luminances within the band. If the luminance $L_{P-HI}$ of the highest-luminance pixel within the band surrounding the adjusted profile angle $\theta_{ADJ}$ is greater than a present luminance threshold $L_{TH}$ at 2116, the control circuit may set an updated luminance threshold $L_{TH-NEW}$ equal to the luminance $L_{P-HI}$ of the highest-luminance pixel within a band surrounding the adjusted profile angle $\theta_{ADJ}$ at 2118.

At 2120, the control device may determine the total illuminance $E_{TOT}$ below the adjusted profile angle $\theta_{ADJ}$ (e.g., in a similar manner as at 1914 of the bright view update procedure 1700). For example, the control device may determine the total illuminance $E_{TOT}$ below the adjusted profile angle $\theta_{ADJ}$ by summing the illuminance contributions $E_P$ of all of the pixels in a region below the adjusted profile angle $\theta_{ADJ}$. If the total illuminance $E_{TOT}$ below the adjusted profile angle $\theta_{ADJ}$ is greater than a present illuminance threshold $E_{TH}$ at 2122, the control circuit may set an updated illuminance threshold $E_{TH-NEW}$ equal to the total illuminance $E_{TOT}$ below the adjusted profile angle $\theta_{ADJ}$ at 2124.

If the control device set the updated luminance threshold $L_{TH-NEW}$ at 2118 and/or set the updated illuminance threshold $E_{TH-NEW}$ at 2124, the control device may transmit the updated luminance threshold $L_{TH-NEW}$ at 2118 and/or set the updated illuminance threshold $E_{TH-NEW}$ to the visible light sensor at 2128, and the increase view update procedure 2100 may exit. If the control device did not set the updated luminance threshold $L_{TH-NEW}$ at 2118 or the updated illuminance threshold $E_{TH-NEW}$ at 2124, the control device may decrease the open timeout at 2130. For example, the control device may decrease the open timeout by one half of the previous open timeout at 2130.

Figure 22:
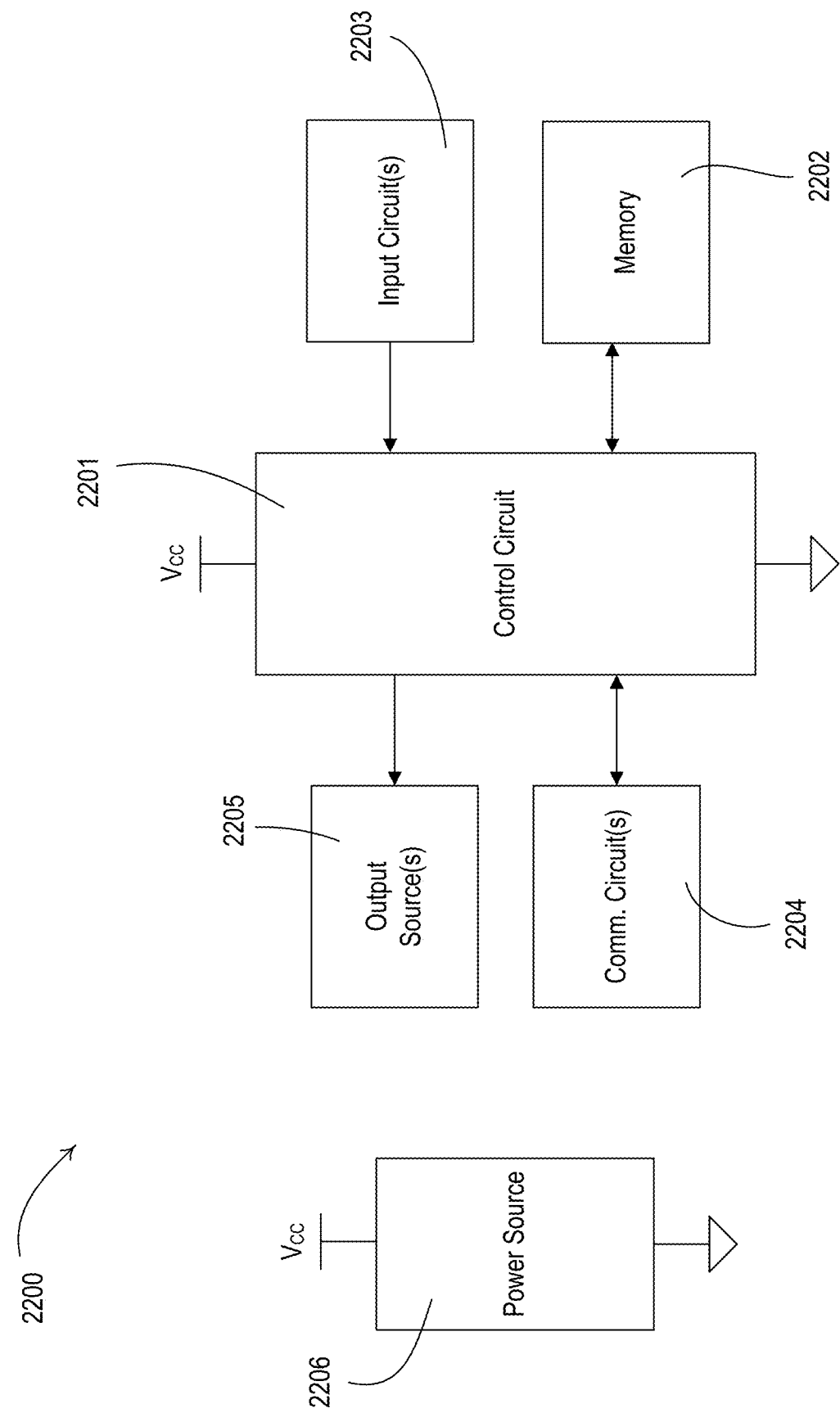
FIG. 22 is a block diagram illustrating an example of a device capable of processing and/or communication in the load control system of FIG. 1A.

FIG. 22 is a block diagram illustrating an example of a device 2200 capable of processing and/or communication in a load control system, such as the load control system 100 of FIG. 1A. In an example, the device 2200 may be a control device capable of transmitting or receiving messages. The control device may be in an input device, such as a sensor device (e.g., an occupancy sensor or another sensor device), a visible light sensor 180, 182, a remote control device 170, or another input device capable of transmitting messages to load control devices or other devices in the load control system 100. The device 2200 may be a computing device, such as the mobile device 190, the system controller 110, a processing device, a central computing device, or another computing device in the load control system 100.

The device 2200 may include a control circuit 2201 for controlling the functionality of the device 2200. The control circuit 2201 may include one or more general purpose processors, special purpose processors, conventional processors, digital signal processors (DSPs), microprocessors, integrated circuits, a programmable logic device (PLD), application specific integrated circuits (ASICs), or the like. The control circuit 2201 may perform signal coding, data processing, image processing, power control, input/output processing, or any other functionality that enables the device 2200 to perform as one of the devices of the load control system (e.g., load control system 100) described herein.

The control circuit 2201 may be communicatively coupled to a memory 2202 to store information in and/or retrieve information from the memory 2202. The memory 2202 may comprise a computer-readable storage media or machine-readable storage media that maintains a device dataset of associated device identifiers, network information, and/or computer-executable instructions for performing as described herein. For example, the memory 2202 may comprise computer-executable instructions or machine-readable instructions that include one or more portions of the procedures described herein. For example, the computer-executable instructions or machine-readable instructions may, when executed, cause the control circuit 2201 to perform one or more of the procedures 700, 800, 850, 900, 1000, 1100, 1300, 1400, 1600, 1700, 1900, and/or 2100. The control circuit 2201 may access the instructions from memory 2202 for being executed to cause the control circuit 2201 to operate as described herein, or to operate one or more other devices as described herein. The memory 2202 may comprise computer-executable instructions for executing configuration software. For example, the computer-executable instructions may be executed to display a GUI for copying and pasting one or more settings as described herein. The computer-executable instructions may be executed to perform procedures 500 and/or 600 as described herein. Further, the memory 2202 may have stored thereon one or more settings and/or control parameters associated with the device 2200.

The memory 2202 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 2202 may be implemented as an external integrated circuit (IC) or as an internal circuit of the control circuit 2201.

The device 2200 may include one or more communication circuits 2204 that are in communication with the control circuit 2201 for sending and/or receiving information as described herein. The communication circuit 2204 may perform wireless and/or wired communications. The communication circuit 2204 may be a wired communication circuit capable of communicating on a wired communication link. The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 2204 may be configured to communicate via power lines (e.g., the power lines from which the device 2200 receives power) using a power line carrier (PLC) communication technique. The communication circuit 2204 may be a wireless communication circuit including one or more RF or infrared (IR) transmitters, receivers, transceivers, and/or other communication circuits capable of performing wireless communications.

Though a single communication circuit 2204 may be illustrated, multiple communication circuits may be implemented in the device 2200. The device 2200 may include a communication circuit configured to communicate via one or more wired and/or wireless communication networks and/or protocols and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol, and the second communication circuit may be configured to communicate via a second wireless communication link (e.g., a short-range or direct wireless communication link) using a second wireless protocol (e.g., a short-range wireless communication protocol).

One of the communication circuits 2204 may comprise a beacon transmitting and/or receiving circuit capable of transmitting and/or receiving beacon messages via a short-range RF signal. The control circuit 2201 may communicate with beacon transmitting circuit (e.g., a short-range communication circuit) to transmit beacon messages. The beacon transmitting circuit may communicate beacons via RF communication signals, for example. The beacon transmitting circuit may be a one-way communication circuit (e.g., the beacon transmitting circuit is configured to transmit beacon messages) or a two-way communication circuit capable of receiving information on the same network and/or protocol on which the beacons are transmitted (e.g., the beacon transmitting circuit is configured to transmit and receive beacon messages). The information received at the beacon transmitting circuit may be provided to the control circuit 2201.

The control circuit 2201 may be in communication with one or more input circuits 2203 from which inputs may be received. The input circuits 2203 may be included in a user interface for receiving inputs from the user. For example, the input circuits 2203 may include an actuator (e.g., a momentary switch that may be actuated by one or more physical buttons) that may be actuated by a user to communicate user input or selections to the control circuit 2201. In response to an actuation of the actuator, the control circuit 2201 may enter an association mode, transmit association messages from the device 2200 via the communication circuits 2204, and/or receive other information (e.g., control instructions for performing control of an electrical load). In response to an actuation of the actuator, the control circuit may be configured to perform control by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 2201 of the device 2200 may enter the association mode, transmit an association message, transmit control instructions, or perform other functionality in response to an actuation or input from the user on the touch sensitive surface.

The input circuits 2203 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the device 2200). The control circuit 2201 may receive information from the one or more input circuits 2203 and process the information for performing functions as described herein.

The control circuit 2201 may be in communication with one or more output sources 2205. The output sources 2205 may include one or more indicators (e.g., visible indicators, such as LEDs) for providing indications (e.g., feedback) to a user. The output sources 2205 may include a display (e.g., a visible display) for providing information (e.g., feedback) to a user. The control circuit 2201 and/or the display may generate a graphical user interface (GUI) generated via software for being displayed on the device 2200 (e.g., on the display of the device 2200).

The user interface of the device 2200 may combine features of the input circuits 2203 and the output sources 2205. For example, the user interface may have buttons that actuate the actuators of the input circuits 2203 and may have indicators (e.g., visible indicators) that may be illuminated by the light sources of the output sources 2205. In another example, the display and the control circuit 2201 may be in two-way communication, as the display may display information to the user and include a touch screen capable of receiving information from a user. The information received via the touch screen may be capable of providing the indicated information received from the touch screen as information to the control circuit 2201 for performing functions or control.

Each of the hardware circuits within the device 2200 may be powered by a power source 2206. The power source 2206 may include a power supply configured to receive power from an alternating-current (AC) power supply or direct-current (DC) power supply, for example. In addition, the power source 2206 may comprise one or more batteries. The power source 2206 may produce a supply voltage $V_{CC}$ for powering the hardware within the device 2200.

Figure 23:
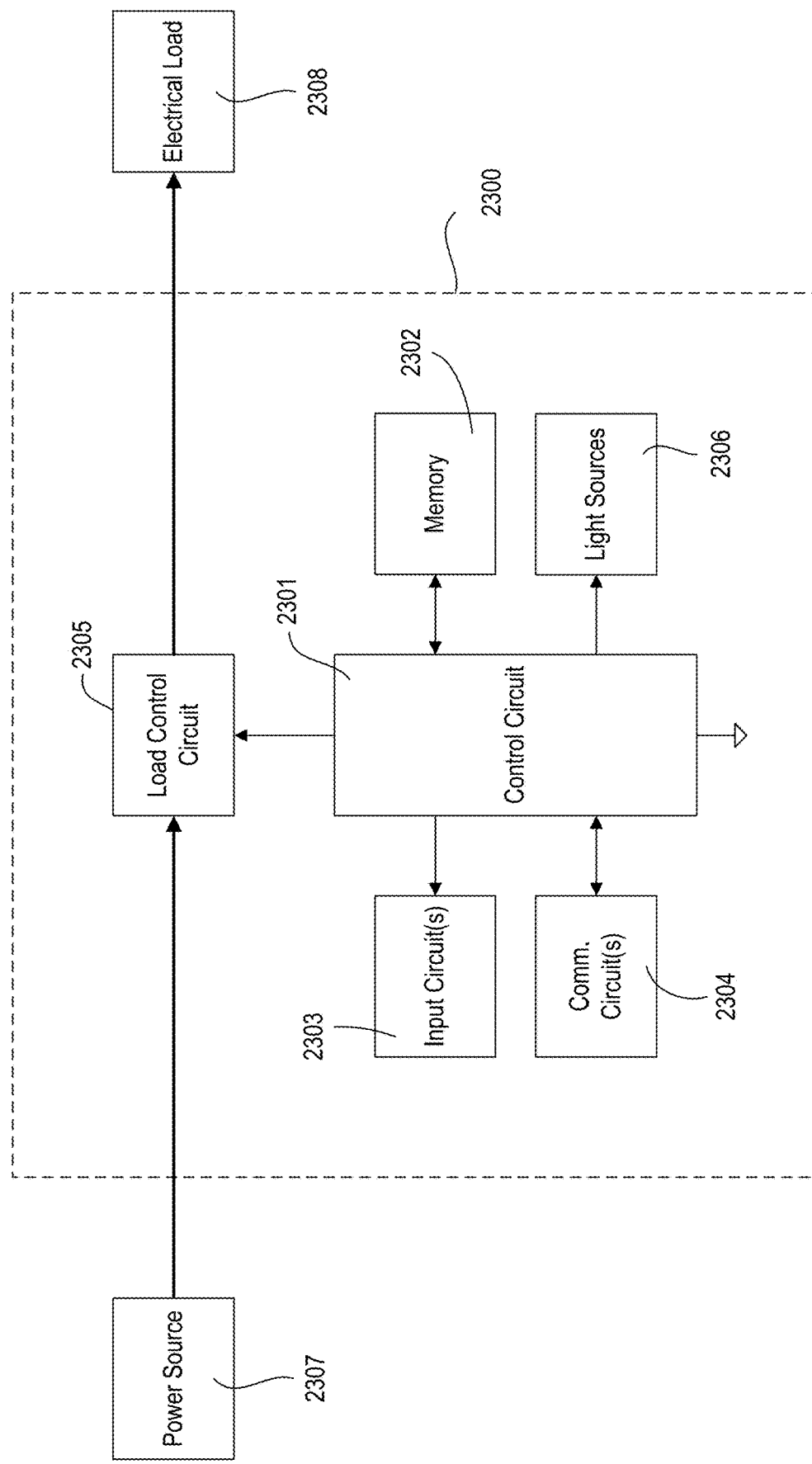
FIG. 23 is a block diagram illustrating an example load control device.

FIG. 23 is a block diagram illustrating an example load control device 2300. The load control device 2300 may be a lighting control device (e.g., the lighting control device 120), a motorized window treatment (e.g., the motorized window treatments 150), a plug-in load control device (e.g., the plug-in load control device 140), a temperature control device (e.g., the temperature control device 160), a dimmer switch, a speaker (e.g., the speaker 146), an electronic switch, an electronic ballast for lamps, and/or another load control device.

The load control device 2300 may include a control circuit 2301 for controlling the functionality of the load control device 2300. The control circuit 2301 may include one or more general purpose processors, special purpose processors, conventional processors, digital signal processors (DSPs), microprocessors, integrated circuits, a programmable logic device (PLD), application specific integrated circuits (ASICs), or the like. The control circuit 2301 may perform signal coding, data processing, image processing, power control, input/output processing, or any other functionality that enables the load control device 2300 to perform as one of the devices of the load control system (e.g., load control system 100) described herein.

The load control device 2300 may include a load control circuit 2305 that may be electrically coupled in series between a power source 2307 (e.g., an AC power source and/or a DC power source) and an electrical load 2308. The control circuit 2301 may be configured to control the load control circuit 2305 for controlling the electrical load 2308, for example, in response to received instructions. The electrical load 2308 may include a lighting load, a motor load (e.g., for a ceiling fan and/or exhaust fan), an electric motor for controlling a motorized window treatment, a component of a heating, ventilation, and cooling (HVAC) system, a speaker, or any other type of electrical load. The electrical load may 2308 be included in or external to the load control device 2300. For example, the load control device 2300 may be a dimmer switch or an LED driver capable of controlling an external lighting load. The electrical load 2308 may be integral with the load control device 2300. For example, the load control device 2300 may be included in LEDs of a controllable light source, a motor of a motor drive unit, or a speaker in a controllable audio device.

The control circuit 2301 may be communicatively coupled to a memory 2302 to store information in and/or retrieve information from the memory 2302. The memory 2302 may comprise a computer-readable storage media or machine-readable storage media that maintains a device dataset of associated device identifiers, network information, and/or computer-executable instructions for performing as described herein. For example, the memory 182 may comprise computer-executable instructions or machine-readable instructions that include one or more portions of the procedures described herein. The memory 2302 may have stored thereon one or more settings and/or control parameters associated with the device 2300. For example, the memory 2302 may have stored thereon one or more associations between control parameters and respective settings. The settings may be updated as described herein.

The control circuit 2301 may access the instructions from memory 2302 for being executed to cause the control circuit 2301 to operate as described herein, or to operate one or more devices as described herein. The memory 2302 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 2302 may be implemented as an external integrated circuit (IC) or as an internal circuit of the control circuit 2301.

The load control device 2300 may include one or more communication circuits 2304 that are in communication with the control circuit 2301 for sending and/or receiving information as described herein. The communication circuit 2304 may perform wireless and/or wired communications. The communication circuit 2304 may be a wired communication circuit capable of communicating on a wired communication link. The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 2304 may be configured to communicate via power lines (e.g., the power lines from which the load control device 2300 receives power) using a power line carrier (PLC) communication technique. The communication circuit 2304 may be a wireless communication circuit including one or more RF or IR transmitters, receivers, transceivers, or other communication circuits capable of performing wireless communications.

Though a single communication circuit 2304 may be illustrated, multiple communication circuits may be implemented in the load control device 2300. The load control device 2300 may include a communication circuit configured to communicate via one or more wired and/or wireless communication networks and/or protocols and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol), and the second communication circuit may be configured to communicate via a second wireless communication link (e.g., a short-range or direct wireless communication link) using a second wireless protocol (e.g., a short-range wireless communication protocol).

One of the communication circuits 2304 may comprise a beacon transmitting and/or receiving circuit capable of transmitting and/or receiving beacon messages via a short-range RF signal. A control circuit 2301 may communicate with beacon transmitting circuit (e.g., a short-range communication circuit) to transmit beacon messages. The beacon transmitting circuit may communicate beacon messages via RF communication signals, for example. The beacon transmitting circuit may be a one-way communication circuit (e.g., the beacon transmitting circuit is configured to transmit beacon messages) or a two-way communication circuit capable of receiving information on the same network and/or protocol on which the beacon messages are transmitted (e.g., the beacon transmitting circuit is configured to transmit and receive beacon messages). The information received at the beacon transmitting circuit may be provided to the control circuit 2301.

The control circuit 2301 may be in communication with one or more input circuits 2303 from which inputs may be received. The input circuits 2303 may be included in a user interface for receiving inputs from the user. For example, the input circuits 2303 may include an actuator (e.g., a momentary switch that may be actuated by one or more physical buttons) that may be actuated by a user to communicate user input or selections to the control circuit 2301. In response to an actuation of the actuator, the control circuit 2301 may enter an association mode, transmit association messages from the load control device 2300 via the communication circuits 2304, and/or receive other information. In response to an actuation of the actuator may perform control by controlling the load control circuit 2305 to control the electrical load 2308, and/or by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 2301 of the load control device 2300 may enter the association mode, transmit an association message, control the load control circuit 2305, transmit control instructions, or perform other functionality in response to an actuation or input from the user on the touch sensitive surface.

The input circuits 2303 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the load control device 2300). The control circuit 2301 may receive information from the one or more input circuits 2303 and process the information for performing functions as described herein.

The control circuit 2301 may illuminate a light sources 2306 (e.g., LEDs) to provide feedback to a user. The control circuit 2301 may be operable to illuminate the light sources 2306 different colors. The light sources 2306 may be illuminated by, for example, one or more light-emitting diodes (LEDs).

Although features and elements are described herein in particular combinations, each feature or element can be used alone or in any combination with the other features and elements. For example, the functionality described herein may be described as being performed by a control device, such as a remote control device or a lighting device, but may be similarly performed by a hub device or a network device.

The methods described herein may be implemented in a computer program, software, or firmware incorporated in one or more computer-readable media for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

While the methods described herein are described with reference to controlling motorized window treatments (e.g., the motorized window treatments 150 and/or the motorized roller shade 220) for preventing glare conditions, the methods may be used to control other types of control devices to prevent and/or alleviate glare conditions. For example, the methods described herein could be used to control the transmittance of controllable electrochromic glass and/or to adjust the positions of indoor or outdoor controllable louvers to prevent and/or alleviate glare conditions.

What is claimed is:

1. A method comprising:
    determining a luminance value for a first pixel in an image;
    determining a profile angle for the first pixel;
    determining an illuminance value for the first pixel based on the luminance value and the profile angle;
    adding the illuminance value for the first pixel to a cumulative illuminance value for the image;
    determining whether the cumulative illuminance value for the image is greater than or equal to a glare condition illuminance threshold;
    determining whether the luminance value for the first pixel is greater than or equal to a glare condition luminance threshold;
    determining that a glare condition exists based on determining that the cumulative illuminance value for the image is greater than or equal to the glare condition illuminance threshold or that the luminance value for the first pixel is greater than or equal to the glare condition luminance threshold; and
    causing a position of a covering material for a motorized window treatment to be adjusted to remove the glare condition based on the determination of the glare condition.

2. The method of claim 1, further comprising:
    receiving an indication of a glare problem;
    determining a third threshold based on an adjusted position of the covering material for the motorized window treatment; and
    storing the third threshold for future use.

3. The method of claim 1, further comprising:
    determining that there are one or more unprocessed pixels in the image, wherein the one or more unprocessed pixels comprise a second pixel;
    determining a luminance value for the second pixel;
    determining a profile angle for the second pixel;
    determining an illuminance value for the second pixel based on the luminance value and the profile angle; and
    adding the illuminance value for the second pixel to the cumulative illuminance value for the image.

4. The method of claim 3, further comprising determining that the glare condition exists based on the luminance value of the second pixel and the second threshold.

5. The method of claim 3, wherein a first row of pixels comprises the first pixel and the second pixel.

6. The method of claim 5, wherein the first row of pixels is a bottom row of pixels in the image.

7. The method of claim 3, wherein a first row of pixels comprises the first pixel and a second row of pixels comprises the second pixel.

8. The method of claim 1, further comprising determining a region of interest in the image, wherein the first pixel is located at a predetermined location in the image.

9. The method of claim 1, wherein determining the luminance value for the first pixel comprises retrieving the luminance value from a memory of a device.

10. The method of claim 1, wherein the first pixel is associated with an R intensity value, a G intensity value, and a B intensity value, and wherein determining the luminance value comprises calculating the luminance value based on the R intensity value, the G intensity value, and the B intensity value.

11. The method of claim 1, further comprising:
    storing a location of the glare condition;
    determining a desired position for the covering material based on the location of the glare condition; and
    generating first control instructions for controlling the position of the covering material to match the desired position.

12. The method of claim 11, wherein the desired position is a fully-lowered position.

13. The method of claim 1, wherein the profile angle for the first pixel is defined as an angle of a projection of a line from the first pixel to a visible light sensor onto a vertical plane that is perpendicular to a window to which the motorized window treatment is attached.

14. A sensor for detecting a glare condition and of controlling a position of covering material for a motorized window treatment, the sensor comprising:
    a memory;
    a visible light sensing circuit configured to record an image; and
    a control circuit configured to:
        determine a luminance value for a first pixel in the image;
        determine a profile angle for the first pixel;
        determine an illuminance value for the first pixel based on the luminance value and the profile angle;
        add the illuminance value for the first pixel to a cumulative illuminance value for the image;
        determine whether the cumulative illuminance value for the image is greater than or equal to a glare condition illuminance threshold;
        determine whether the luminance value for the first pixel is greater than or equal to a glare condition luminance threshold;
        determine that a glare condition exists based on determining that the cumulative illuminance value for the image is greater than or equal to the glare condition illuminance threshold or that the luminance value for the first pixel is greater than or equal to the glare condition luminance threshold; and
        determine a position of a covering material for a motorized window treatment to be adjusted to remove the glare condition based on the determination of the glare condition; and
        transmit an indication of the first glare condition or the second glare condition and the determined position of the covering material.

15. The sensor of claim 14, wherein the control circuit is further configured to:
  receive an indication of a glare problem;
  determine a third threshold based on an adjusted position of the covering material for the motorized window treatment; and
  store the third threshold for future use.

16. The sensor of claim 14, wherein the control circuit is further configured to:
  determine that there are one or more unprocessed pixels in the image, wherein the one or more unprocessed pixels comprise a second pixel;
  determine a luminance value for the second pixel;
  determine a profile angle for the second pixel;
  determine an illuminance value for the second pixel based on the luminance value and the profile angle; and
  add the illuminance value for the second pixel to the cumulative illuminance value for the image.

17. The sensor of claim 16, wherein the control circuit is further configured to determine that the glare condition exists based on the luminance value of the second pixel and the second threshold.

18. The sensor of claim 16, wherein a first row of pixels comprises the first pixel and the second pixel.

19. The sensor of claim 18, wherein the first row of pixels is a bottom row of pixels in the image.

20. The sensor of claim 16, wherein a first row of pixels comprises the first pixel and a second row of pixels comprises the second pixel.

21. The sensor of claim 14, wherein the control circuit is further configured to determine a region of interest in the image, wherein the first pixel is located at a predetermined location in the image.

22. The sensor of claim 14, wherein the control circuit being configured to determine the luminance value for the first pixel comprises the control circuit being configured to retrieve the luminance value from the memory.

23. The sensor of claim 14, wherein the first pixel is associated with an R intensity value, a G intensity value, and a B intensity value, and wherein the control circuit being configured to determine the luminance value comprises the control circuit being configured to calculate the luminance value based on the R intensity value, the G intensity value, and the B intensity value.

24. The sensor of claim 14, wherein the profile angle for the first pixel is defined as an angle of a projection of a line from the first pixel to the sensor onto a vertical plane that is perpendicular to a window to which the motorized window treatment is attached.

25. A non-transitory computer-readable medium having instructions stored thereon that, when executed by a control circuit, cause the control circuit to:
  determine a luminance value for a first pixel in an image;
  determine a profile angle for the first pixel;
  determine an illuminance value for the first pixel based on the luminance value and the profile angle;
  add the illuminance value for the first pixel to a cumulative illuminance value for the image;
  determine whether the cumulative illuminance value for the image is greater than or equal to a glare condition illuminance threshold;
  determine whether the luminance value for the first pixel is greater than or equal to a glare condition luminance threshold;
  determine that a glare condition exists based on determining that the cumulative illuminance value for the image is greater than or equal to the glare condition illuminance threshold or that the luminance value for the first pixel is greater than or equal to the glare condition luminance threshold; and
  determine a position of a covering material for a motorized window treatment to be adjusted to remove the glare condition based on the determination of the glare condition; and
  transmit, via a communication circuit, an indication of the first glare condition or the second glare condition and the determined position of the covering material.

26. The non-transitory computer readable medium of claim 25, wherein the instructions, when executed by the control circuit, further cause the control circuit to:
  receive, via the communication circuit, an indication of a glare problem;
  determine a third threshold based on an adjusted position of the covering material for the motorized window treatment; and
  store the third threshold for future use.

27. The non-transitory computer readable medium of claim 25, wherein the instructions, when executed by the control circuit, further cause the control circuit to:
  determine that there are one or more unprocessed pixels in the image, wherein the one or more unprocessed pixels comprise a second pixel;
  determine a luminance value for the second pixel;
  determine a profile angle for the second pixel;
  determine an illuminance value for the second pixel based on the luminance value and the profile angle; and
  add the illuminance value for the second pixel to the cumulative illuminance value for the image.

28. The non-transitory computer readable medium of claim 25, wherein the instructions, when executed by the control circuit, further cause the control circuit to determine that the glare condition exists based on the luminance value of the second pixel and the second threshold.

* * * * *